United States Patent
He et al.

(10) Patent No.: US 11,923,887 B2
(45) Date of Patent: Mar. 5, 2024

(54) EMULATION-BASED CROSS-TECHNOLOGY FOR DECODING COMMUNICATIONS

(71) Applicants: Regents of the University of Minnesota, Minneapolis, MN (US); Tian He, Arden Hills, MN (US)

(72) Inventors: Tian He, Arden Hills, MN (US); Wenchao Jiang, Singapore (SG); Ruofeng Liu, Falcon Heights, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 424 days.

(21) Appl. No.: 17/309,107

(22) PCT Filed: Oct. 25, 2019

(86) PCT No.: PCT/US2019/058118
§ 371 (c)(1),
(2) Date: Apr. 23, 2021

(87) PCT Pub. No.: WO2020/086987
PCT Pub. Date: Apr. 30, 2020

(65) Prior Publication Data
US 2022/0006482 A1 Jan. 6, 2022

Related U.S. Application Data

(60) Provisional application No. 62/883,165, filed on Aug. 6, 2019, provisional application No. 62/751,192, filed on Oct. 26, 2018.

(51) Int. Cl.
*H04B 1/403* (2015.01)
*H04L 69/22* (2022.01)
(Continued)

(52) U.S. Cl.
CPC ............. *H04B 1/406* (2013.01); *H04L 69/22* (2013.01); *H04W 4/38* (2018.02); *H04L 1/0061* (2013.01)

(58) Field of Classification Search
CPC ..... H04L 69/08; H04L 1/0083; H04L 1/0084; H04L 27/0008; H04L 27/2273;
(Continued)

(56) References Cited

U.S. PATENT DOCUMENTS

| 4,908,836 A | 3/1990 | Rushforth et al. | |
|---|---|---|---|
| 2010/0031036 A1* | 2/2010 | Chauncey | H04W 12/033 713/168 |

(Continued)

OTHER PUBLICATIONS

Jiang et al., "Achieving Receiver-Side Cross-Technology Communication with Cross-Decoding," Association for Computing Machinery, Proceedings for MobiCom, https://sigmobile.org/mobicom/2018/, Oct. 29, 2018, 14 pp.

(Continued)

*Primary Examiner* — Vineeta S Panwalkar
(74) *Attorney, Agent, or Firm* — Shumaker & Sieffert, P.A.

(57) ABSTRACT

Systems, devices, and techniques for allowing communication between two or more computing devices are described herein. For example, a method includes receiving, by a first computing device configured to operate in accordance with a first wireless protocol, one or more data packets via one or more signals output by a second computing device according to a second wireless protocol, where the first computing device is not configured to operate in accordance with the second wireless protocol. Additionally, or alternatively, a method includes receiving, by a first computing device configured to operate in accordance with a first wireless protocol, at least one signal including a data packet, wherein (Continued)

a payload of the data packet comprises an indication of a symbol defined in accordance with a second wireless protocol.

14 Claims, 51 Drawing Sheets

(51) Int. Cl.
*H04W 4/38* (2018.01)
*H04L 1/00* (2006.01)

(58) Field of Classification Search
CPC . H04L 27/2636; H04L 27/2646; H04L 27/36; H04W 4/80; H04W 16/14; H04W 80/00
See application file for complete search history.

(56) References Cited

U.S. PATENT DOCUMENTS

| | | | |
|---|---|---|---|
| 2014/0105090 | A1 | 4/2014 | Banerjea et al. |
| 2014/0185631 | A1 | 7/2014 | Venugopalan et al. |
| 2015/0133185 | A1 | 5/2015 | Chen et al. |
| 2016/0269971 | A1 | 9/2016 | Kim et al. |
| 2016/0344574 | A1 | 11/2016 | Choi et al. |

OTHER PUBLICATIONS

Jiang et al., "[MobiCom18] Achieving Receiver-Side Cross-Technology Communication with Cross-Decoding," YouTube Video, accessed from https://www.youtube.com/watch?v=FTgjskrbfxM, Published Sep. 14, 2018, 1 pp.
Adib et al., "Interference Alignment by Motion," Association for Computing, MobiCom '13: Proceedings of the 19th annual international conference on Mobile computing & networking, https://doi.org/10.1145/2500423.2500449, Sep. 2013, pp. 279-290.
Bahl et al., "White Space Networking with Wi-Fi like Connectivity," ACM Digital Library, Association for Computing Machinery, SIGCOMM '09: Proceedings of the ACM SIGCOMM 2009 conference on Data communication, https://doi.org/10.1145/1592568.1592573, Aug. 2009, pp. 27-38.
Chebrolu et al., "Esense: Communication through Energy Sensing," Association for Computing Machinery, MobiCom '09: Proceedings of the 15th annual international conference on Mobile computing and networking, https://doi.org/10.1145/1614320.1614330, Sep. 2009, pp. 85-96.
Chen et al., "AirExpress: Enabling Seamless In-band Wireless Multi-hop Transmission," Association for Computing Machinery, MobiCom '15: Proceedings of the 21st Annual International Conference on Mobile Computing and Networking, https://doi.org/10.1145/2789168.2790114, Sep. 2015, pp. 566-577.
Chen et al., "On Heterogeneous Neighbor Discovery in Wireless Sensor Networks," 2015 IEEE Conference on Computer Communications (INFOCOM), DOI:10.1109/INFOCOM.2015.7218438, Aug. 2015, pp. 693-701.
Chen et al., "TwinBee: Reliable Physical-Layer Cross-Technology Communication with Symbol-Level Coding," ResearchGate, IEEE Infocom 2018—IEEE Conference on Computer Communications, DOI: 10.1109/INFOCOM.2018.8485816, Apr. 2018, 10 pp.
Chi et al., "EMF: Embedding Multiple Flows of Information in Existing Traffic for Concurrent Communication among Heterogeneous IoT Devices," IEEE Infocom 2017—IEEE Conference on Computer Communications, DOI:10.1109/INFOCOM.2017.8057109, May 2017, 9 pp.
Chi et al., "B2W2: N-Way Concurrent Communication for IoT Devices," ACM Digital Library, SenSys '16: Proceedings of the 14th ACM Conference on Embedded Network Sensor Systems CD-ROM, https://doi.org/10.1145/2994551.2994561, Nov. 2016, pp. 245-258.
"Fact Sheet: Spectrum Frontiers Rules Identify, Open Up Vast Amounts of New High-Band Spectrum For Next Generation (5G) Wireless Broadband," accessed from https://apps.fcc.gov/edocs_public/attachmatch/DOC-340310A1.pdf, accessed on Jul. 13, 2021, 2 pp.
Gawlowicz et al., "Enabling Cross-Technology Communication between LTE Unlicensed and WiFi," Research Gate, in proceedings of IEEE Infocon 2018, IEEE Conference on Computer Communications, DOI:10.1109/INFOCOM.2018.8485984, Apr. 2018, 10 pp.
Guo et al., "WiZig: Cross-technology energy communication over a noisy channel," ResearchGate, IEEE Infocom 2017—IEEE Conference on Computer Communications, DOI:10.1109/INFOCOM.2017.8057108, May 2017, 10 pp.
Hao et al., "WizSync: Exploiting Wi-Fi Infrastructure for Clock Synchronization in Wireless Sensor Networks," IEEE Transactions on Mobile Computing, vol. 13, Issue 6, DOI: 10.1109/TMC.2013.43, Jun. 2014, pp. 1379-1392.
Jiang et al., "Transparent Cross-technology Communication over Data Traffic," IEEE Infocom 2017—IEEE Conference on Computer Communications, https://doi.org/10.1109/INFOCOM.2017.8057086, May 2017, 9 pp.
Jiang et al., "BlueBee: a 10,000x Faster Cross-Technology Communication via PHY Emulation," SenSys '17: Proceedings of the 15th ACM Conference on Embedded Network Sensor Systems, Article 3, https://doi.org/10.1145/3131672.3131678, Nov. 2013, pp. 1-13.
Jin et al., "WiZi-Cloud: Application-transparent Dual ZigBee-WiFi Radios for Low Power Internet Access," IEEE, 2011 Proceedings IEEE INFOCOM, DOI: 10.1109/INFCOM.2011.5934951, Apr. 10-15, 2011, pp. 9.
Lindh et al., "Measuring Bluetooth Low Energy Power Consumption," Texas Instruments, accessed from https://www.ti.com/lit/an/swra478d/swra478d.pdf?ts=1626818211140&ref_url=https%253A%252F%252Fwww.google.com%252F, Jan. 2017, 29 pp.
Kim et al., "FreeBee: Cross-technology Communication via Free Side-Channel," MobiCom '15: Proceedings of the 21st Annual International Conference on Mobile Computing and Networking, https://doi.org/10.1145/2789168.2790098, Sep. 2015, pp. 317-330.
Li et al., "WEBee: Physical-Layer Cross-Technology Communication via Emulation," MobiCom '17: Proceedings of the 23rd Annual International Conference on Mobile Computing and Networking, https://doi.org/10.1145/3117811.3117816, Oct. 2017, pp. 2-14.
Rathinakumar et al., "CPReycle: Recycling Cyclic Prefix for Versatile Interference Mitigation in OFDM based Wireless Systems," CoNEXT '16: Proceedings of the 12th International on Conference on emerging Networking Experiments and Technologies, https://doi.org/10.1145/2999572.2999577, Dec. 2016, pp. 67-81.
Wang et al., "Symbol-level Cross-technology Communication via Payload Encoding," Semantic Scholar, 2018 IEEE 38th International Conference on Distributed Computing Systems (ICDCS), DOI:10.1109/ICDCS.2018.00056, Jul. 2018, 11 pp.
Yin et al., "C-Morse: Cross-technology Communication with Transparent Morse Coding," IEEE, IEEE INFOCOM 2017—IEEE Conference on Computer Communications, DOI: 10.1109/INFOCOM.2017.8057107, May 2017, 9 pp.
Yin et al., "Explicit Channel Coordination via Cross-technology Communication," MobiSys '18: Proceedings of the 16th Annual International Conference on Mobile Systems, Applications, and Services, https://doi.org/10.1145/3210240.3210318, Jun. 2018, pp. 178-190.
Zhang et al., "HoWiES: A Holistic Approach to ZigBee Assisted WiFi Energy Savings in Mobile Devices," Semantic Scholar, 2013 Proceedings IEEE Infocom, DOI:10.1109/INFCOM.2013.6566930, Apr. 2013, 9 pp.
Zheng et al., "StripComm: Interference-Resilient Cross-Technology Communication in Coexisting Environments," Research Gate, IEEE Infocom 2018—IEEE Conference on Computer Communications, DOI: 10.1109/INFOCOM.2018.8486374, Apr. 2018, 10 pp.
Zhu et al., "IOT Gateway: Bridging Wireless Sensor Networks into Internet of Things," IEEE Computer Society, 2010 IEEE/IFIP International Conference on Embedded and Ubiquitous Computing, DOI:10.1109/EUC.2010.58, Dec. 2010, 7 pp.
International Search Report and Written Opinion of International Application No. PCT/US2019/058118, dated Feb. 20, 2020, 12 pp.

(56) References Cited

OTHER PUBLICATIONS

International Preliminary Report on Patentability from International Application No. PCT/US2019/058118, dated May 6, 2021, 9 pp.
"2.4 Ghz IEEE 802.15.4 / ZigBee-ready RF Transceiver," CC2420, Chipcon Products from Texas Instruments, Texas Instruments, accessed from https://www.ti.com/product/CC2420, accessed on Jul. 21, 2021, 94 pp.
Guo et al., "ZigFi: Harnessing Channel State Information for Cross-Technology Communication," Research Gate, IEEE/ACM Transactions on Networking, vol. 28, Issue 1, https://doi.org/10.1109/TNET.2019.2962707, Feb. 2020, pp. 301-311.
Mahindra et al., "A Practical Traffic Management System for Integrated LTE-WiFi Networks," ACM Digital Library, MobiCom '14: Proceedings of the 20th annual international conference on Mobile computing and networking, https://doi.org/10.1145/2639108.2639120. Sep. 2014, pp. 189-200.
Nikolaidis et al., "COPA: Cooperative Power Allocation for Interfering Wireless Networks," ACM Digital Library, CoNEXT '15: Proceedings of the 11th ACM Conference on Emerging Networking Experiments and Technologies, https://doi.org/10.1145/2716281.2836103, Dec. 2015, pp. 1-13.
Radunovic et al., "Weeble: Enabling Low-Power Nodes to Coexist with High-Power Nodes in White Space Networks," Research Gate, Proceedings of the 8th international conference on Emerging networking experiments and technologies, DOI:10.1145/2413176.2413201, Dec. 2012, 12 pp.
Wang et al., ECT: Exploiting Cross-Technology Transmission for REducing Packet Delivery Delay in IoT Networks, ACM, ACM Transactions on Sensor Networks, vol. 15 Issue 2, Article No. 20, https://doi.org/10.1145/3293536, Apr. 2019, pp. 1-28.
Zhang et al., "Gap Sense: Lightweight Coordination of Heterogeneous Wireless Devices," Research Gate, INFOCOM, 2013 Proceedings IEEE, DOI:10.1109/INFCOM.2013.6567122, Apr. 2013, 9 pp.
Li et al., "LongBee: Enabling Long-Range Cross-Technology Communication," Research Gate, IEEE INFOCOM 2018—IEEE Conference on Computer Communications, DOI:10.1109/INFOCOM.2018.8485938, Apr. 2018, 9 pp.

* cited by examiner (a) Standard BLE Symbol w/ 1MHz Samples (b) Recovered BLE symbol w/ CP-aware Samples (a) SER: ZigBee Channel 1

(b) SER: ZigBee Channel 2

(a) FRR: Lab Room (b) FRR: Corridor (a) CDF of SER (Lab)

(b) CDF of SER (Corridor)

(a) FRR w/ Coding (Lab)

(b) FRR w/ Coding (Corridor)

(a) BER in 8 BLE Channels

| FreeBee | B2W2 | BLE->BLE | Xfi |
|---|---|---|---|
| 17 bps | 3.1 kbps | 0.803 Mbps | 3.2 Mbps |

FIG. 53

(a) Parallel w/1 ZigBee (b) Parallel w/2 ZigBee (a) Hybrid CTC deployment (b) Spectrum Allocation (c) Frame Reception Ratio

EMULATION-BASED CROSS-TECHNOLOGY FOR DECODING COMMUNICATIONS

This application is a National Stage application under 35 U.S.C. § 371 of PCT Application No. PCT/US2019/058118, entitled "EMULATION-BASED CROSS-TECHNOLOGY FOR DECODING COMMUNICATIONS" and filed on Oct. 25, 2019, which claims the benefit of U.S. Provisional Patent Application No. 62/751,192, titled "EMULATION-BASED CROSS-TECHNOLOGY FOR DECODING COMMUNICATIONS" and filed Oct. 26, 2018 and U.S. Provisional Patent Application No. 62/883,165, titled "EMULATION-BASED CROSS-TECHNOLOGY FOR DECODING COMMUNICATIONS" and filed Aug. 6, 2019. The entire contents of application nos. PCT/US2019/058118, 62/751,192 and 62/883,165 are incorporated herein by reference.

GOVERNMENT INTEREST

This invention was made with government support under CNS-1718456, CNS-1444021, CNS-1717059, and CNS-1718456, each awarded by National Science Foundation. The government has certain rights in the invention.

TECHNICAL FIELD

The disclosure relates to wireless communication devices.

BACKGROUND

The number of Internet of Things (IoT) devices connected wirelessly to one or more networks may reach twenty billion by the year 2020, leading to the intense coexistence of wireless technologies. For spectrum efficiency under dense deployment, many of today's wireless technologies are designed to share the unlicensed/open spectrum (e.g., industrial, scientific, and medical (ISM) radio bands), including such popular technologies as WiFI®, Bluetooth® (BLE), Long-Term Evolution (LTE), and ZigBee®. Despite the common belief that coexistence of wireless technologies leads to harmful interference, it in fact offers new opportunities for those technologies to collaborate.

Recently, there has been an explosive growth of wireless technologies in diversity, as well as in density, to satisfy various communication and service requirements under different environments. Under the highly diversified and dense wireless habitat, the connectivity between specialized heterogeneous wireless technologies offers a great opportunity for advanced services. To this end, researchers recently propose cross-technology communication (CTC) technique, which enables direct connection between heterogeneities only using commodity devices. In the literature, existing CTC works have been categorized as packet-level CTC and physical layer (PHY-layer) CTC. Initial CTC solutions are restricted by the coarse-grained packet-level information and thus their throughputs are restricted to a few tens of bits per second (bps). More recently, researchers take advantage of the PHY-layer information and propose PHY-layer.

SUMMARY

Systems, devices, and techniques are described for allowing a first computing device to a generate a bit sequence corresponding to one or more data packets received from a second computing device, where the first computing device and the second computing device are not configured to operate in accordance with the same wireless protocol. For example, the first computing device may determine one or more parameters associated with a signal that carries the one or more data packets and generate the bit sequence based on the one or more parameters. In some examples, the one or parameters includes one or both of a frequency of the signal and a phase of the signal. Additionally, systems, devices, and techniques are described for allowing a first computing device to receive a data packet from a second computing device and demodulate a payload of the data packet which includes a symbol associated with a wireless protocol that the first computing device is not configured to operate in accordance with.

The techniques of this disclosure may provide one or more advantages. For example, a computing device may be configured for operating in accordance with one or more wireless protocols such as one or more of WiFI®, ZigBee®, and Bluetooth® and the computing device might not be configured for operating in accordance with the one or more wireless protocols. This may represent a technological problem since it may be beneficial for the computing device to communicate with a device that is not configured for operating in accordance with the one or more wireless protocols that the computing device is configured for operating according to. By determining, using a first computing device, a bit sequence for one or more data packets received from a second computing device that is not capable of communicating according to one or more wireless protocols that the first computing device is capable of communicating according to, the first computing device may allow the first computing device to communicate with the second computing device even though the first computing device and the second computing device are not configured to communicate according to the same wireless protocols.

In some examples, a method includes receiving, by a first computing device configured to operate in accordance with a first wireless protocol, one or more data packets via one or more signals output by a second computing device according to a second wireless protocol, where the first computing device is not configured to operate in accordance with the second wireless protocol, determining, by the first computing device, a frequency of the one or more signals, and determining, by the first computing device and using the frequency of the one or more signals, a bit sequence for at least one data packet of the one or more data packets.

In some examples, a method includes receiving, by a first computing device configured to operate in accordance with a first wireless protocol, at least one signal including a data packet, where a payload of the data packet includes an indication of a symbol defined in accordance with a second wireless protocol, where the first wireless protocol is different than the second wireless protocol, and where the first computing device is not configured to operate in accordance with the second wireless protocol, and demodulating, by the first computing device, the payload of the data packet.

In some examples, a method includes receiving, by a first computing device configured to operate in accordance with a first wireless protocol, a polling signal broadcast by a wireless access point in accordance with a second wireless protocol different than the first wireless protocol, and outputting, by the first computing device, a polling response in accordance with the first wireless protocol via one or more frequencies corresponding to a group of subcarrier values.

In some examples, a method includes receiving, by a first computing device configured to operate in accordance with a first wireless protocol, a polling signal broadcast by a wireless access point in accordance with the first wireless protocol; and outputting, by the first computing device, a polling response in accordance with the first wireless protocol via one or more frequencies corresponding to a group of subcarrier values.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 53 is a conceptual diagram of a comparison of Bluetooth® and other CTCs, in accordance with one or more techniques of this disclosure.

DETAILED DESCRIPTION

Figure 1A:
FIGS. 1A-1D are conceptual diagrams including an Internet of Things (IoT) application with the cooperation of heterogeneous wireless technologies, in accordance with one or more techniques of this disclosure.
Figure 1B:
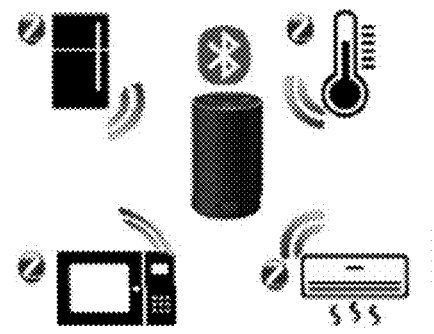
Figure 1C:
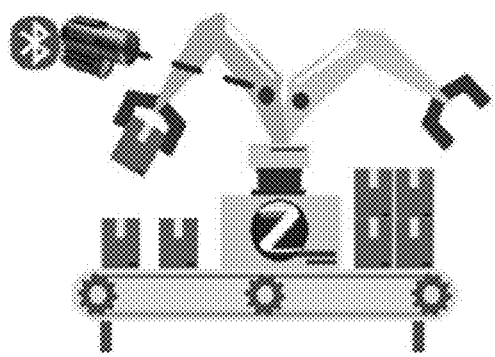
Figure 1D:
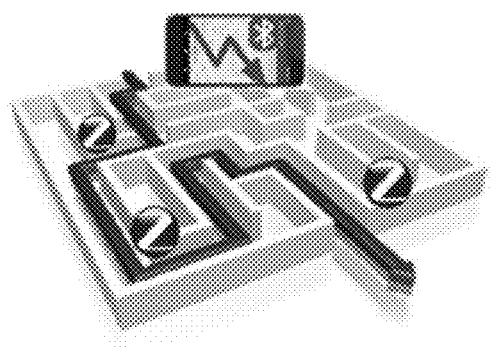

Cross-technology Communication (CTC) is a key technique to explore the full capacity of heterogeneous wireless technologies. The latest CTC designs explore the physical (PHY) layer to reach the standards' maximum rate, but leave a gap to practicality—existing PHY-layer CTCs are commonly transmitter-side techniques requiring a high-end transmitter (with a high degree of freedom in signal manipulation) to emulate the receiver signal closely. This inherently limits the reverse direction (low-end to high-end) communication.

In the techniques described herein, a unique receiver-side CTC fills in the gap and makes a step towards achieving CTC bidirectionality. The techniques described herein are demonstrated as a ZigBee® to BLE communication, where at least one noteworthy innovation lies in the unique mechanism of cross-technology decoding, or cross-decoding in short, which interprets a ZigBee® frame only by carefully observing the bit patterns obtained at the BLE receiver. This is merely one example, however, of the techniques of this disclosure, and similar techniques may be used for ZigBee® to WiFi®, ZigBee® to LTE, BLE to WiFi®, or other cross-protocol communications implemented on the receiver side. Technically, the techniques described herein counter-intuitively explore the sampling offset to overcome the intrinsic challenge due to BLE's narrower bandwidth (1 MHz) than ZigBee® (2 MHz). Extensive implementation and evaluation on universal software radio peripheral (USRP) and commodity devices show that the techniques described herein may reach 250 kbps under 85% reliability, a 15,000× improvement over state-of-the-art ZigBee® to BLE communication. The techniques described herein describe a general method to fill the gap and close the communication loop in the physical layer cross-technology communication.

Previous CTC technologies include transmitter-side CTC with signal emulation. More specifically, by manipulating the payload of a packet in the software, a wireless transmitter (e.g., WiFi® or Bluetooth®) is able to generate a receiver (e.g., ZigBee®) compliant packet. Works in this category yield vastly increased rate reaching the limits defined by the standards. Despite the significant improvement in the data rate and thus practicality, the transmitter-side CTC with signal emulation is applicable typically when the transmitter is a high-end platform (e.g., WiFi®→ZigBee®). This is because powerful radios support sophisticated modulations offering higher degrees of freedom in waveform control with greater capability in signal emulation. However, due to the asymmetric nature of CTC in terms of the transmitter and receiver, the reverse communication, e.g., from a low-end transmitter to a high-end receiver, is limited. This calls for a new fundamental technique that effectively enables the PHY-layer CTC in the case of low-end transmitter incapable of signal emulation due to the radio or computational limits.

Certain techniques described herein include the first receiver-side CTC, which aims at moving the complexity to the receiver side, as opposed to the transmitter-side CTC with signal emulation. This is inspired by the observation that the bit stream yield by any native demodulator reflects some universal and intrinsic properties of the waveform in the air, such as the amplitude, frequency, or phase. In addition, different modulation techniques are intrinsically related. For example, the frequency-shift keying and phase shift keying are tied because the frequency is the time derivative of phase. Therefore, a frequency-shift keying demodulator is able to cross-decode phase-shift keying signal with an upper layer interpreter to recover the phase information from the demodulated bits, which indicates frequency shifts. Specifically, this disclosure describes a receiver-side CTC at Bluetooth® Low Energy (BLE) for cross-decoding ZigBee® packets. At the transmitter side, native ZigBee® packets equivalent to homogeneous communication are sent. At the receiver side, the BLE receiver is able to cross-decode every ZigBee® symbols upon the bits yielding by the native BLE demodulator. This is particularly challenging to achieve on commercial platforms, which hide physical layer signal via abstraction. Through the adoption of cross-decoding, the techniques described herein first achieve PHY-layer CTC from a low-end device to a high-end device. Its data rate is 15,000× higher than the existing packet-level ZigBee® to BLE CTCs, and comparable with the state-of-the-art PHY-layer CTCs through signal emulation, enabling CTC bidirectionality.

The specific technical contribution of certain techniques described herein can be summarized as a PHY-layer CTC uniquely based on cross-decoding at the receiver side. This is achieved by a careful examination of the bit patterns which are observable on commercial BLE devices, which enables the techniques described herein to operate without any hardware or firmware modification. Most importantly, the transmitter side stays the same as in homogeneous communication.

Certain techniques described herein explore the opportunity within the sampling offset, to overcome the intrinsic uncertainty in cross-decoding. This is counterintuitive as sampling offset is detrimental to decoding, and is compensated in normal communication. The techniques described herein also feature link layer designs including scheduling protocol that ensures compatibility with the BLE standard as well as non-disruptiveness to other devices in the BLE network.

Certain techniques described herein are implemented for extensive evaluation on its rate, reliability under various environment and parameter setting. Certain experiment results have shown that the techniques described herein can achieve 250 kbps with 85% accuracy, increasing the data rate of the existing packet-level CTCs by 15,000×, and comparable to the state-of-the-art PHY-layer CTCs.

Spectrum sharing is becoming even more prevalent with the explosively growing body of wireless devices and standards, as well as expanding open spectrum—from traditional 5 GHz, 2.4 GHz, and 900 MHz bands to 600 MHz, TV spectrum, and 7 GHz high-frequency which turned unlicensed recently between 2014-2016. Spectrum crowded with diverse wireless technologies with incompatible physical layers inevitably leads to cross-technology interference (CTI), which becomes one of the root causes of network performance degradation.

To this end, connectivity among heterogeneous technologies is critical to alleviate CTI and, at the same time, explore the potential of cross-technology collaboration. In other words, to draw the full capability of wireless-rich IoT, Cross-technology communication (CTC) aims at building the direct communication among heterogeneous wireless technologies. Existing CTC works can be categorized as packet-level CTC and the PHY-layer CTC. Packet-level CTC works have intrinsic limitations, while within PHY-layer CTC, all existing works are based on transmitter-side signal emulation.

Limitations of Packet-Level CTC may exist. Earlier set of CTC designs use packet level information, such as the packet duration, beacon interval, data traffic pattern, and energy amplitude to convey messages across technologies. Such approaches, due to the coarse packet-level granularity, have intrinsic limitations in the data rate confined to a few tens bps at the highest.

Limitations of Existing PHY-layer CTC may exist. To overcome these limits, the latest CTC designs utilize fine-grained physical layer information for high-speed CTC that approach the maximum rate defined by the standard. Technically, PHY-layer CTC introduced until now are based on transmitter-side signal emulation, where the transmitter approximates the target waveform by exploring the signal degree of freedom offered by the transmitter's modulator. For example, a WiFI® to ZigBee® PHY-layer CTC is described. The WiFI® transmitter carefully selects payload where the corresponding OFMD QAM constellation points approximate that of the ZigBee® OQPSK signal so that the emulated signal can be demodulated by the ZigBee® receiver with its native demodulator.

Despite PHY-layer CTC's significant advancement in the data rate, the technique of signal emulation—which the current PHY-layer CTC designs are commonly dependent upon—applicable only for a higher-end transmitter to a lower-end receiver scenario. This is because sophisticated radios in higher-end systems offer higher degrees of freedom in modulation. In other words, they support assembling (e.g., modulating) complicated signals (e.g., OFDM QAM in WiFI®), and therefore are more capable of emulating simpler signals desired at lower-end receivers (e.g., OQPSK in ZigBee®). Due to this technical reason and the asymmetric nature of CTC, PHY-layer CTC in reverse direction, from a lower-end transmitter to a higher-end receiver, is difficult to achieve through the known technique (e.g., signal emulation) and remains an open issue.

Internet of things (IoT) are rapidly expanding to every aspect of daily life, from home automation, smart healthcare to transportation and education, with more than 75.44 billion IoT devices by 2025. However, the rapid deployment of IoT devices impose severe challenges on the existing wireless systems. To support Internet connectivity, a widely adopted solution is to deploy an IoT gateway. Due to the expensive deployment cost, the number of IoT gateways is very limited. Given this limited accessibility, it is infeasible to provide ubiquitous coverage for emerging IoT applications.

The rapid deployment of IoT devices calls for the ubiquitous Internet connectivity for seamless data uploading. To address this fundamental problem, various other techniques are described herein, which repurpose billions of commodity WiFi® devices as IoT gateways for bridging IoT devices to the Internet ubiquitously. These techniques, as described herein, analyze the payload in the demodulated WiFi® packet for decoding multiple IoT transmissions in parallel. Specifically, these techniques described herein first disentangle parallel IoT transmissions from a single WiFi® demodulated packet and then adopts novel decoding techniques to further improve the reliability. Since the techniques described herein rely on the payload available in the commodity device, it requires no hardware nor firmware modification, incurring zero deployment cost. A comprehensive evaluation demonstrates that the techniques described herein are able to receive 8 Bluetooth® or 2 ZigBee® in parallel with 97% accuracy, thus offering ubiquitous connectivity with high reliability. In addition, the techniques described herein achieve the maximum throughput of 3.2 Mbps, 4 times compared with the traditional gateway.

Various techniques described herein provide multiple benefits that may be practically applied. WiFi® access points have been ubiquitously deployed over the last 10 years to provide the Internet access for billions of WiFi® devices. By reusing these pervasively deployed WiFi® infrastructures as IoT gateways with only software upgrade, the techniques described herein may fully cover billions of IoT devices with zero deployment cost and pave the way for thousands of IoT applications.

To meet the emerging need of sharing IoT data to the Internet, ubiquitous connectivity is a necessity. For example, Bluetooth® healthcare wearables are required to seamlessly report medical data to cloud while mobile ZigBee® sensors in the environment monitor system need to upload the various sensing data periodically to the remote server. The state-of-the-art solution of IoT data collection is to deploy IoT gateways for connecting them to the Internet. Although effective, due to the high hardware and deployment cost, IoT gateways are far from ubiquitous, but only at a limited scale. This inherently hinders the ubiquitous connectivity for emerging IoT applications, especially mobile applications.

In addition, WiFi® has significantly higher bandwidth (20 MHz) than narrowband IoT devices, e.g., ZigBee® (2 MHz). One WiFi® device may potentially receive from up to 8 BLE or 4 ZigBee® devices in parallel, dramatically improving the throughput of the dense IoT devices.

Various techniques described herein include a physical-layer cross-technology communication (CTC) technology that enables heterogeneous IoT devices to upload data to a commodity WiFi® receiver. Different from existing CTC that focus on downlink communication or inter-IoT communication, the techniques described herein address several unique challenges. First, since WiFi® receiver decodes the signal over the entire 20 MHz spectrum as one WiFi® frame, IoT transmissions in separated narrowbands could be severely entangled in the decoded payload. By elaborately analyzing and disentangling the decoded bit stream, certain techniques described herein are able to separate the IoT waveform in each narrowband. Second, designed for the WiFi® protocol, the commodity WiFi® receivers will discard some received signal during its demodulation procedures, e.g., cyclic prefix (CP) removal and parity removal, leading to irreversible signal erasure. To offer reliable data uploading, the techniques described herein introduce IoT technology-specific demodulation techniques.

Techniques described herein enable physical-layer CTC from commodity IoT devices to commodity WiFi® devices, thus providing the ubiquitous connectivity for these IoT devices with zero deployment cost. In various examples, it is completely software-implementable and ready to be installed in billions of deployed WiFi® devices with only software upgrade.

Techniques described herein disclose a generic design that enables multiple IoT devices of varying technologies to concurrently upload data to WiFi®. Technically, by analyzing the received WiFi® payload, the techniques described herein proofs the feasibility to disentangle parallel IoT waveforms from a single WiFi® bit stream. the techniques described herein also introduces several novel techniques to combat the signal erasure due to the WiFi® hardware limitation.

Techniques described herein may be implemented on COTS WiFi® devices, e.g., RTL8812au, and evaluate the techniques described herein across various scenarios. The experiment results demonstrate that the techniques described herein is able to concurrently receive 2 streams of ZigBee® and 8 streams of BLE with 97% accuracy while reaching a throughput of 3.1 Mbps, 4 times of traditional gateway approach.

The motivation to reuse the ubiquitous WiFi® devices as generic gateways for the IoT data uploading is due to the deficiency of IoT gateways. The techniques described provide multiple benefits that may be practically applied. Over the last ten years, more than 20 billion WiFi® devices have been installed, covering almost every corner of the world. These ubiquitous WiFi® infrastructures could potentially offer IoT devices pervasive Internet connectivity with zero deployment cost. However, reusing WiFi® as IoT gateways is extremely challenging on commodity WiFi® devices that only have access to the demodulated payloads.

First, the 20 MHz WiFi® bandwidth covers 8 BLE channels or 4 ZigBee® channels. In other words, demodulated WiFi® payload is a mixture of multiple parallel IoT transmissions within the entire 20 MHz bandwidth. A WiFi® receiver needs to disentangle the mixed signal and separate ZigBee® and BLE signal on distinct channels from a demodulated WiFi® payload. The uploading of IoT data to a commodity WiFi® device, especially with parallel IoT data, is not well covered by existing CTC works that mainly focus on inter-IoT or downlink scenarios.

Second, the irreversible demodulation procedure at commodity WiFi® receivers is another challenge to overcome. Raw PHY layer signal information is partially lost during the demodulation procedure to get the payload bits. It is challenging to recover IoT data from the received WiFi® payloads.

In summary, the limited IoT gateways deployed in the field may hardly satisfy the need for ubiquitous Internet connectivity in IoT devices. Reusing the pervasive WiFi® devices as IoT gateways is a zero-cost alternative, and various techniques described herein may overcome the challenges coming from heterogeneous and commodity devices.

FIGS. 1A-1D are conceptual diagrams including an Internet of Things application with the cooperation of heterogeneous wireless technologies, in accordance with one or more techniques of this disclosure. The techniques described herein are motivated by the fundamental but missing piece—enabling PHY-layer CTC from lower-end transmitted to higher-end receiver—which is the key technique to achieve bidirectional communication in PHY-layer CTC. This is achieved by enabling cross-decoding of the native transmitter packet at the receiver. For example, a commercial BLE device (receiver) runs a mechanism that interprets the message within an unmodified ZigBee® (transmitter) packet. In other words, cross-decoding is pushing the complexity to the receiver side (conversely to the signal emulation) which is the higher-end. Along with the previous designs, this is an important aspect to accomplishing PHY-layer CTC in all directions, thus bringing true ubiquitous connectivity among heterogeneous wireless systems and further, enabling cross-technology channel negotiations and advanced collaborations in practice. Various techniques described herein focus on the cross-decoding of ZigBee® packets at a BLE receiver, which is a missing piece left by existing transmitter-side signal emulation. The CTC between ZigBee® and Bluetooth®, the two most popular technologies in IoT will trigger a lot of interesting applications as illustrated in FIG. 1, such as (a) In the gym, workout equipment attached with ZigBee® radio can communicate with the wearable Bluetooth® devices to make customized workout plan; (b) In the smart home, smart devices with ZigBee® radio are able to associate to the Bluetooth® speaker to play essential messages; (c) In the factory, ZigBee® sensors can notify a Bluetooth® camera to monitor the pipeline when abnormal events are detected; (d) In the indoor navigation, the ZigBee® landmarks can help smartphones achieve fine-grained navigation.

Figure 2:
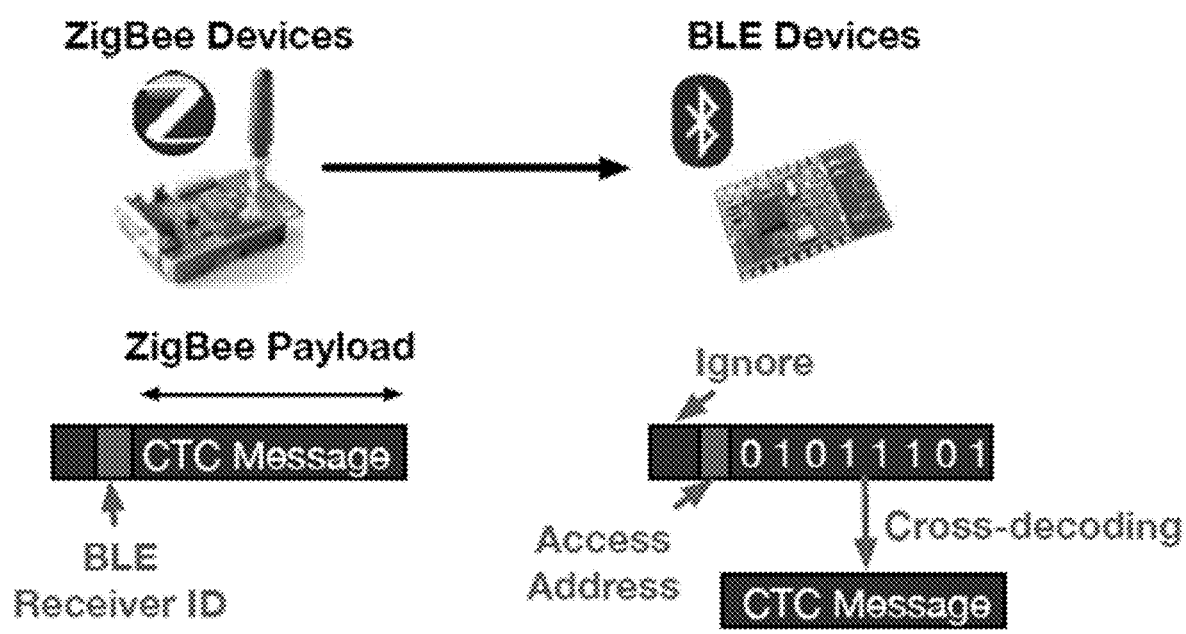
FIG. 2 is a conceptual diagram of a system architecture that executes one or more techniques of this disclosure.

FIG. 2 is a conceptual diagram of a system architecture that executes one or more techniques of this disclosure. The techniques described herein are a PHY-layer CTC supporting CTC message from ZigBee® to BLE with receiver-side cross-decoding. By pushing the complexity to the receiver side, e.g., the BLE side, the techniques described herein support transmitting CTC messages in native ZigBee® symbols. The BLE receiver simply demodulates all the input ZigBee® signal into BLE bits. Then, a cross-decoding module will interpret the demodulated bits into original ZigBee® symbols to recover the CTC message. To trigger the cross-decoding as well as specify the receiver, a specific ZigBee® symbol sequence is chosen to work as a BLE receiver ID, as illustrated in FIG. 2, which will match a manipulated BLE access address at the receiver side.

The techniques described herein are the first PHY-layer CTC based on receiver-side cross-decoding. By pushing the complexity to the receiver, it covers the a missing piece left by the state-of-the-art PHY-layer CTC based on transmitter-side signal emulation, paving the way to accomplish PHY-layer CTC in all directions. In addition, the techniques described herein are friendly to the transmitter, for the messages are in native ZigBee® symbols. Finally, techniques described herein need no hardware or firmware modification at either the transmitter or receiver, making it easy to deploy onto millions of existing ZigBee® and BLE devices.

Figure 3:
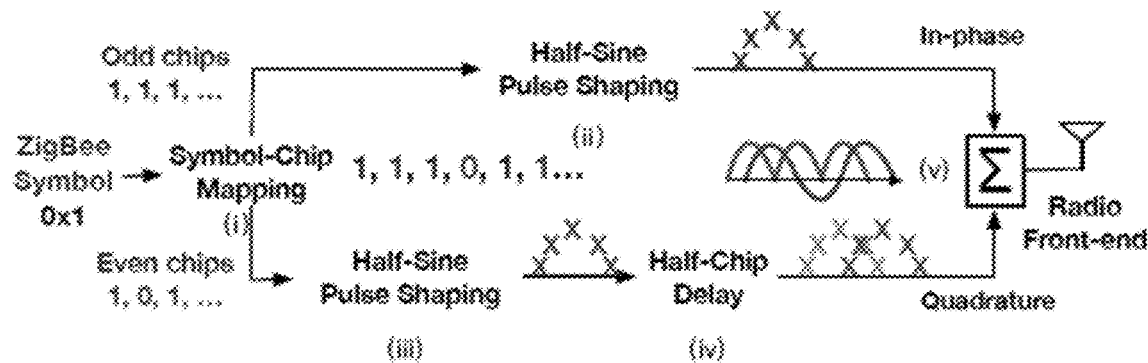
FIG. 3 is a conceptual diagram of a transmission process, in accordance with one or more techniques of this disclosure.

FIG. 3 is a conceptual diagram of a transmission process, in accordance with one or more techniques of this disclosure. ZigBee® adopts direct sequence spread spectrum (DSSS) and offset quadrature phase-shift keying (OQPSK) in its modulation. FIG. 3 illustrates the whole procedure from a ZigBee® symbol to the transmitted I/Q signal in the air from step (i) to (v). A ZigBee® symbol is the minimum unit of a ZigBee® frame. Each ZigBee® symbol contains 4-bit information, e.g., from symbol '0x0' to symbol '0xF'. In the PHY layer, a ZigBee® symbol first goes through DSSS, where each ZigBee® symbol will be extended to 32 chips according to the symbol-chip mapping table, e.g., Table 1, in the IEEE 802.15.4 standard, as illustrated in step (i). Then the 32 chips will go through the OQPSK modulation, where the odd chips are allocated to the in-phase and the even chips are allocated to the quadrature. Both the in-phase and quadrature chip sequences will go through a half-sine pulse shaping module, as illustrated in step (ii) and (iii), to shape the chips to a sinusoidal wave. What unique in OQPSK is that the quadrature chip sequence will further have a half-chip delay, as illustrated in step (iv). Finally, the in-phase and quadrature signals are merged and transmitted to the air.

TABLE 1

Symbol-to-chip mapping in ZigBee ® (802.15.4)

| Symbol (4 bits) | Chip Sequence (32 bits) |
| --- | --- |
| 0x0 | 11011001110000110101001000101110 |
| 0x1 | 11101101100111000011010100100010 |
| ... | ... |
| 0xF | 11001001011000000111011110111000 |

Figure 4:
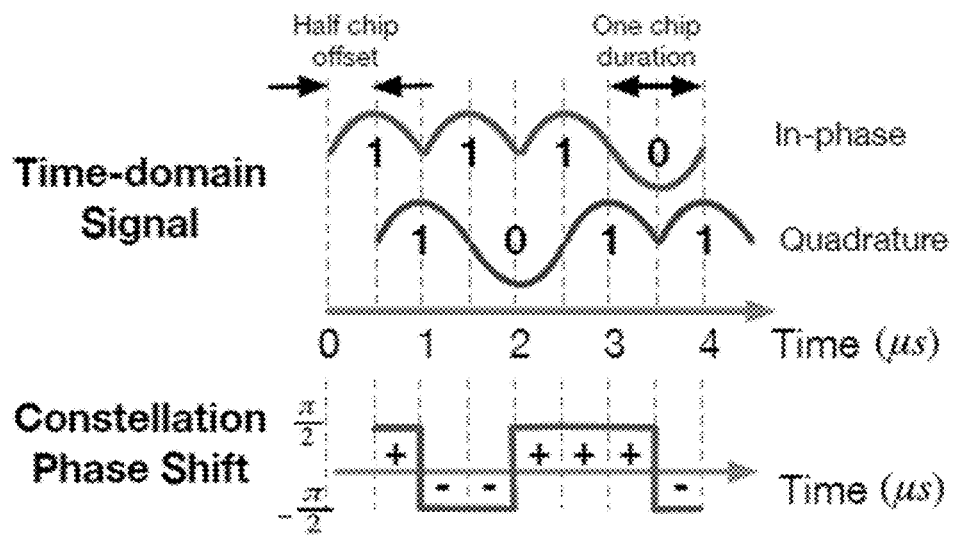
FIG. 4 is a conceptual diagram of a time-domain signal and phase shift of a transmission symbol, in accordance with one or more techniques of this disclosure.

FIG. 4 is a conceptual diagram of a time-domain signal and phase shift of a transmission symbol, in accordance with one or more techniques of this disclosure. The transmitted ZigBee® signal shows particular property in the constellation. In FIG. 4, the time-domain signal of the first 8 chips of ZigBee® symbol '1' is plotted. Each ZigBee® chip lasts 1 µs. In the constellation, the change in phase between consecutive samples, referred to as the phase shift, is calculated. Due to the half-chip offset in OQPSK, the phase shifts will only take two values $$\frac{\pi}{2} \text{ or } -\frac{\pi}{2},$$

representing positive or negative phase shifts.

Figure 5:
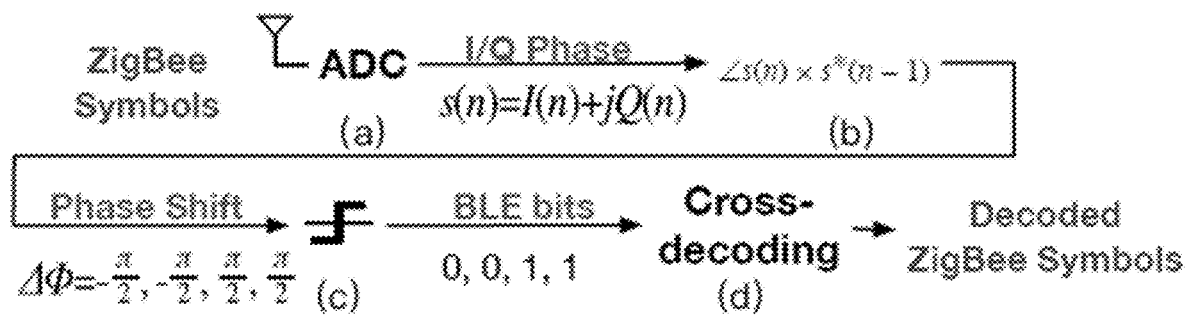
FIG. 5 is a conceptual diagram of a receiving process, in accordance with one or more techniques of this disclosure.

FIG. 5 is a conceptual diagram of a receiving process, in accordance with one or more techniques of this disclosure. BLE receiver In the PHY layer, BLE adopts the Gaussian Frequency Shift Keying (GFSK), where each BLE bit indicates either a positive or a negative frequency shift. As illustrated in FIG. 5, at the demodulator, BLE adopts the Quadrature de-modulator to detect frequency shifts through the phase shifts. More specifically, a BLE receiver first samples the channel, e.g., gets the complex I/Q samples $s(n)=I(n)+jQ(n)$, in step (a) and feeds to its demodulator. The demodulator calculates the change in phase, e.g., the phase shifts, between consecutive I/Q samples to figure out the signal frequency shift. More specifically, the BLE demodulator uses the formula arctan $(s(n) \times s^*(n-1))$, where $s^*(n-1)$ is the conjugate of $s(n-1)$ in step (b). In step (c), the phase shifts are quantized to be BLE bit 0 or 1 according to the sign of phase shifts to be negative or positive. Finally, the cross-decoding block, illustrated in step (d), interprets the BLE bits yielding from the native demodulator to ZigBee® symbols. Since each BLE bit lasts 1 µs, while each ZigBee® lasts 16 µs, 16 BLE bits are interpreted as one ZigBee® symbol.

Cross-decoding is feasible due to the following two technical insights. First, the phase shift is the intrinsic feature of phase modulated signal such as ZigBee® signal and is also used at the BLE receiver to figure out signal frequency shift. Second, at the BLE receiver, the phase shifts are quantized so that only the sign (+/−) of the phase shifts matters, which brings a lot of freedom in cross-decoding.

However, the challenges come from the fact that the BLE bandwidth is 1 MHz, only half that of ZigBee®. The low bandwidth is corresponding to the low sample rate, or equivalently the larger sample interval according to the Nyquist theorem. As a result, BLE receiver is not able to get full ZigBee® symbol information from sampling.

Techniques described herein core technique of cross-decoding interprets ZigBee® packet only from the bit patterns obtained at the BLE receiver, making the design fully compatible with commercial devices. To achieve this, insights are shown on BLE output bits when it is fed with different ZigBee® signals, which can be inversely applied to derive ZigBee® chips (and thus symbols)—e.g., cross-decoding. The limited bandwidth of BLE (1 MHz) compared to ZigBee® (2 MHz) makes BLE bits only partially reflect ZigBee® signal.

Figure 6:
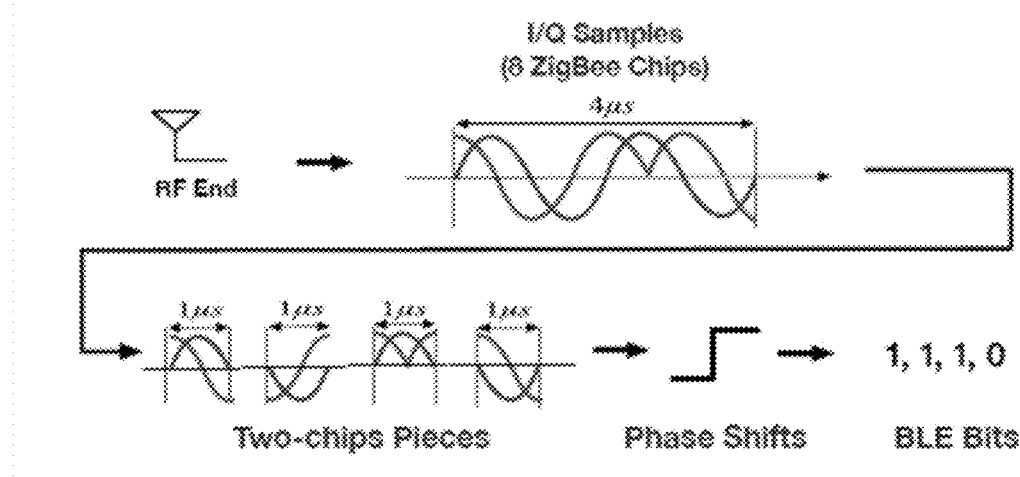
FIG. 6 is a conceptual diagram of a receiver deciphering the bits of a transmission signal, in accordance with one or more techniques of this disclosure.

FIG. 6 is a conceptual diagram of a receiver deciphering the bits of a transmission signal, in accordance with one or more techniques of this disclosure. FIG. 6 walks through an example with 8 ZigBee® chips lasting 4 µs. At the BLE receiver, ZigBee® chips are first cut into four 1 µs pieces. Each piece is referred to as the two-chip piece for its containing the phase shift information of two ZigBee® chips. A two-chip piece will finally be demodulated as a single BLE bit '1' or '0' according to the accumulated phase shift.

Figure 7:
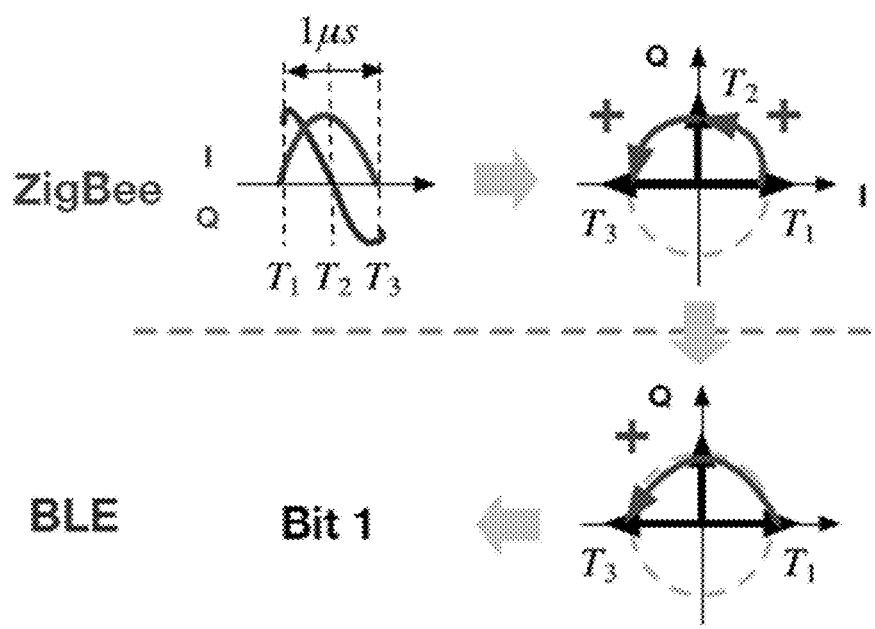
FIG. 7 is a conceptual diagram of a bit when phase shifts in two chips are consistent, in accordance with one or more techniques of this disclosure.

FIG. 7 is a conceptual diagram of a bit when phase shifts in two chips are consistent, in accordance with one or more techniques of this disclosure. FIG. 7 takes a closer look at the demodulation of the two-chip pieces. The two chips may incur consecutive two positive (++) phase shifts, as shown in FIG. 7. In FIG. 7, ZigBee® has a π/2 phase shift every 0.5 μs, from $T_1$ to $T_2$ and from $T_2$ to $T_3$. The BLE receiver, however, with its bandwidth limited to 1 MHz, samples at only $T_1$ and $T_3$. The accumulated phase shift from $T_1$ to $T_3$ is positive, (e.g., π), so BLE outputs bit '1'. Similarly, BLE conveys bit '0' upon two chips with both negative (−−) phase shifts. This demonstrates the clear relationship between consistent two-chip pieces and the BLE bits, which, however, does not hold when phase shifts due to the two chips are inconsistent (e.g., '+−' or '−+').

Figure 8:
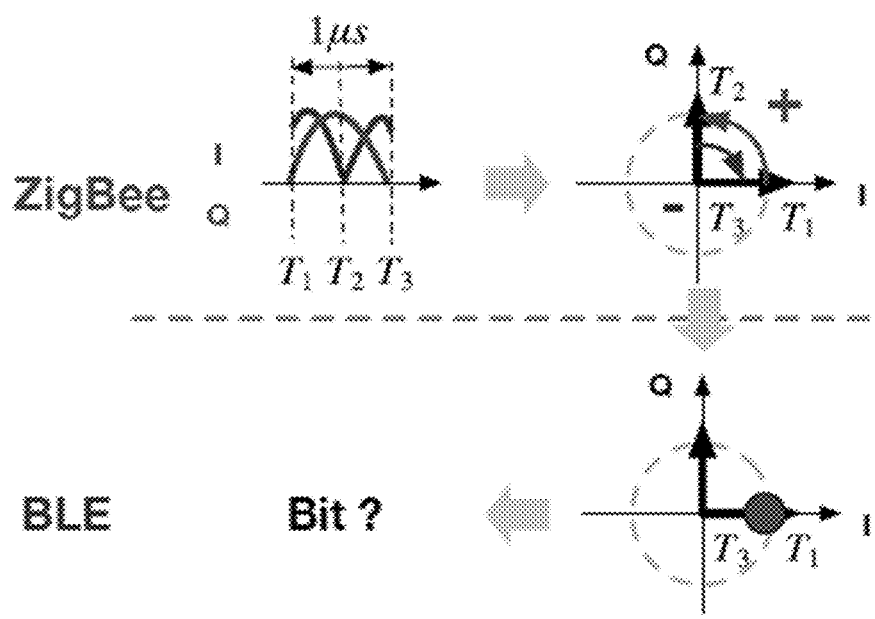
FIG. 8 is a conceptual diagram of an inconsistent phase shift, in accordance with one or more techniques of this disclosure.

FIG. 8 is a conceptual diagram of an inconsistent phase shift, in accordance with one or more techniques of this disclosure. The impact of inconsistent phase shift: FIG. 8 illustrates the inconsistent phase shift case, e.g., one positive and one negative. In the figure, the phase shifts from T_1 to T_2 and T_2 to T_3 are different in the constellation, which makes the overall phase shift 0 theoretically. In this case, the techniques described herein are not able to determine the final BLE bit, which are referred to as the undetermined bits. However, in a practical system, the phase shift will not stay at 0, factors such as the unsynchronized transmitter and receiver or the signal distortion in the air, will break the balance and make the final phase shift prone to either the positive or the negative side.

Figure 9:
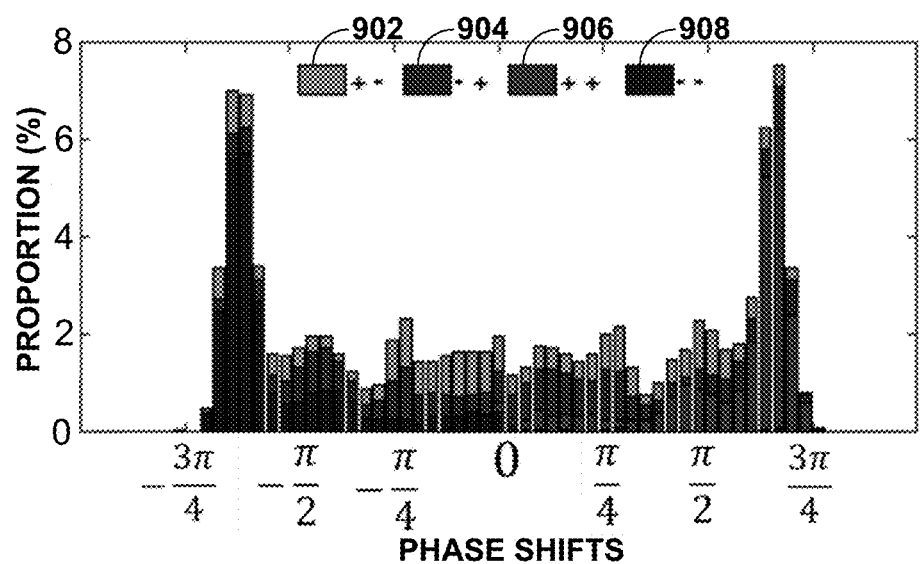
FIG. 9 is a conceptual diagram of a phase shift distribution, in accordance with one or more techniques of this disclosure.

FIG. 9 is a conceptual diagram of a phase shift distribution, in accordance with one or more techniques of this disclosure. As a proof of concept, FIG. 9 shows a USRP BLE receiver to demodulate over 1000 random ZigBee® symbols, and outputs the phase shift of each two-chip piece before interpreting them into BLE bits. The distribution of the phase shift of the four possible groups of the ZigBee® two-chip pieces is plotted, according to the combinations of '+' and '−', e.g., group 902 ('+−'), group 904 ('−+'), group 906 ('++'), and group 908 ('−−'). Almost all the phase shifts of group 906 ('++') and group 908 ('−−') are positive and negative respectively, which will be uniquely demodulated as BLE bits '1' and '0' respectively. Group 902 and group 904 cannot be uniquely demodulated, because they distribute on both the positive and negative sides. In addition, the phase shifts of group 906 ('++') and group 908 ('−−') are mostly over R/2 or less than −π/2, while that of the other two groups accumulate near ±π/4. That is because consistent phase shifts (e.g., '++' and '−−') will sum up, while inconsistent phase shifts (e.g., '+−' and '−+') will cancel out each other.

Figure 10:
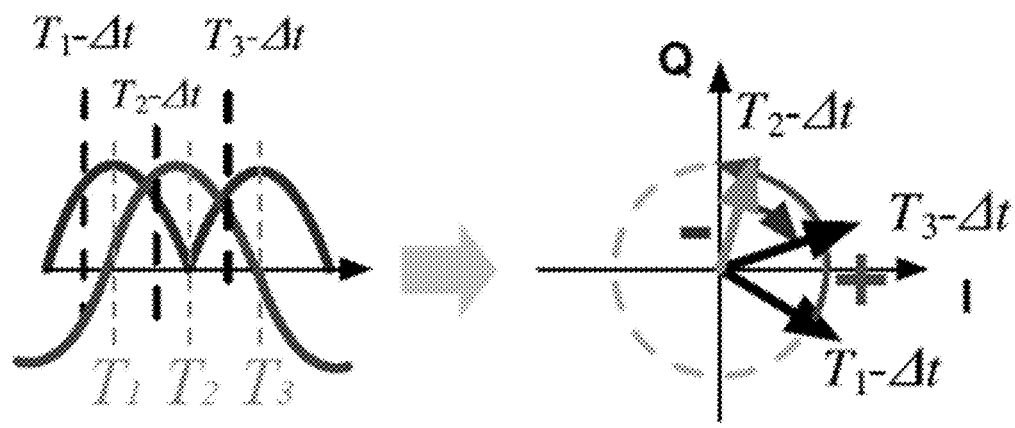
FIG. 10 is a conceptual diagram of a sample offset, in accordance with one or more techniques of this disclosure.

FIG. 10 is a conceptual diagram of a sample offset, in accordance with one or more techniques of this disclosure. The actual output of undetermined bits largely depends on the sample offset between the transmitter and receiver, when they are not well synchronized. The sample offset may become prone to either the left or the right of the two-chips piece boundary. Without loss of generality, FIG. 10 illustrates the case when the samples have a left offset from the boundary $T_1$, $T_2$, and $T_3$ by Δt. In the constellation, the unsynchronized samples extend the duration of positive phase shifts, e.g., the arrow from $T_1$−Δt to $T_2$, and shorten that of the negative phase shift, e.g., the arrow from $T_2$ to $T_3$−Δt. The positive phase shift dominates and makes the two-chip piece demodulated as BLE bit '1'. Certain techniques described herein may not analyze the two-chip pieces one by one. Due to the relatively stable sample interval during a short time, e.g., within a ZigBee® packet, all the samples share the same sample offset and can be derived accordingly. The stable sample interval also greatly reduces the computation cost. For n undetermined bits, the techniques described herein may not calculate 2^n variations, but only 2, either all the samples have a left offset or all have a right offset.

Figure 11A:
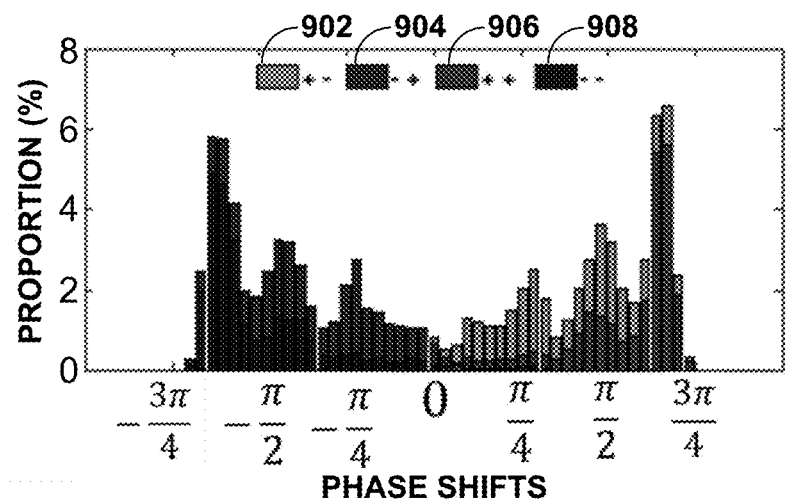
FIGS. 11A-11B are conceptual diagrams of a distribution of four groups of two-chip piece with different sample offsets, in accordance with one or more techniques of this disclosure.
Figure 11B:
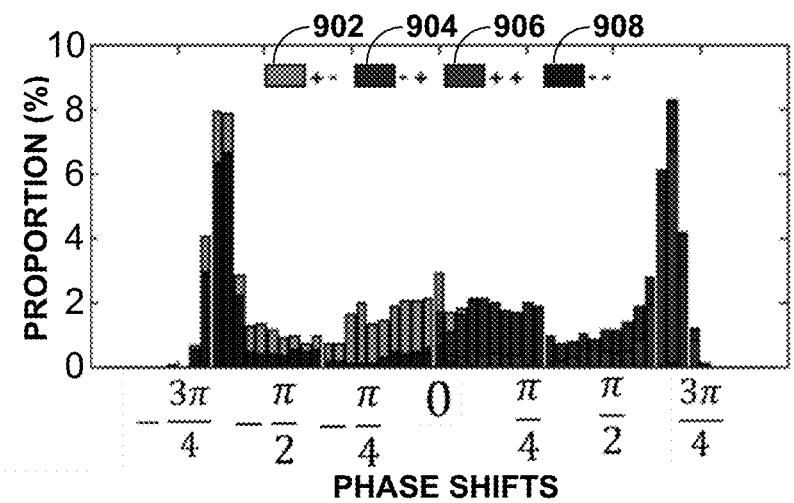

FIGS. 11A-11B are conceptual diagrams of a distribution of four groups of two-chip piece with different sample offsets, in accordance with one or more techniques of this disclosure. As a proof of concept, FIGS. 11A and 11B illustrate the impact on phase shift distribution given the knowledge of sample offset. Here use the same data as in FIG. 9, but first separate the data based on the sample offset of a packet to be left (FIG. 11A) or right (FIG. 11*b*). The ZigBee® two-chip pieces group 902 ('+−') and group 904 ('−+') can now be uniquely demodulated. More specifically, the overall phase shift is positive if a two-chip piece '+−' offset to the left and negative if it offsets to the right. Vice versa for the '−+' case. The results back up the finding that it is the sample offset that affects the actual output of undetermined two-chip pieces.

Figure 12:
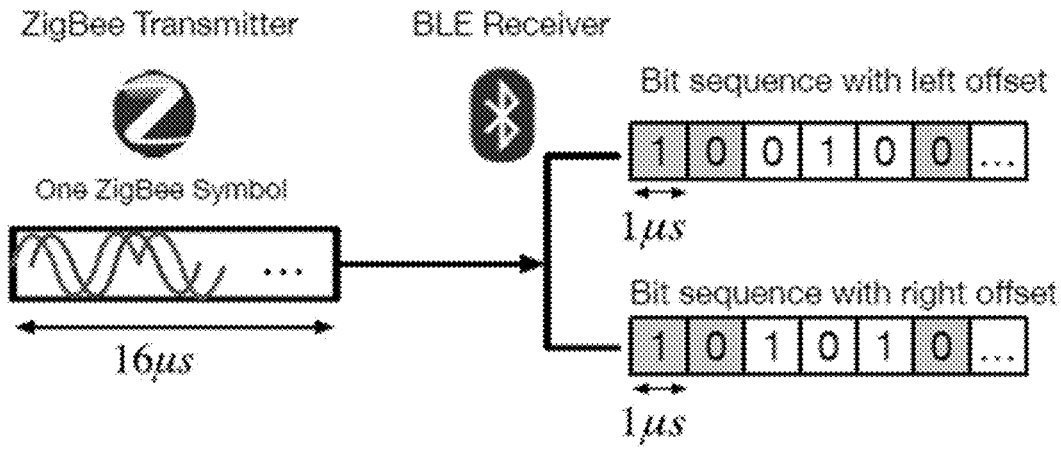
FIG. 12 is a conceptual diagram of generating multiple potential bit sequences, in accordance with one or more techniques of this disclosure.

FIG. 12 is a conceptual diagram of generating multiple potential bit sequences, in accordance with one or more techniques of this disclosure. The above discussion showed how a ZigBee® symbol may yield two different bit sequences depending on (left or right) sample offset at the BLE receiver. The original ZigBee® symbols may be recovered (e.g., cross-decoded) from the two-bit sequences, as shown in FIG. 12. The determined bits (from consistent phase shift) are marked as grays boxes, where they remain the same regardless of the left/right offset. Conversely, undetermined bits (from inconsistent phase shift), indicated as white boxes, depends on sample offset. In other words, the two-bit sequences yield from left/right sample offset share the same bits in gray boxes, where those in white boxes are flipped (0↔1). Recall that there are 16 ZigBee® symbols; since each symbol may yield two-bit sequences at the BLE receiver, cross-decoding turns out to be simply mapping each of the 32 possible bit sequences to a most likely ZigBee® symbol. This is formulated as two matrices that map bit sequences to the corresponding ZigBee® symbols, where one matrix holds the mapping for 16-bit sequences under left sample offset while the other holds those under right sample offset.

Figure 13:
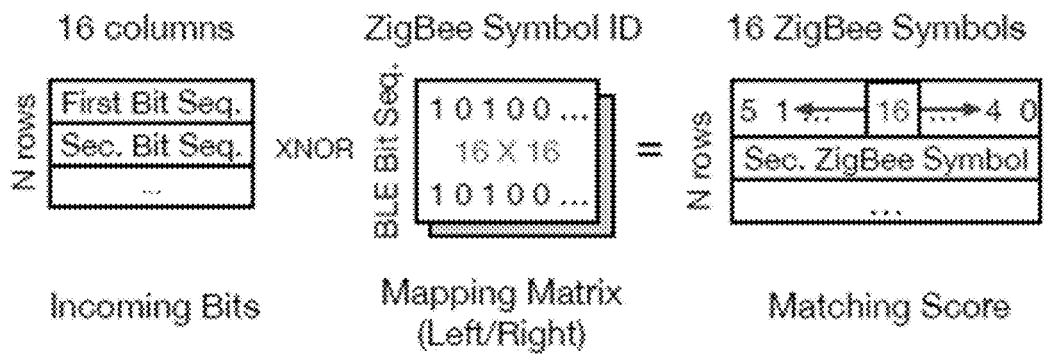
FIG. 13 is a conceptual diagram of a cross-decode of ZigBee® symbols through BLE bit mapping, in accordance with one or more techniques of this disclosure.

FIG. 13 is a conceptual diagram of a cross-decode of ZigBee® symbols through BLE bit mapping, in accordance with one or more techniques of this disclosure. FIG. 13 illustrates the process of cross-decoding via matrix mapping. The bit sequence output at the commercial BLE receiver is cut into small chunks of length 16 to match the duration of a ZigBee® symbol (e.g., 16 us). As the received bits are naturally prone to error in practice, each 16-bit sequence is compared with the ideal bit sequence corresponding to the ZigBee® symbols under left/right sample offset—in other words, each column of the left/right mapping matrix. Specifically, this is computed by XNOR between the input bit sequence and the ideal bit sequence, which yields the number of bit match between the two. The ZigBee® symbol that corresponds to the ideal bit sequence with the maximum bit match is the result of cross-decoding. From cross-decoded ZigBee® symbols, the techniques described herein extract the message including frame header, payload, and FCS. Mapping matrices may be constant as therefore the techniques described herein computationally lightweight, enabling non-disruptive operation under low-end BLE devices. Specifically, the computational cost is only O(n), where n is the number of input bits.

To summarize, the techniques described herein cross-decode ZigBee® symbols directly from the bits retrieved from a commercial BLE device. By smartly leveraging sampling offset, an unavoidable phenomenon in practice, the techniques described herein effectively recover original ZigBee® symbols under very light-weight computation. That is, surprisingly, the techniques described herein successfully receive 2 MHz-wide ZigBee® signal using BLE hardware constrained to 1 MHz bandwidth.

According to the BLE frame format, a 32-bit access address is attached ahead of any BLE frame, which is used to identify the BLE frame in a specific BLE connection. Its value can be determined by the user and shared between the transmitter and receiver in the association process. In the techniques described herein, for each ZigBee®-to-BLE connection, the techniques may assign a unique receiver ID at the ZigBee® transmitter before any CTC message, as illustrated in FIG. 2. This receiver ID is in native ZigBee® symbol, and lasts 2-symbol long, corresponding to 32 BLE bits. At the BLE receiver side, use the 32 BLE bit sequence corresponding to the 'receiver ID' as the access address. Then the ZigBee® packet can be recognized by the BLE receiver as a valid BLE packet and go further into the demodulation and cross-decoding. In addition, as described above, a receiver ID in ZigBee® symbols will correspond to two BLE bit sequences depending on the sample offset. In the access address detection, bit sequences may match either access addresses due to different sample offsets to pass. By looking at which access address matches the receiver ID, the receiver may figure out whether there exists a left offset or right offset between the transmitter and receiver and choose the corresponding mapping matrix for cross-decoding.

Figure 14:
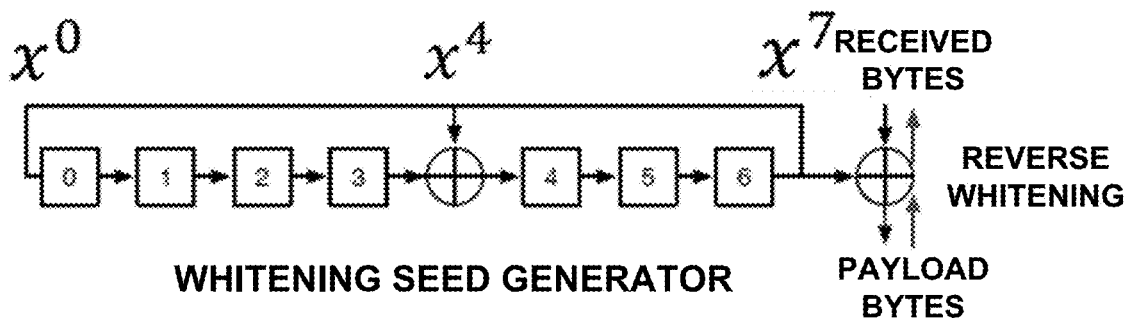
FIG. 14 is a conceptual diagram of reverse BLE data whitening, in accordance with one or more techniques of this disclosure.

FIG. 14 is a conceptual diagram of reverse BLE data whitening, in accordance with one or more techniques of this disclosure. Direct access to the BLE bit stream from the native demodulator may be assumed for the simplicity of description. However, in a real BLE platform, access may only be for the payload bytes. Between the raw BLE bytes and the payload bytes, for the security issue, there is a scrambler layer, known as the data whitening. The data whitening process in BLE is through a linear-feedback shift register (LFSR) shown in FIG. 14. More specifically, the LFSR circuit will output a scramble seed which is used 'whiten' the received bytes by doing the XOR operation with them. The scramble seed is initialized as the channel number (e.g., from 0 to 39) and change iteratively after each byte through the formula $x^7+x^4+1$ as shown in FIG. 14. To recover the raw BLE bytes from the payload bytes, the techniques described herein may generate the same sequence of BLE scramble seeds and XOR them byte by byte with the BLE payload bytes.

Figure 15:
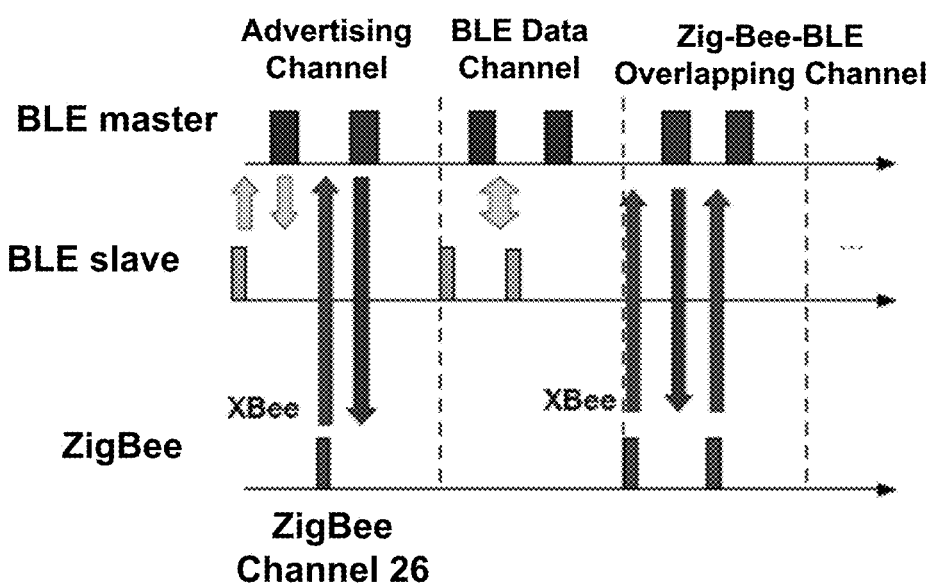
FIG. 15 is a conceptual diagram of ZigBee® devices in a BLE network, in accordance with one or more techniques of this disclosure.

FIG. 15 is a conceptual diagram of ZigBee® devices in a BLE network, in accordance with one or more techniques of this disclosure. Two specific difference between ZigBee® and BLE network are that BLE devices use association and will do frequency hopping. To break the barrier between ZigBee® and BLE, the MAC layer association and channel scheduling methods may be designed. BLE association and frequency hopping works as follows: The 40 BLE channels, e.g., channel 0 to 39, are classified as the 3 advertising channels, e.g., 37, 38, 39, and 37 data channels. Before communication, two BLE devices must first associate at one of the three advertising channels. More specifically, one BLE device, referred to as the BLE slave device, will keep broadcasting its availability for connection through an advertising packet. Another device, referred to as the BLE master device, will choose to connect to the BLE slave device by replying 'request connection' message and necessary connection parameters, such as the channel hopping increment in frequency and the hopping interval in time. Then they will exchange packets following the associated channel hopping schedule as illustrated in FIG. 15.

Similarly, in certain techniques described herein, the association protocol between a ZigBee® device and the BLE network is designed so that the ZigBee® device can connect to existing BLE network. A ZigBee® device will start by broadcasting its availability for connection with a specific receiver ID at ZigBee® channel 26, which is also BLE broadcasting channel 39. If the BLE master device is willing to connect to a ZigBee® device, it will listen for a specific access address corresponding to the ZigBee® receiver ID, besides the normal access address for BLE advertising packets. After receiving the request from the ZigBee® device, the BLE master device will use signal emulation technique to reply necessary connection information, such as the hopping increment and hopping interval in a ZigBee® compliant frame. The ZigBee® device can either choose to follow BLE's hopping schedule on the ZigBee®-BLE overlapping channels if it supports frequency hopping, e.g., the WirelessHart ZigBee® protocol, or stay on one overlapping channel and wait for the arrival of the BLE device at most after 37 hops.

The join of a ZigBee® device in the BLE network will not disrupt normal BLE connection. That is because the schedule of BLE communication is in a slotted manner. In other words, all associated devices to a BLE master devices will be given separate time slots, so that the BLE master device can communicate with normal BLE devices while keeping the connection with the ZigBee® device through CTC. Thus, the techniques have achieved a hybrid network with both ZigBee® and BLE devices working harmoniously.

Figure 16:
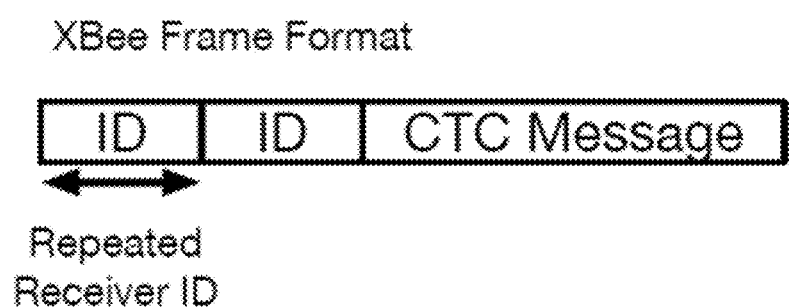
FIG. 16 is a conceptual diagram of a repeated receiver identification sequence, in accordance with one or more techniques of this disclosure.

FIG. 16 is a conceptual diagram of a repeated receiver identification sequence, in accordance with one or more techniques of this disclosure. The ZigBee® transmitter attaches a receiver ID ahead of any CTC message, which will be recognized as the BLE access address. The successful detection of the receiver ID is critical to BLE cross-decoding, because otherwise the whole packet will be regarded as noise and discarded. To protect the receiver ID, it may be repeated multiple times. For example, in FIG. 27, the receiver ID may be repeated two times, and the BLE receiver is able to identify the ZigBee® packet if it successfully detects any of the receiver IDs. The cross-decoding will start after the last repeat of receiver ID.

In various techniques described herein, one challenge is the low bandwidth and the corresponding low sample rate at the BLE receiver side. However, note that in commodity devices the receiver may oversample the channel, e.g., sample at 2 MHz instead of 1 MHz, to make the system more robust. Even in that case, the BLE demodulator will only yield bit stream at 1 MHz no matter how fast it samples at the PHY layer, which cannot fully represent the phase shift information in the ZigBee® two-chips pieces.

Figure 17:
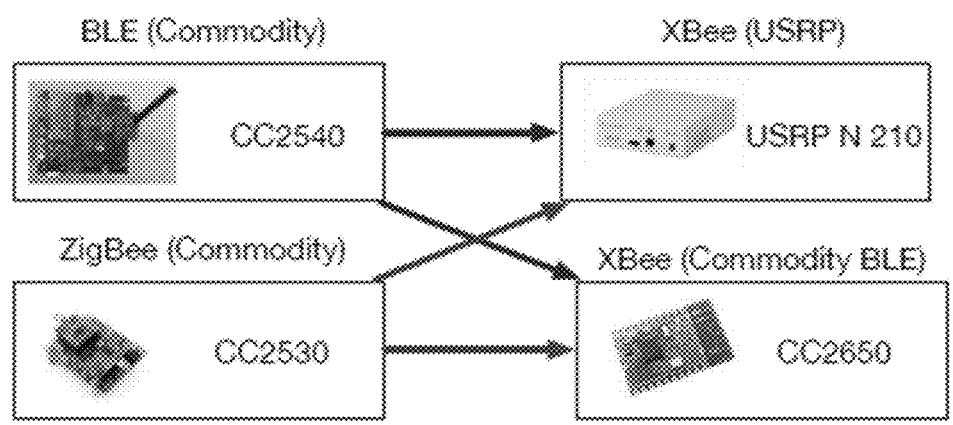
FIG. 17 is a conceptual diagram of an experimental setting, in accordance with one or more techniques of this disclosure.

FIG. 17 is a conceptual diagram of an experimental setting, in accordance with one or more techniques of this disclosure. FIG. 17 demonstrates platforms for evaluation of the techniques described herein. The techniques have been implemented herein on USRP N210 with BLE PHY, as well as on commercial off-the-shelf (COTS) BLE CC2650 evaluation board. The techniques have also been implemented on COTS ZigBee® and BLE with CC2530 and CC2540 boards, respectively, as transmitters. All experiments are repeated multiple times for statistical results.

The data rate of the techniques described herein may be evaluated in comparison to the standard ZigBee® and stateof-the-art CTC techniques. The study spans both packet-level CTC designs and more recent PHY-layer CTCs.

Figure 18:
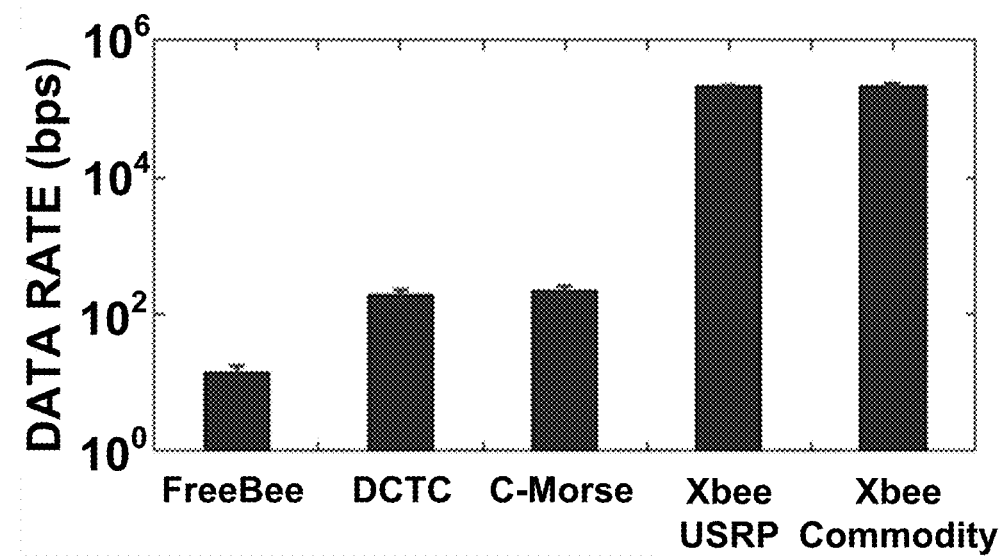
FIG. 18 is a conceptual diagram of a data rate comparison, in accordance with one or more techniques of this disclosure.

FIG. 18 is a conceptual diagram of a data rate comparison, in accordance with one or more techniques of this disclosure. First compare the data rate of the techniques described herein with three packet level CTCs. As shown in FIG. 18, the data rate of one is 14 bps where the other two have rates of 190 bps and 215 bps. Such designs use coarse-grained packet-level information (e.g., packet timing, patterns, etc.) and thus are intrinsically limited in performance. The techniques described herein, by directly utilizing the physical layer information, reach significantly higher rate. The techniques described herein implemented on USRP and commodity chip can achieve a data rate of 212 kbps and 217 kbps respectively, which outperforms DCTC and C-Morse by over three orders of magnitude. This demonstrates the practicality of the techniques described herein over packet-level competitors.

Figure 19:
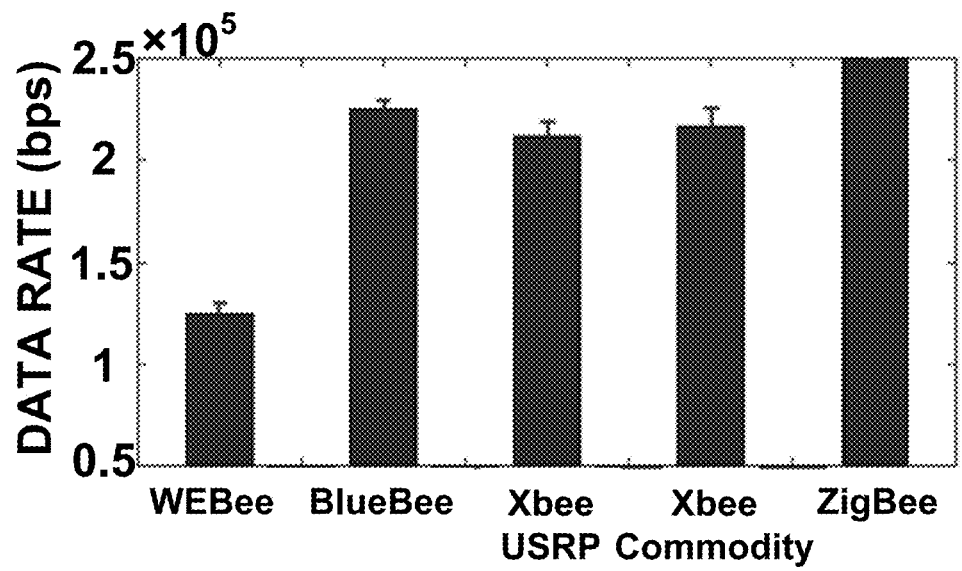
FIG. 19 is a conceptual diagram of a data rate comparison, in accordance with one or more techniques of this disclosure.

FIG. 19 is a conceptual diagram of a data rate comparison, in accordance with one or more techniques of this disclosure. The recent advances in CTC introduced PHY-layer designs based on signal emulation. Work along this line commonly leverage the transmitter's high degree of freedom in signal manipulation, to generate waveform closely follows that of the receiver technology. The techniques described herein are a new PHY-layer CTC taking the unique approach of cross-decoding, which, by transferring the complexity to the receiver side, enables CTC under transmitter with a limited degree of freedom (e.g., low-end RF). Compare the performance of the techniques described herein to the state-of-the-art PHY-layer CTC designs by measuring how closely they approach the ZigBee® standard data rate of 250 Kbps. FIG. 19 shows that these CTC protocols achieve 125 kbps and 225 kbps, respectively. The techniques described herein, by reaching 217 kbps, outperforms some other techniques by 1.7×. The sender's bandwidth (2 MHz ZigBee®) is wider than that of the receiver (1 MHz BLE). Some other techniques may benefit from this to retrieve more fine-grained phase information, thus reaching slightly higher performance. The result validates that the techniques described herein, by only utilizing receiver-side technique (e.g., cross-decoding), achieves performance similar to the state-of-the-art PHY-layer CTCs that rely on sophisticated transmitter-side signal processing. This is an indication that the techniques described herein successfully fill in the gap towards CTC bidirectionality accompanied with known PHY-layer CTCs, as experimentally evaluated below.

Figure 20:
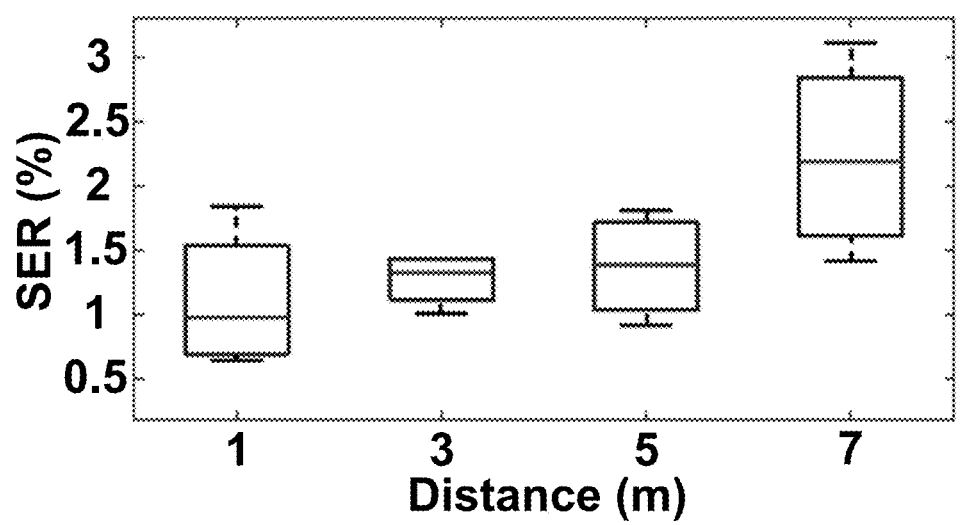
FIG. 20 is a conceptual diagram of a symbol error rate (SER), in accordance with one or more techniques of this disclosure.

FIG. 20 is a conceptual diagram of a symbol error rate (SER), in accordance with one or more techniques of this disclosure. The ZigBee® symbol error rate (SER) via cross-decoding may be evaluated. FIG. 20 shows the ZigBee® SER when a 4.3 dBm commodity ZigBee® Tx is put 1 m to 7 m away from a USRP BLE receiver. The average SER is about 1% at 1 m and gradually increases to about 2.2% at 7 m. That's because BLE signal is usually low in Tx power, and will quickly attenuate in the air.

Like any other communication systems, the performance of the techniques described herein are affected by distance and Tx power. To show their impact, FRR at the distance range of 1 m to 7 m, and Tx power of 4.5 dBm to −1.5 dBm. Both implementation on USRP and commodity BLE devices are tested for completeness.

Figure 21A:
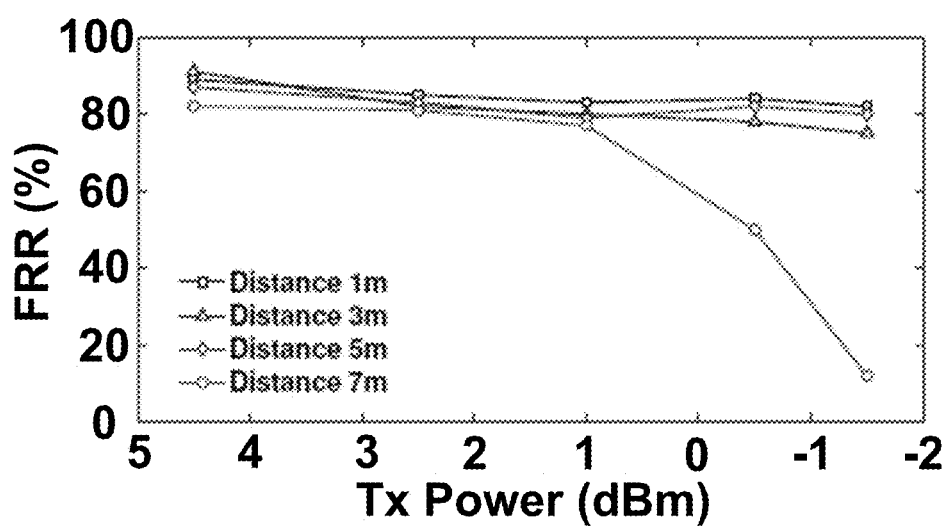
FIGS. 21A and 21B are conceptual diagrams of different transmission powers, in accordance with one or more techniques of this disclosure.
Figure 21B:
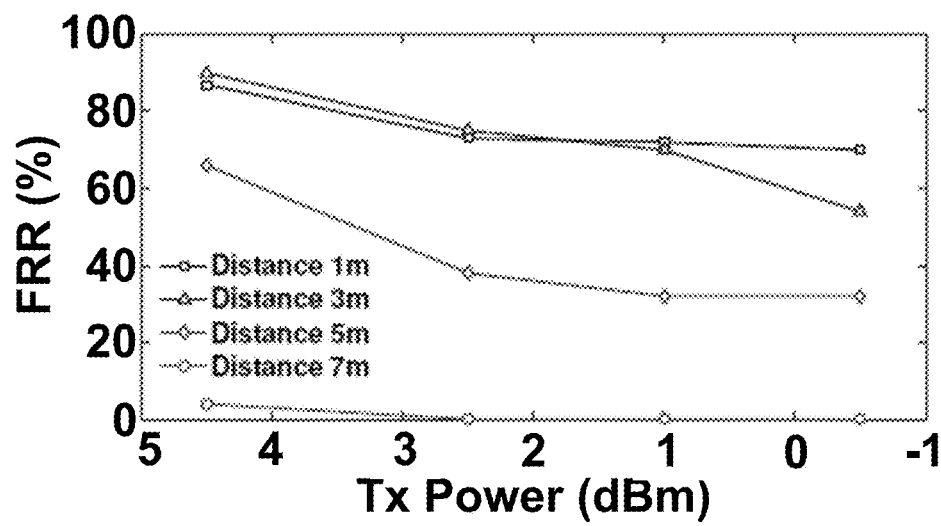

FIGS. 21A and 21B are conceptual diagrams of different transmission powers, in accordance with one or more techniques of this disclosure. FIG. 21A reveals that the FRR of the techniques described herein on USRP gradually decreases from 90% to 80% with an increase in distance and the decrease in Tx power when the distance is within 5 m. A sharp decrease occurs at the distance of 7 m, at a low Tx power of 1 dBm or lower. In FIG. 21B, the techniques described herein on the commodity device reaches FRR over 60% when the distance is shorter than 3 m. The performance on commodity devices is worse than that of the USRP. While the details of commodity hardware are hidden, the performance gap is mainly due to cheap RF components in commodity BLE with low antenna gains and inaccurate phase detection, which is subject to change for different hardware and vendors. With the aim to provide stable and reproducible results, and to offer thorough analysis and deep understanding, USRP may be used in the following parts of the section (unless otherwise stated).

To understand the relationship between the FRR and the Rx RSS, the relationship between the Tx power and Rx RSS is examined. In the experiment, the CC2530 ZigBee® device is used with the CC2540 BLE device. Connect the Tx and Rx with a cable with a 30 dBm attenuator. Table 2 shows the relationship between the Tx power and the Rx RSS. Throughout the 30 dB Tx power range, the Tx power almost changes linearly with the Rx RSS. Combined with the results in FIG. 21, the relationship between the FRR and the Rx RSS is shown to be linear.

TABLE 2

| Rx RSS changes linearly with the Tx power. | | | | | |
|---|---|---|---|---|---|
| Tx Power (dBm) | −22 | −16 | −10 | −3 | 1 | 4.5 |
| Rx RSS (dBm) | −75 | −71 | −64 | −57 | −53 | −50 |

Figure 22:
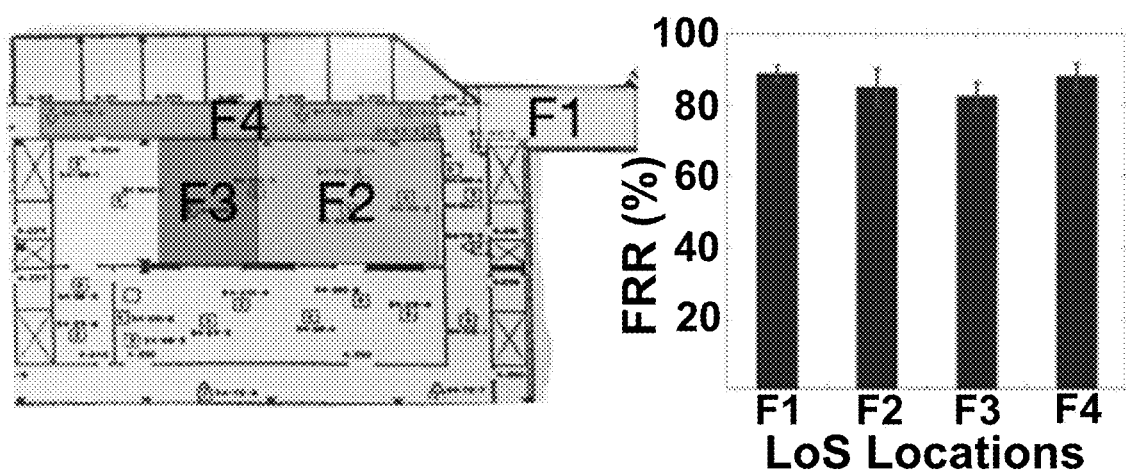
FIG. 22 is a conceptual diagram of line of sight scenarios, in accordance with one or more techniques of this disclosure.

FIG. 22 is a conceptual diagram of line of sight scenarios, in accordance with one or more techniques of this disclosure. FIG. 22 is a conceptual diagram of line of sight scenarios, in accordance with one or more techniques of this disclosure. The FRR in various locations within a university building were evaluated, including the lobby (F1), a meeting room with minimal obstacles (F2), a lab (F3), and the hallway (F4). The distance between the ZigBee® transmitter and the receiver was kept at 1 m while maintaining the line of sight (LoS). As illustrated in FIG. 22, the average FRR in the lobby and the hallway are both over 85%, while falling as low as 80% in the lab environment. This is because the lab is crowded with many WiFi® (e.g., laptops) and Bluetooth® (e.g., wireless mouse) devices causing strong interference.

Figure 23:
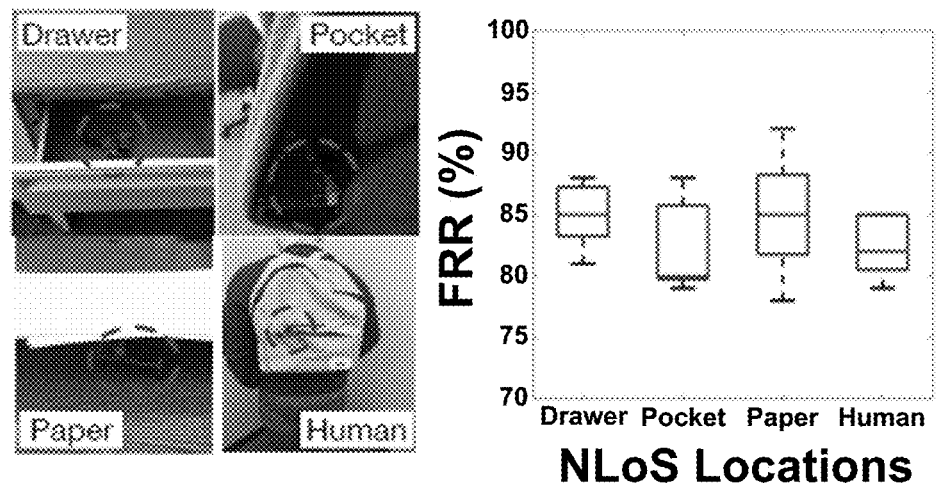
FIG. 23 is a conceptual diagram of non-line of sight scenarios, in accordance with one or more techniques of this disclosure.

FIG. 23 is a conceptual diagram of non-line of sight scenarios, in accordance with one or more techniques of this disclosure. The performance of the techniques described herein are studied under various realistic NLoS scenarios, where the ZigBee® transmitter is sitting in a drawer, in a pocket, on the desk covered by some paper, or obstructed by the human body. And a USRP BLE receiver is put 1 m away. Note that this experiment was conducted in a large meeting room with mostly open space (F2 in FIG. 22) to factor out other channel effects (e.g., multipath). FIG. 23 depicts the result. While the pocket scenario shows the highest impact, FRR is kept at a reasonable level of above 80%, which demonstrates the reliability of the techniques described herein under various NLoS scenarios in practice.

Figure 24:
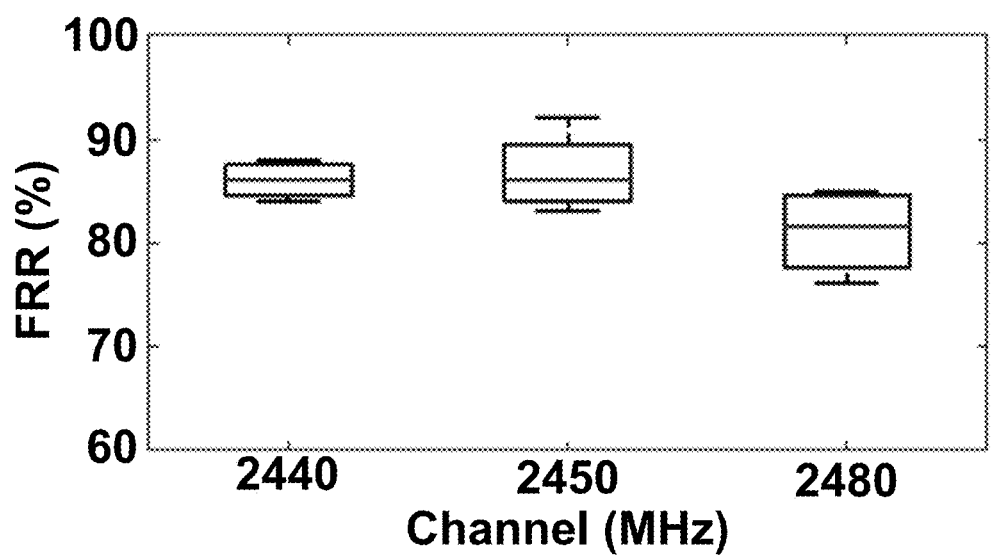
FIG. 24 is a conceptual diagram of interference on different channels, in accordance with one or more techniques of this disclosure.

FIG. 24 is a conceptual diagram of interference on different channels, in accordance with one or more techniques of this disclosure. The techniques described herein may operate on are all the overlapping channels between ZigBee® and BLE, ranging from [2410 MHz, 2420 MHz, . . . , 2480 MHz]. Among them choose three representative channels: one is overlapping with the WiFi® channel, e.g., 2440 MHz, another is the BLE advertising channel, e.g., 2480 MHz, and the third is a relative clean channel, e.g., 2450 MHz, as illustrated in FIG. 24. Compare the impact of different sources of wireless interference, e.g., WiFI® and BLE advertising packets. FIG. 24 shows the average FRR on channels 2440 MHz and 2450 MHz are both over 85%, while the FRR on channel 2480 MHz is slightly lower, around 80%. That is due to the huge amount of BLE advertising packets on the channel 2480 MHz interfering with the cross-decoding.

Figure 25:
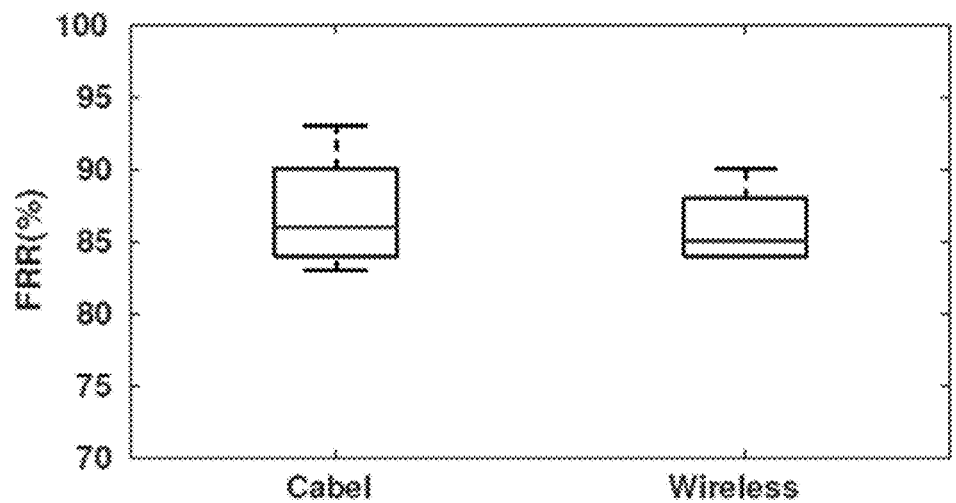
FIG. 25 is a conceptual diagram of a low noise scenario, in accordance with one or more techniques of this disclosure.

FIG. 25 is a conceptual diagram of a low noise scenario, in accordance with one or more techniques of this disclosure. In this experiment, factor out the effect of the wireless channel to provide insights into the performance limits of cross-decoding. To do completely remove wireless noise, connect the ZigBee® transmitter and the USRP receiver through a cable. Also measure low noise scenario over the air, by putting the transmitter and the receiver pair side by side. FIG. 25 demonstrates that, in both cases, FRR was kept similar at 85%, which is effectively the maximum performance of the techniques described herein under the ideal channel.

Figure 26:
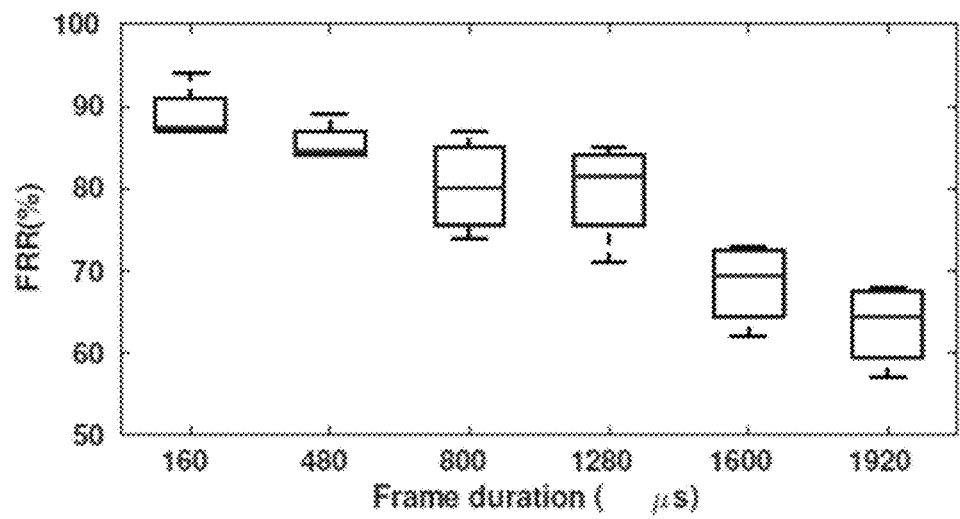
FIG. 26 is a conceptual diagram of frame reception ratios (FRR) under varying frame durations, in accordance with one or more techniques of this disclosure.

FIG. 26 is a conceptual diagram of frame reception ratios (FRR) under varying frame durations, in accordance with one or more techniques of this disclosure. Compared to BLE 4.0 standard which restricts payload size to be 33 bytes at maximum, the newly introduced BLE 4.2 allows a much longer payload of up to 251 bytes. This provides the opportunity to cross-decode long ZigBee® frames. This naturally leads to a question of the impact of the frame length on performance. To investigate this, first place Zig-Bee® (CC2530) transmitter nearby (e.g., 1 m) the USRP receiver to minimize channel effects. The antenna gains are 30 dB at the Tx and 10 dB at the Rx. Under this setting, increase the frame duration from 160 s to 1920 s, corresponding to 20 and 240 BLE payload bytes, which closely approaches the BLE 4.2 limit. As shown in FIG. 26, the FRR of the techniques described herein decrease with the frame duration, from 90% to 66% due to a higher chance of corruption, as in any wireless communication designs. It shows the FRR is kept a reasonable level of 65% under a long frame size of 1920 µs defined by the latest BLE 4.2 standard—indicating the techniques described herein are able to support long and bursty data delivery.

Figure 27:
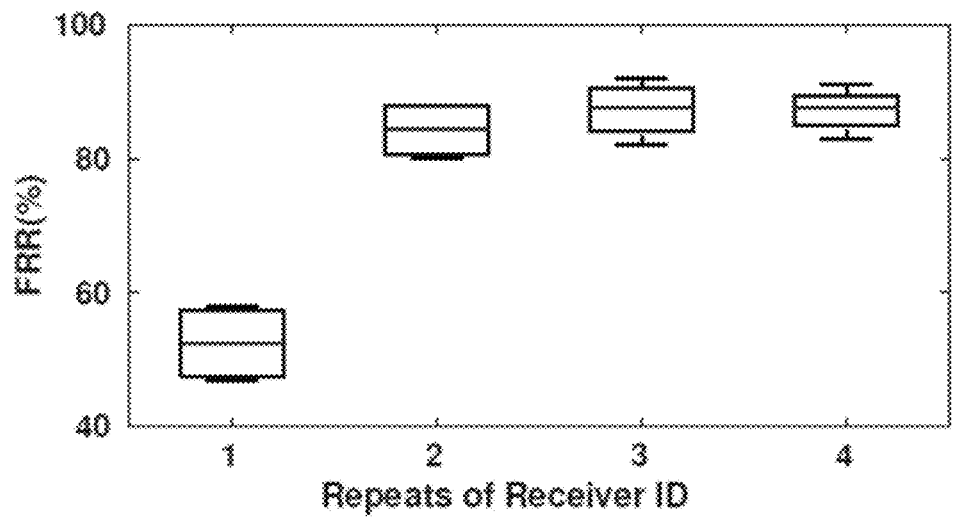
FIG. 27 is a conceptual diagram of FRRs with repeats of receiver identification (ID), in accordance with one or more techniques of this disclosure.

FIG. 27 is a conceptual diagram of FRRs with repeats of receiver identification (ID), in accordance with one or more techniques of this disclosure. Recall that receiver ID corresponds to the preamble in BLE. Therefore, successful detection of the receiver ID may be critical for the techniques described herein to successfully receive frames (e.g., cross-decode). To this end, evaluate how the repetition of the receiver ID affects FRR. FIG. 27 demonstrates single receiver ID (e.g., repeat=1) yields FRR=50%, however, appending two receiver IDs (e.g., repeat=2) quickly increases the FRR to 85%. Increasing the repetition over two does not offer notable gain while increasing the overhead. Therefore, the techniques described herein may use two receiver IDs by default.

Energy consumption of the techniques described herein on the commodity CC2650 BLE board may be studied. Recall that the additional energy consumption brought by the techniques described herein are the cross-decoding through matrix multiplication in FIG. 13. To measure the energy cost, measure the average computation time the BLE board takes to cross-decode each ZigBee® symbol, then multiplied by the average power of the CC2650 BLE board.

Certain measurements find that it takes 174 µs on average to cross-decode a ZigBee® symbol. The average power consumption of the board is 4.35 mW when active. As such, it takes 0.7 µJ to cross-decode a ZigBee® symbol.

Figure 28:
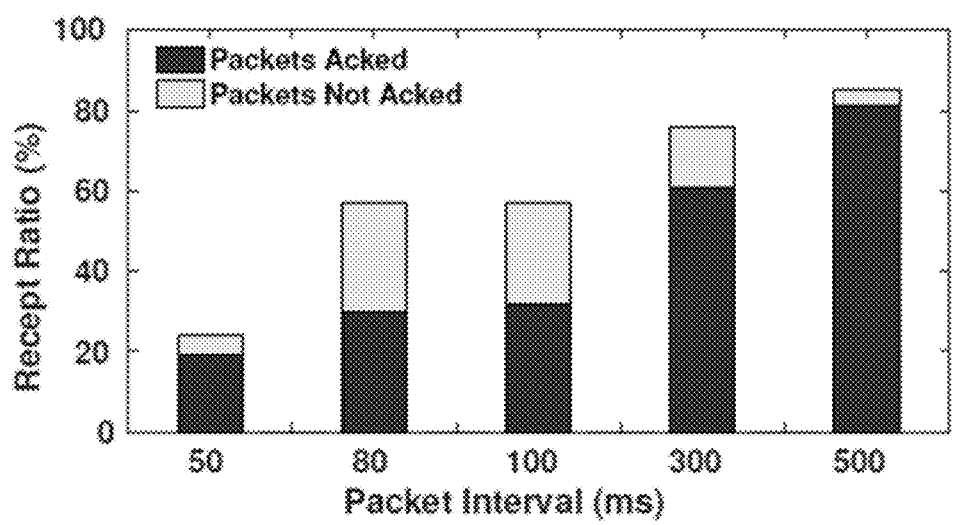
FIG. 28 is a conceptual diagram of acknowledged ZigBee® packets, in accordance with one or more techniques of this disclosure.

FIG. 28 is a conceptual diagram of acknowledged ZigBee® packets, in accordance with one or more techniques of this disclosure. Bidirectional CTC is a receiver-side design, which can be applied alongside existing transmitter-side PHY-CTC to achieve bidirectionality—an essential function for multiple critical aspects of networking. Demonstrated is the feasibility of bi-directional CTC, with a case study of ZigBee® and BLE. This is achieved by utilizing, a state-of-the-art BLE to ZigBee® CTC technique. Specifically, implement an acknowledge mechanism via the following two steps. First, a commodity ZigBee® device sends native ZigBee® frames to a BLE receiver. Upon correct cross-decoding at the BLE receiver, the BLE device sends back cross-technology ACKs through signal emulation. The packet interval at the ZigBee® transmitter is set between 50 ms and 500 ms. The result depicted in FIG. 28 shows that the frame reception and ACK rates are both low when under short transmission interval. They improve as the frame interval grows larger. This is because the USRP-based receiver has a delay in receiving, processing, and sending back ACK, ranging between 50 ms and 100 ms. The long delay causes ACKs to collide with the coming ZigBee® to BLE packets. When the frame interval is large enough, e.g., 500 ms, the techniques described herein correctly cross-decodes 85% of the frames, and acknowledges 95% of the decoded frames, thereby successfully demonstrating bidirectional CTC in practice. This may be a key enabler to sophisticated cross-technology protocol designs at the upper layers.

The coexistence of large amount of heterogeneous wireless technologies on the open 2.4 GHz ISM band has become a common network scenario in recent decades. The coexistence does increase the competition and cross-technology interference (CTI) among them, but at the same time provides opportunities for cross-technology communication (CTC). Packet-level CTC designs may focus on exploring packet-level information for CTC, such as the packet duration, interval, energy pattern, and energy level. For example, Esense® and HoWiES® embed the WiFi® to ZigBee® CTC message within multiple dedicated WiFi® packets via specific packet durations. The packet duration can be distinguished from background noises at the receiver side. GSense® attaches customized preambles ahead of heterogeneous wireless packets and exchange CTC information through the gaps between the customized preambles. Certain other techniques include a free channel design which takes advantage of the mandatory WiFi® beacons and embed CTC within the WiFi® beacon intervals. B2W2® is a CTC design from Bluetooth® to WiFi® by modulating the energy level of Bluetooth® packets and demodulated through WiFi® CSI at the receiver side. C-Morse® constructs a series of Morse code like long and short WiFi® packets that can be demodulated at the ZigBee® receiver. StripComm® introduces an interference-resilient CTC which adopts an interference-resilient coding scheme that contains both presence and absence of packets in one symbol to improve CTC packet-level information these CTC designs based on, CTC works in this category are intrinsically restricted in data rate due to the sparse packet-level information in the air.

Physical-layer CTC PHY-layer CTCs are the recent advances. Existing PHY-layer CTC works commonly take advantage of the high-end transmitters to emulate the signal compliant to the low-end receiver, e.g., WiFi®→ZigBee® or BLE→ZigBee®. Some CTC protocols include PHY-layer CTC through the signal emulation techniques where a commodity WiFi® transmitter emulates a ZigBee® standard compliant packet by carefully choosing the WiFi® payload. It first achieves CTC in the PHY-layer with close to Zig-Bee® standard data rate. Another technique implements signal emulation in low power devices, e.g., from a commodity BLE transmitter to a ZigBee® receiver, by exploring the opportunities in the signal phase shifts. Certain techniques may recover the intrinsic errors brought in WiFi® signal emulation by exploiting ZigBee® chip-level error patterns and describe a chip-combining decoding method. Certain techniques may be used to improve the transmission range of a WiFi® signal emulation by exploring the transmitter side channel bandwidth.

PHY-layer CTCs may be commonly based on the signal emulation technique. Despite their significant advancement in the data rate, the technique of signal emulation is applicable only for the higher-end transmitter to the lower-end receiver scenario. This is because powerful radios support sophisticated modulations offering higher degrees of freedom in waveform control but not vice versa. Compared with them, the techniques described herein are the first PHY-layer CTC based on the receiver side cross-decoding. It is the fundamental but missing piece to enable PHY-layer CTC from the lower-end transmitter to the higher-end receiver to accomplish PHY-layer CTC in all directions. It is the building block to enable cross-technology channel negotiations and advanced collaborations in practice.

In summary, various techniques described herein are the first receiver-side PHY-layer CTC with cross-decoding. By moving the complexity to the receiver side, it covers the fundamental but missing piece to enable PHY-layer CTC from lower-end transmitted to higher-end receiver to accomplish PHY-layer CTC in all directions, paving the way for advanced cross-technology channel negotiations and collaborations in practice.

Figure 29A:
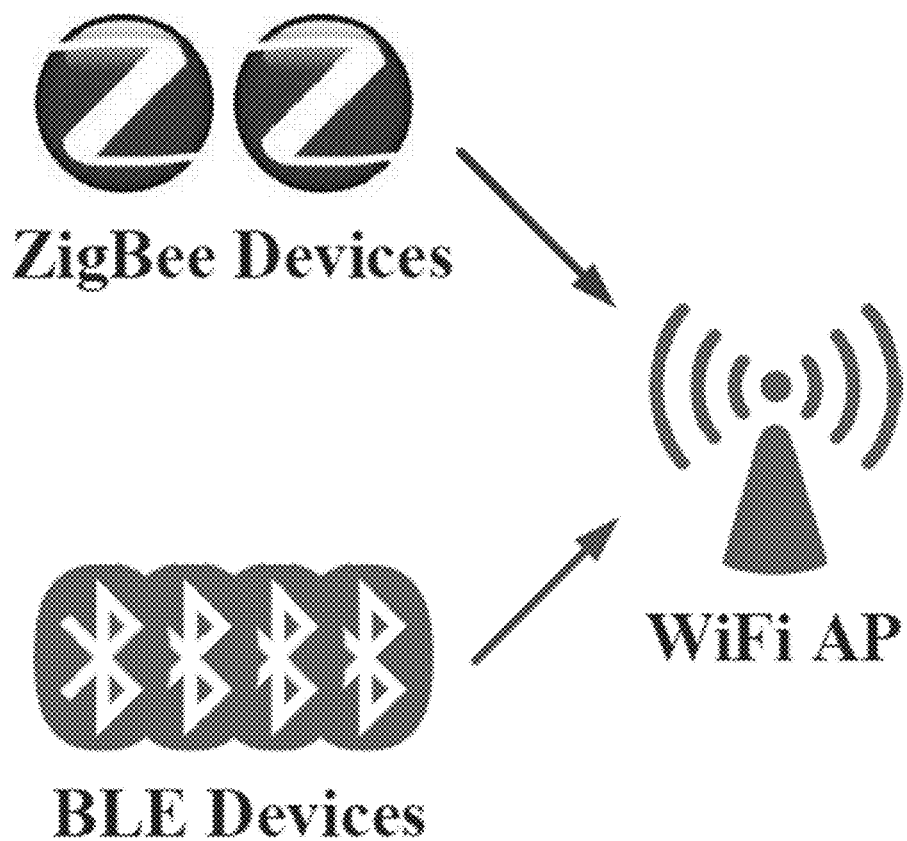
FIGS. 29A-29B are conceptual diagrams of an architecture designed to execute the techniques described herein and data collection in accordance with one or more techniques of this disclosure.
Figure 29B:
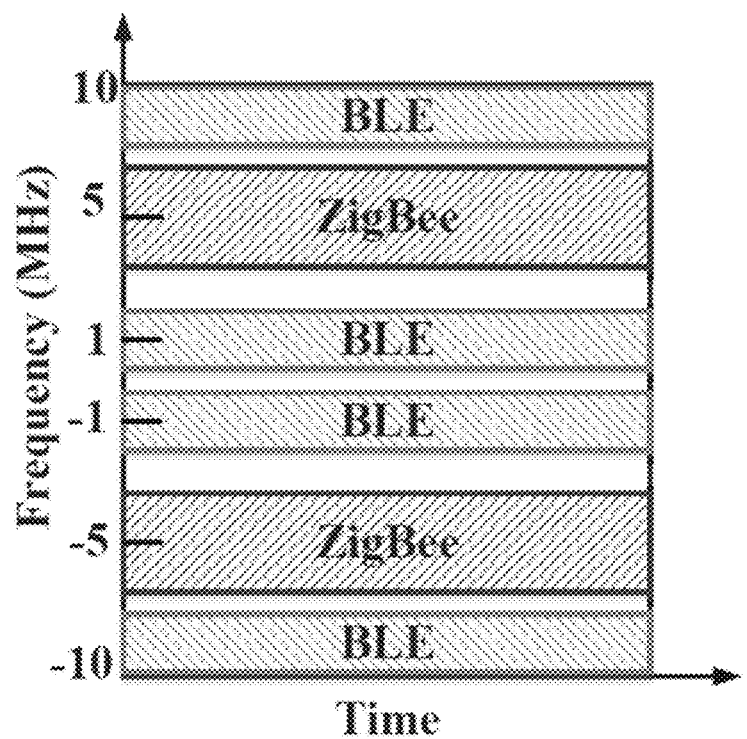

FIGS. 29A-29B are conceptual diagrams of an architecture designed to execute the techniques described herein and data collection in accordance with one or more techniques of this disclosure. the techniques described herein is a physical-layer CTC technique that turns commodity WiFi® devices into generic IoT gateway as shown in FIG. 29A. the techniques described herein features providing Internet access for various IoT technologies by directly collecting data from heterogeneous IoT devices such as ZigBee® and BLE. Technically, parallel ZigBee® and BLE packets are piggy-backed into a WiFi® AP installed with the techniques described herein software via an ongoing WiFi® transmission. By analyzing decoded payload, the techniques described herein disentangles and reconstructs the waveform of each narrowband transmission. After signal disentangling, the techniques described herein utilizes novel technology-specific decoding techniques to reliably demodulate each reconstructed waveform.

Specifically, the techniques described herein has various unique features. The first is compatibility. The techniques described herein only relies on the decoded WiFi® payload for recovering heterogeneous wireless transmissions. As a result, it is fully compatible with existing commodity WiFi® devices, without any hardware nor firmware modification.

Another unique feature is generality. The techniques described herein recovers narrowband IoT transmission by reconstructing its raw RF waveform for detection and demodulation. This process is generic and applicable to various wireless protocols. As a proof of concept, this paper demonstrates the feasibility of recovering concurrent Zig-Bee® and BLE transmissions, while this design could be extended to other wireless technologies.

Another unique feature is parallelism. The techniques described herein allows the wide-band WiFi® receiver to concurrently receive and decode multiple heterogeneous narrowband IoT transmissions, significantly improving the network efficiency of densely-deployed IoT devices. Taking FIG. 29B for example, the techniques described herein is able to simultaneously decode the transmissions from two ZigBee® devices and four BLE devices allocated at different channels.

Figure 30:
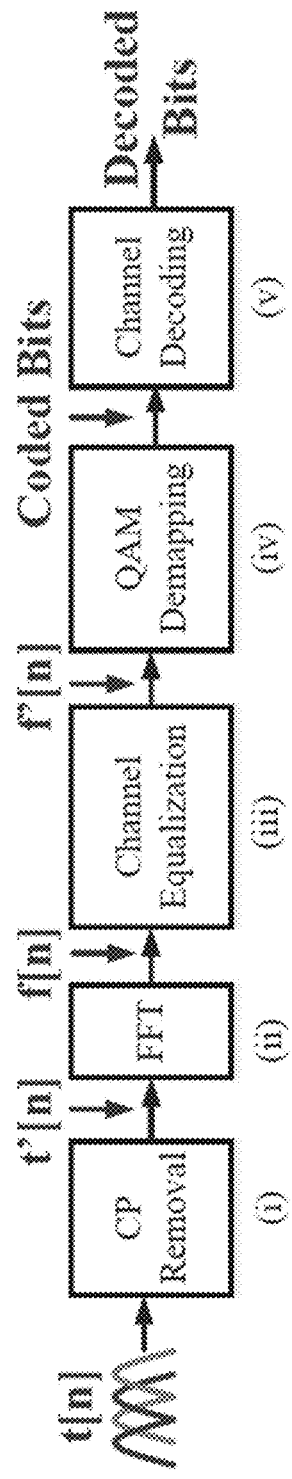
FIG. 30 is a conceptual diagram of a receiver device that executes one or more techniques of this disclosure.

FIG. 30 is a conceptual diagram of a receiver device that executes one or more techniques of this disclosure. The WiFi® decoding path is illustrated in FIG. 30. The input t[n] is the time-domain baseband waveform consisting of multiple WiFi® symbols. In decoding the symbol, the receiver may perform the following steps.

(i) CP removal: The cyclic prefix (CP), e.g., the 0.8 us at the beginning of each 4 us WiFi® symbol are first removed. WiFi® transmitter uses "informationless" CP as guarding intervals to eliminate the inter-symbol interference due to multipath effect, so the removal of CP at receiver will not cause any loss of WiFi® information. However, for non-WiFi® transmissions, CP removal inevitably erases 20% of useful waveform causing permanent information loss.

(ii) FFT: The surviving time-domain waveform t'[n] is transferred into frequency domain. Fast Fourier Transform (FFT) transfers each OFDM symbol into 64 frequency components which correspond to 64 WiFi® subcarriers. FFT provides the opportunity to decode parallel narrowband transmissions allocated in different frequencies.

(iii) Equalization: Channel equalizer cancels the channel fading effects by dividing each frequency component f[n] by its corresponding channel response. Note that the step (ii) and (iii) are fully revertible and thus doesn't cause information loss for non-WiFi® waveform.

(iv) QAM demapping: The QAM demapping block discretizes the continuous-value frequency components into bits which are then serialized to coded bits or codeword. For non-WiFi® signal, the demapping introduces tolerable quantization errors.

(v) Channel Decoding: The channel decoder decodes the coded bits and produces decoded bits, e.g., the decoded payload. For a WiFi® frame, the redundant information in the coded bits is used to correct errors in the received frame. However, for non-WiFi® transmissions, the error correction operation entangles signal of the different narrow bands.

Figure 31:
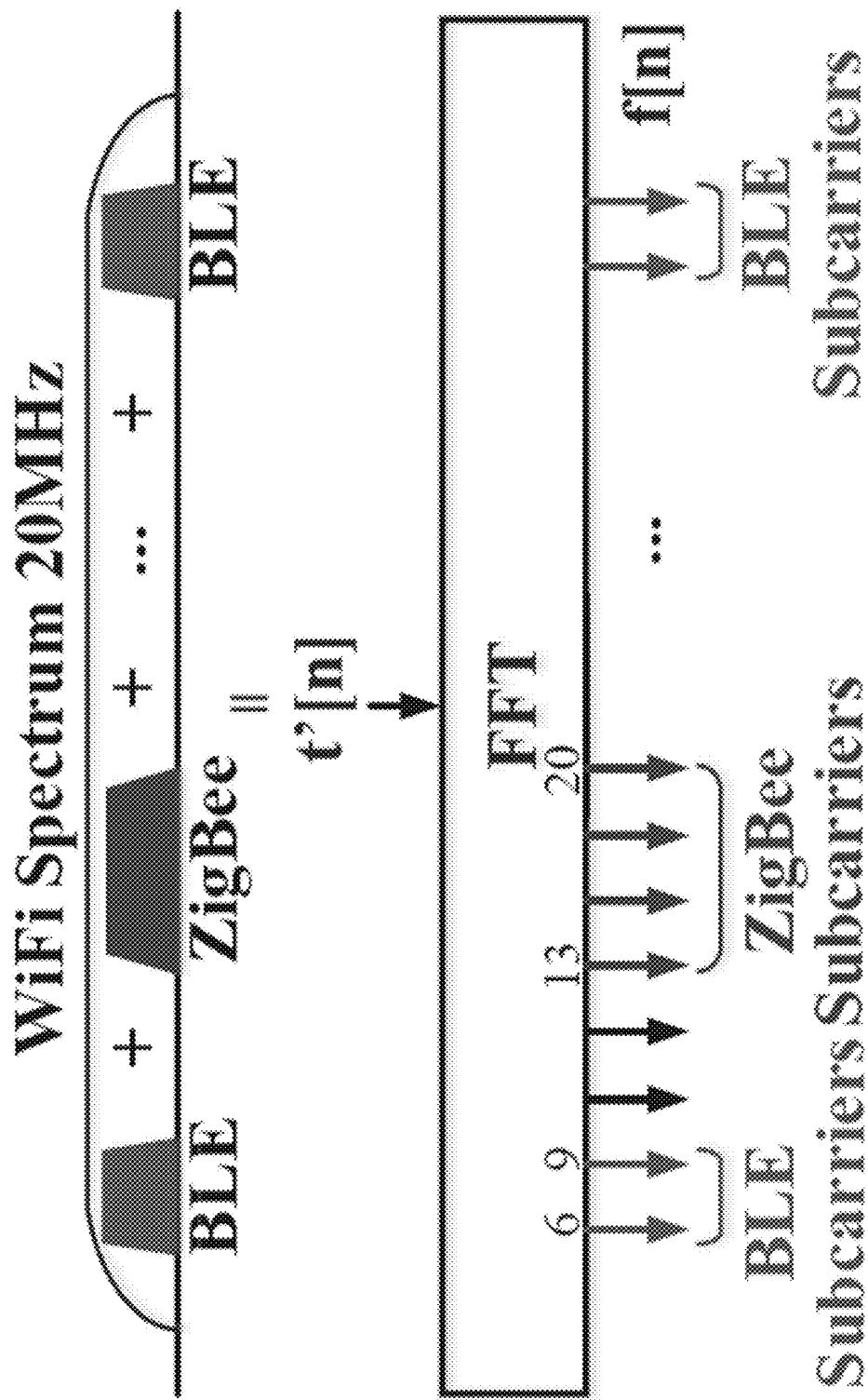
FIG. 31 is a conceptual diagram of a fast Fourier transform (FFT) process, in accordance with one or more techniques of this disclosure.

FIG. 31 is a conceptual diagram of a fast Fourier transform (FFT) process, in accordance with one or more techniques of this disclosure. As an OFDM receiver, a commodity WiFi® receiver converts the time domain signal into frequency domain via FFT, so that it may demodulate the transmitted data at each subcarrier. It is shown in FIG. 31 that since the IoT transmissions are allocated at different frequencies, their frequency-domain signals are separated. For example, ZigBee®'s frequency signal is from subcarrier 13 to 20, while BLE frequency signal is from subcarrier 6 to 9, so that ideally the techniques described herein may examine specific subcarriers for reconstructing each narrowband signal.

Figure 32:
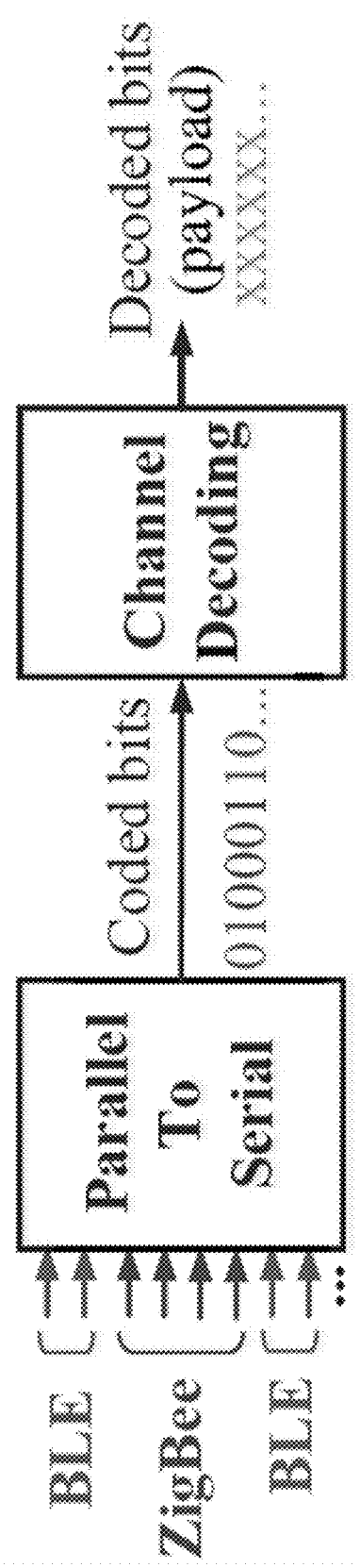
FIG. 32 is a conceptual diagram of a signal entangling technique in channel decoding, in accordance with one or more techniques of this disclosure.

FIG. 32 is a conceptual diagram of a signal entangling technique in channel decoding, in accordance with one or more techniques of this disclosure. However, the channel decoder will jointly decode the signal over all the subcarriers as if they come from one single WiFi® transmission, which essentially entangles the signal of the entire 20 MHz spectrum in the output. In specific, as FIG. 32 shows, the decoder takes 2 steps. First, the subcarriers of several parallel narrowband transmissions are combined into one single sequence of coded bits. As the mapping between coded bits and subcarriers are deterministic, coded bits may be converted back to subcarriers. Second, channel decoding performs error correction on coded bits to produce decoded bit. This step is very problematic because it may entangle the values on the all the WiFi® subcarriers during error correction.

Figure 33:
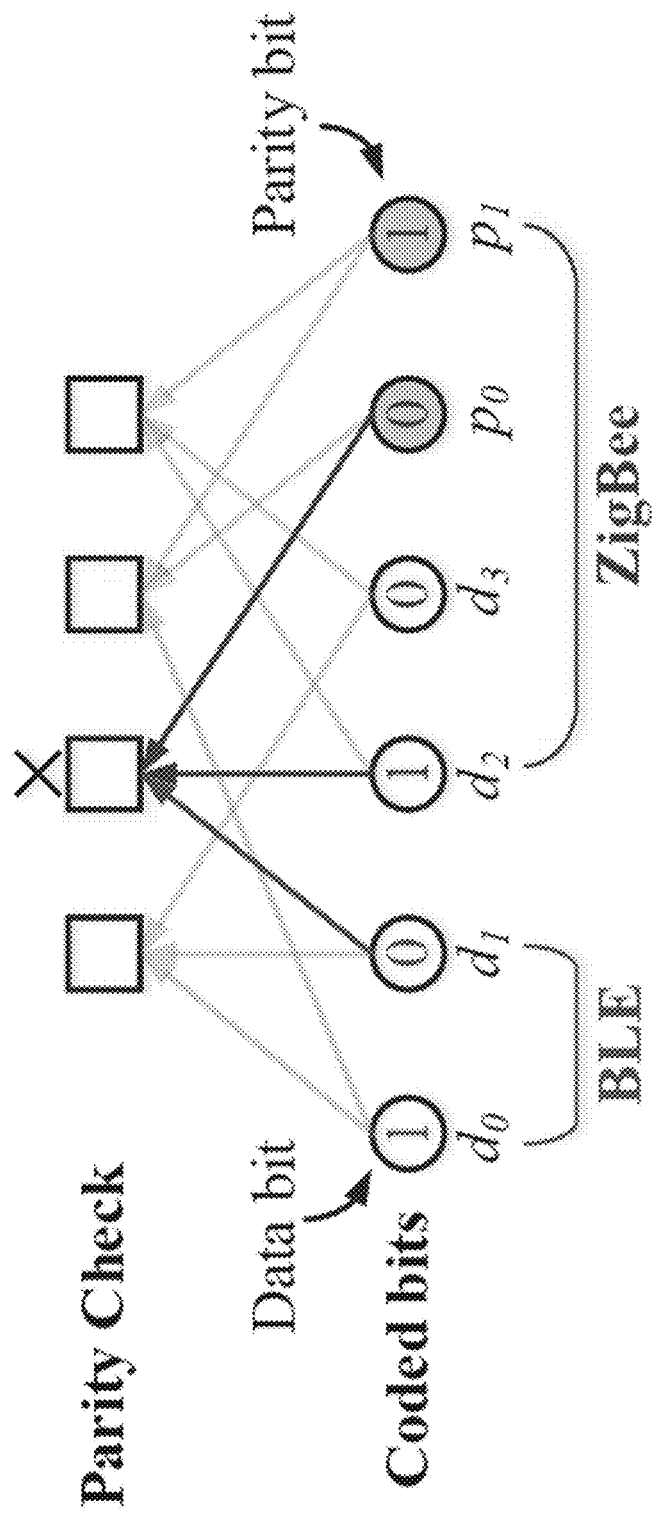
FIG. 33 is a conceptual diagram of a low density parity check (LDPC) decoder, in accordance with one or more techniques of this disclosure.

FIG. 33 is a conceptual diagram of a low-density parity check (LDPC) decoder, in accordance with one or more techniques of this disclosure. FIG. 33 demonstrates the signal entangling with a graphical representation of Low-Density Parity Check (LDPC) decoder in WiFi®. While coded bits are a combination of multiple narrowband transmissions, LDPC decoder takes them as single WiFi® codeword by mapping them to "data bits" and "parity bits". In the example, data bits $d_1$, $d_2$ and parity bits $p_0$ are connected to a common parity check constraint at the top for error detection, even though they belong to different IoT transmissions. The binary parity check fails since the summation in gf(2), e.g., $d_1 \oplus d_2 \oplus p_0 \neq 0$. LDPC decoder corrects the error by flipping one of the 3 bits in order for the constraint to be satisfied. Hence, bits in one IoT transmission, e.g., $d_2$, $p_0$ of ZigBee® may change values of the bits in another IoT transmission, e.g., $d_1$ of BLE.

Note that IoT transmissions do not perform LDPC encoding and hence "data bits" and "parity bits" in the received signal are extremely uncorrelated. As such, it is reasonable to expect that the decoder will perform significant number of bit flipping to the coded bits such that signal of all the transmissions are completely blended and impossible to be unraveled.

Counter-intuitively, instead of flipping a lot of bits, LDPC decoder almost keeps the coded bits intact. In specific, when decoding highly uncorrelated coded bits from heterogenous narrowband transmissions, channel decoder only flips an extremely limited number of "coded bits" (≤2%). A key insight for this phenomenon is that the channel decoding algorithm typically has an Error Correction Capability. When receiving coded bits that are extremely far away from any valid codeword and thus has too many parity check failures that excess the decoder's capacity, the decoder becomes ineffective to correct errors.

Figure 34:
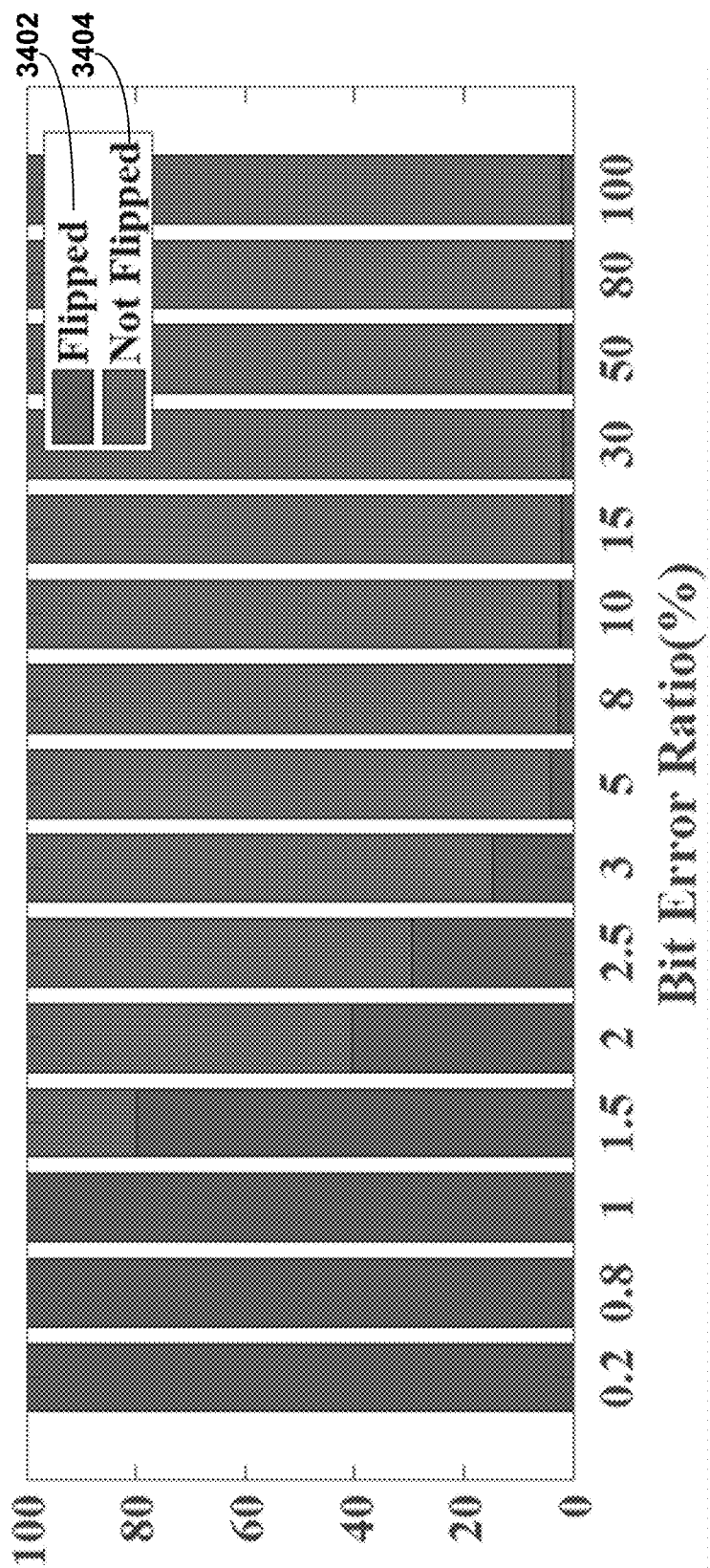
FIG. 34 is a conceptual diagram of a relationship between error correction and bit error ratios, in accordance with one or more techniques of this disclosure.

FIG. 34 is a conceptual diagram of a relationship between error correction and bit error ratios, in accordance with one or more techniques of this disclosure. To verify this observation, the techniques described herein first generate a valid WiFi® codeword with 5/6 code ratio, and then gradually move it away from the original value by randomly replacing bits, while the percentage of replaced bits is denoted as the "Bit Error Ratio". After decoding this WiFi® packet with WiFi®'s LDPC decoder, the techniques described herein calculate the number of errors corrected (flipped) to examine the effectiveness of LDPC decoder. FIG. 34 shows a surprising result that LDPC decoder is only able to perform with a small bit error ratio, e.g., 1.5%, while it becomes ineffective and only flips 1.8% bits when bit error ratio exceeds 5%. For a BLE or ZigBee® transmission, it has a bandwidth of 1 Mbps or 2 Mbps respectively, equivalent to 13% of flipped bits 3402, which is enough to trigger the ineffective channel decoding in WiFi®. Not flipped bits are shown with respect to reference numeral 3404. As a result, the techniques described herein is able to disentangle the parallel IoT transmissions from a single WiFi® packet in the application layer by elaborately analyzing the received payload.

Figure 35:
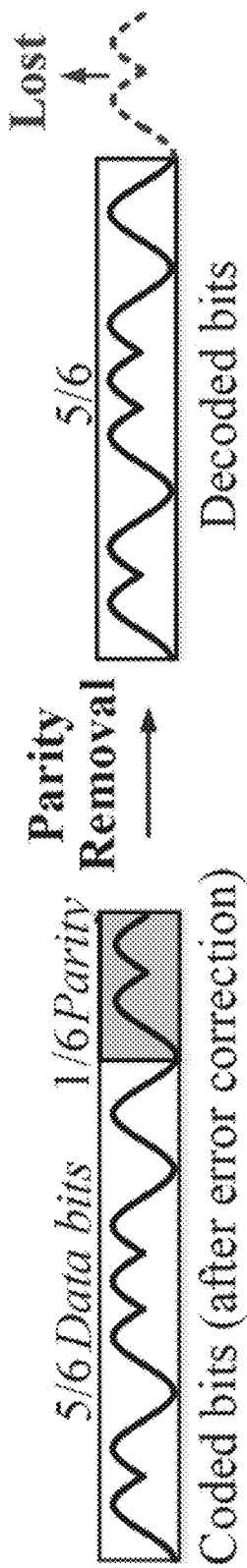
FIG. 35 is a conceptual diagram of parity removal, in accordance with one or more techniques of this disclosure.

FIG. 35 is a conceptual diagram of parity removal, in accordance with one or more techniques of this disclosure. For commodity WiFi® receivers, they are designed to receive WiFi® transmissions and will discard a portion of received waveform during the demodulation procedure. LDPC decoder takes the data bits and parity bits as input, and then tries to correct the data bits based on the parity bits. After that, it will directly drop the parity bits and only passes the corrected data bits to the user.

Although this decoding process is observed to have negligible impacts, the drop of parity bits, which contain narrowband signal, will inevitably lead to signal erasure of the IoT transmissions. For example, FIG. 35 depicts a LDPC decoding with a code ratio of 5/6, 1/6 of IoT signals are erased and may not be accessed by the techniques described herein.

The proof is based on sum-product algorithm, which is typically used in LDPC decoder for its high efficiency. Sum-product calculates the a posteriori log-likelihood ratio (LLR) $L_i$ for each bit i as defined in equation (1) where bit i is decided to be one when $L_i \leq 0$ and zero when $L_i \geq 0$.

$$L_i = \log \frac{p(x_i = 0)}{p(x_i = 1)} = r_i + \sum_{j \in A_i} E_{j,i} \quad (1)$$

The decision is the summation of $r_i$ (the initial LLR from the input) and $E_{j,i}$ (the extrinsic LLR from the parity check j to bit i). A bit is flipped when the sum of extrinsic LLRs in equation (1) is strong enough that the input and output LLR, e.g., $r_i$ and $L_i$ take different sign. The probability of flip is expressed as conditional probability in equation (2). It is shown that for non-WiFi® codeword $P_e$ is extremely small, e.g., the decoder is ineffective.

$$P_e = P(L_i \leq 0 | r_i \geq 0) = P(L_i \geq 1 | r_i \leq 1) \quad (2)$$

As equation (3) shows, the input LLR $r_i$ depends on the received value of bit i denoted as $\hat{x}_i$. p is crossover probability which is a prior knowledge of the decoder.

$$r_i = \log \frac{p(x_i = 0)}{p(x_i = 1)} = \begin{cases} \log \frac{p}{1-p} & \hat{x}_i = 1 \\ \log \frac{1-p}{p} & \hat{x}_i = 0 \end{cases} \quad (3)$$

Since $r_i \geq 0$ when $\hat{x}_i = 0$ and vice versa, the flip probability (equation (2)) may be deduced into equation (4).

$$P_e = P\left(r_i + \sum_{j \in A_i} E_{j,i} \leq 0 \mid \hat{x}_i = 0\right) = P\left(\sum_{j \in A_i} E_{j,i} < \log \frac{p}{1-p}\right) \quad (4)$$

As $$\log \frac{p}{1-p}$$

is constant, the problem is reduced to figure out the distribution of $\sum_{j \in A_i} E_{j,i}$. In sum-product, each extrinsic LLR $E_{j,i}$ is computed from all the bits associated from parity check j except i denoted as bit i'. $p_{i'} = P(x_{i'} = 1)$ is the probability that true value of bit i' is one.

$$E_{j,i} = \log\left(\frac{\frac{1}{2} + \frac{1}{2}\prod_{i' \in B_j, i' \neq i}(1 - 2p_{i'})}{\frac{1}{2} - \frac{1}{2}\prod_{i' \in B_j, i' \neq i}(1 - 2p_{i'})}\right) \quad (5)$$

A key insight is that unlike a standard WiFi® codeword, all received bits from non-WiFi® signal are uncorrelated from each other, meaning that $p_i$s are i. i. d random variables that take value either p or 1-p with 1/2 probability. Then, $E_{j,i}$ is discrete random variable as equation (6). The e is calculated as $$e = \log\left(\frac{\frac{1}{2} + \frac{1}{2}\prod_{i' \in B_j, i' \neq i}(1 - 2p)}{\frac{1}{2} - \frac{1}{2}\prod_{i' \in B_j, i' \neq i}(1 - 2p)}\right).$$

$$f(E_{j,i}) = \begin{cases} \frac{1}{2}E_{j,i} = e \\ \frac{1}{2}E_{j,i} = -e \end{cases} \quad (6)$$

Importantly, $$e << \log\frac{p}{1-p}.$$

For example, if p=0.9, $$\log\frac{p}{1-p} = 2.2,$$

while e is less than 0.001. As the received bits are uncorrelated, $E_{j,i}$s are approximately independent of each other and may be modeled as i. i. d. The summations of extrinsic LLR is very unlikely to be large enough to flip the sign of LLR. In case for p=0.9, if p=0.9, $P_e$=0.1% while experiment shows slightly higher probability because $E_{j,i}$s are not completely independent.

Figure 36A:
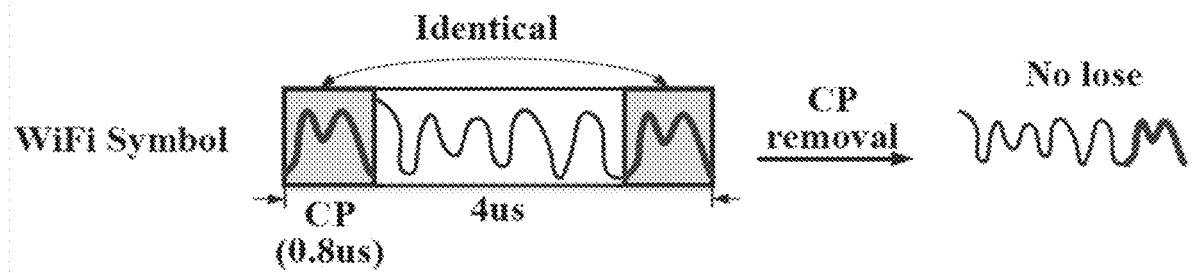
FIGS. 36A-36B are conceptual diagrams of a physical signal after a cyclic prefix (CP) removal, in accordance with one or more techniques of this disclosure.
Figure 36B:
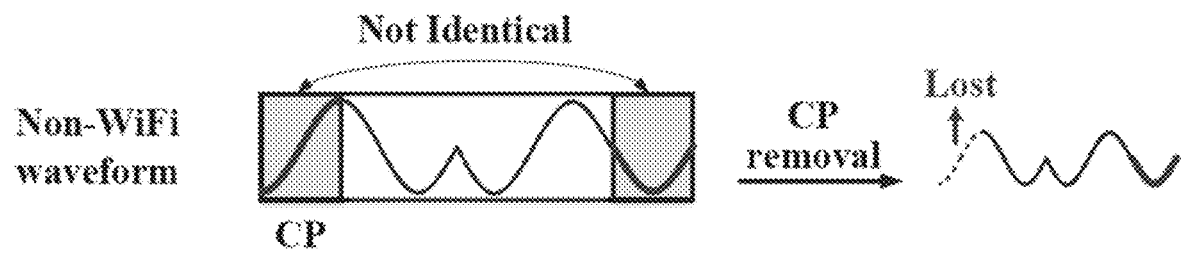

FIGS. 36A-36B are conceptual diagrams of a physical signal after a cyclic prefix (CP) removal, in accordance with one or more techniques of this disclosure. Besides LDPC decoder, CP removal procedure demonstrated in FIG. 36A also leads to signal erasure. In specific, when receiving the signal of 4 us (the duration of a WiFi® symbol), the WiFi® receiver will drop the received signal at the CP. This is because, in a WiFi® symbol, the transmitted waveform at CP and last 0.8 us of a symbol are identical, suggesting that the WiFi® demodulator will not lose any information. In contrast, due to heterogeneous wireless protocols, other wireless transmissions do not have this CP feature, as shown in FIG. 36B. As a result, when the WiFi® receiver drops the signal at the CP, it will also lose the 0.8 us original signal out of every 4 us, which might potentially lead to errors in decoding.

Figure 37:
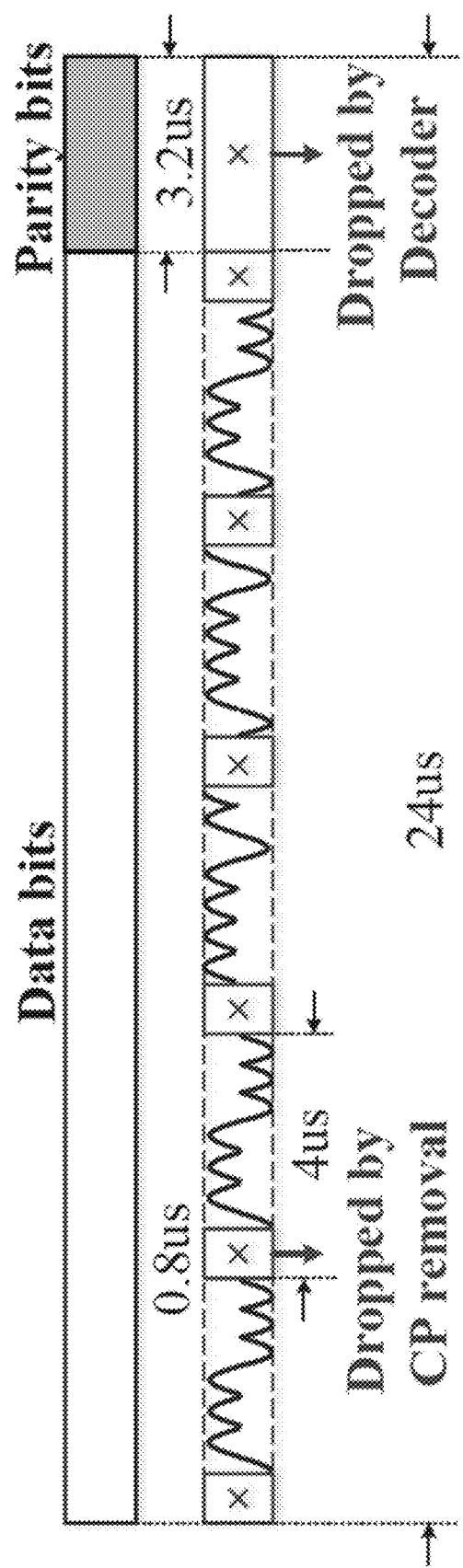
FIG. 37 is a conceptual diagram of a recovered waveform and an erased waveform, in accordance with one or more techniques of this disclosure.

FIG. 37 is a conceptual diagram of a recovered waveform and an erased waveform, in accordance with one or more techniques of this disclosure. FIG. 37 illustrates overall signal erasure when the techniques described herein examine the received WiFi® payload to receive IoT transmissions. The erased waveform partitions are marked by an 'x', which may not be accessed by the techniques described herein. Specifically, in every 24 us, the techniques described herein suffer from the one signal erasure due to parity removal, which corresponds to a duration of 3.2 us. In addition, the techniques described herein also suffer from the CP removal, where 0.8 us waveform is dropped by the WiFi® hardware in every 4 us. These two factors are the dominating waveform loss in the techniques described herein, while the techniques described herein also suffer from the quantization error when QAM mapping discretizes the samples of signal and the flipped bits (<1.8%) due to LDPC. Both quantization and bit flipping have limited impacts on waveform loss and do not lead to decoding error.

As a result, although the techniques described herein suffer from the inevitable signal loss due to WiFi® hardware constraints, it still has the feasibility of accessing the majority of the transmitted IoT waveform (e.g., 2/3 of the overall waveform). To combat this signal loss, the techniques described herein benefit from the redundancy in the IoT protocols and its IoT transmission specific demodulation, so that it is able reliably demodulate the transmitted IoT messages under the signal erasure.

Figure 38:
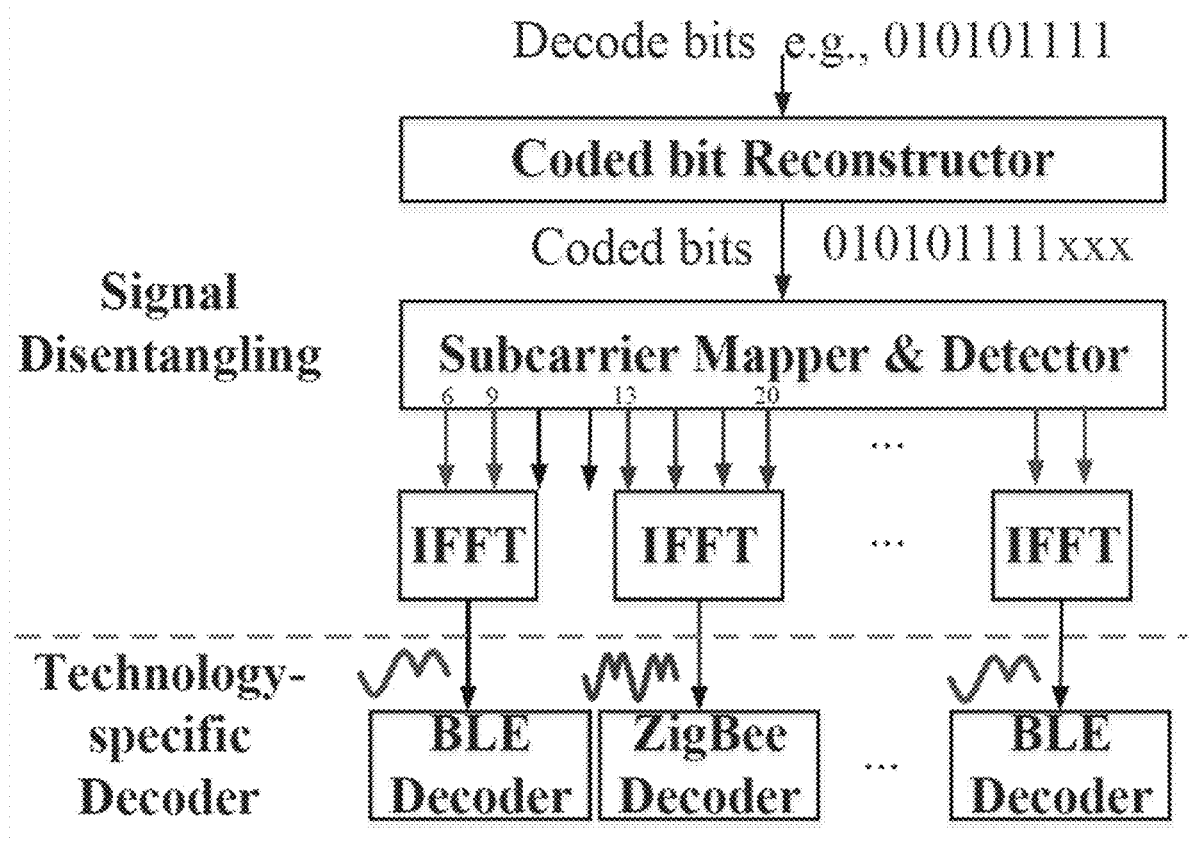
FIG. 38 is a conceptual diagram of an architecture designed to execute one or more techniques of this disclosure.

FIG. 38 is a conceptual diagram of an architecture designed to execute one or more techniques of this disclosure. Specifically, FIG. 38 depicts the procedures of the techniques described herein—the techniques described herein first take the demodulated WiFi® payload and disentangles parallel IoT transmissions from a single stream of WiFi® payload. Then it demodulates these transmissions with its technology-specific demodulation techniques for combating the signal erasure due to the hardware limitation.

As FIG. 38 demonstrates, the techniques described herein take the decoded bits available from the received payload in the application layer and then disentangles the parallel IoT transmissions for later demodulation.

Specifically, the techniques described herein first approximate the coded bits by appending the decoded bits with a sequence of unknown parity bits. As discussed below, these parity bits are dropped by the LDPC decoder, and hence may not be estimated by the techniques described herein. In contrast, the techniques described herein mark these unknown parity bits as "x", indicating that it has no knowledge on these parity bits. By doing this, the techniques described herein generate the coded bits, which have one to one correspondence to the values at each WiFi® subcarrier, so that the techniques described herein are able to map the coded bits to the corresponding subcarrier. Note that the unknown parity bits will lead to unknown values at the specific subcarriers.

With the values at WiFi® subcarriers, the techniques described herein extract the frequency components of the IoT waveforms, and thus is able to reconstruct the transmitted waveform at the time domain. To achieve this goal, the techniques described herein know the frequency range of the IoT waveforms, so that it may aggregate the corresponding subcarrier values and then perform IFFT. Take FIG. 29 for example. The ZigBee® transmits at frequency range from −4 MHz to −6 MHz, so that the techniques described herein aggregate the values from 13th subcarrier to 20th subcarrier for performing the IFFT to compute the time domain ZigBee® waveform. In reality, the knowledge of the frequency range may be obtained from the following two methods: (1) coordination from the WiFi® AP via CTC, as described below, or (2) dynamically detecting the IoT waveform with the subcarrier values introduced in Discussion.

Although the reconstructed waveform suffers from WiFi®'s practical hardware constraints, the techniques described herein introduce its technology-specific symbol recovery techniques for reliably demodulating ZigBee® and BLE frames.

Since one WiFi® channel of 20 MHz covers two ZigBee® channels, the design enables commodity WiFi® to concurrently decode the messages from two ZigBee® devices. ZigBee® adopts direct sequence spread spectrum (DSSS) and offset quadrature phase-shift keying (OQPSK) for modulation. DSSS spreads each ZigBee® symbol (4 bits) into 32 binary chips following the DSSS table (Table 3), while these binary sequences are then modulated via OQPSK modulation. This inherent redundancy introduced by DSSS allows the techniques described herein to reliably decode ZigBee® frames, as discussed later.

As for a standard ZigBee® receiver, it decodes ZigBee® transmissions by first demodulating the OQPSK waveform to generate a 32 bit chip sequence, and then mapping this bit sequence to the ZigBee® symbol. During the mapping, the ZigBee® receiver compares the hamming distance between the demodulated chip sequence and the 16 ideal chip sequences in Table 3, and chooses the symbol with smallest hamming distance as demodulated ZigBee® symbol.

TABLE 3

Symbol-to-chip mapping in ZigBee ® (802.15.4)

| Symbol (4 bits) | Chip Sequence (32 bits) |
| --- | --- |
| 0x0 | 11011001110001101010010001011110 |
| 0x1 | 11101101100111000011010100100010 |
| ... | ... |
| 0xF | 11001001011000000111011110111000 |

As analyzed below, the techniques described herein are able to reconstruct fragments of the IoT waveform, while it inevitably suffers from the signal erasure due to WiFi® hardware constraints. This knowledge motivates us to design an error aware decoding algorithm by considering the special signal erasure.

Figure 39:
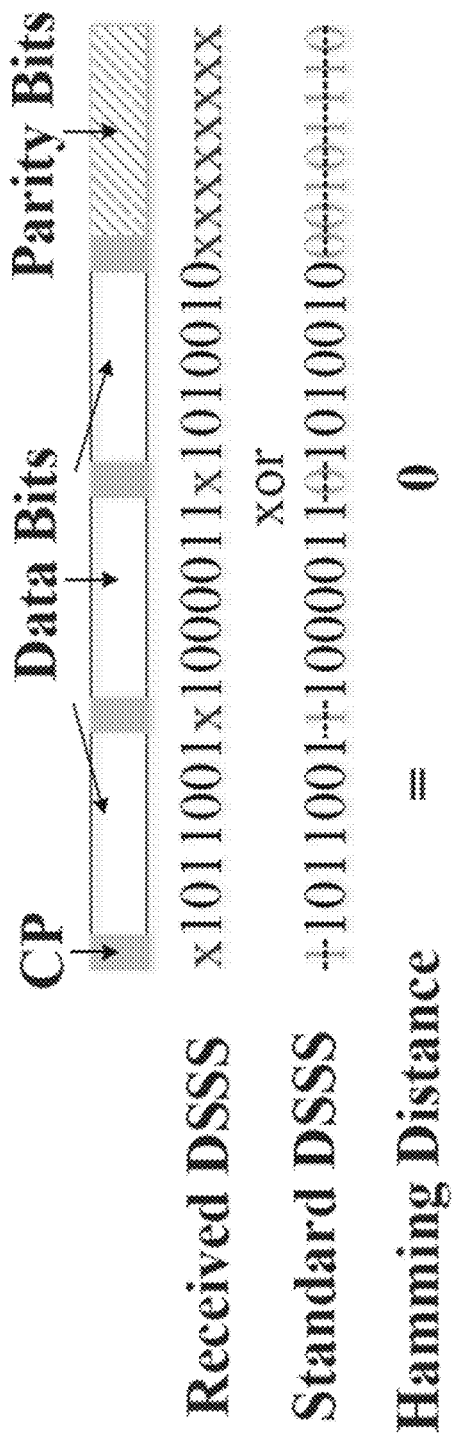
FIG. 39 is a conceptual diagram of decoding a ZigBee® symbol, in accordance with one or more techniques of this disclosure.

FIG. 39 is a conceptual diagram of decoding a ZigBee® symbol, in accordance with one or more techniques of this disclosure. Since the techniques described herein know that some ZigBee® waveforms are dropped the WiFi® receiver, it also has knowledge that this signal loss will lead to undetermined ZigBee® chip errors, which may not be trusted in the demodulation procedures. As a result, when the techniques described herein calculate the hamming distance, it will blacklist these undetermined chips, and only utilize the remaining chips for reliably demodulating the ZigBee® symbols. As shown in FIG. 39, the techniques described herein blacklist the chips which are missing due to CP removal and LDPC decoding, while it only relies on the chips which may be reconstructed in the signal disentangling. In this example, the chip sequence has the smallest hamming distance to ZigBee® symbol 0, and is thus decoded as symbol 0. By doing this, the techniques described herein reliably recover transmitted ZigBee® messages. Note that this procedure is after the detection of ZigBee® preamble, which is described above.

Figure 40A:
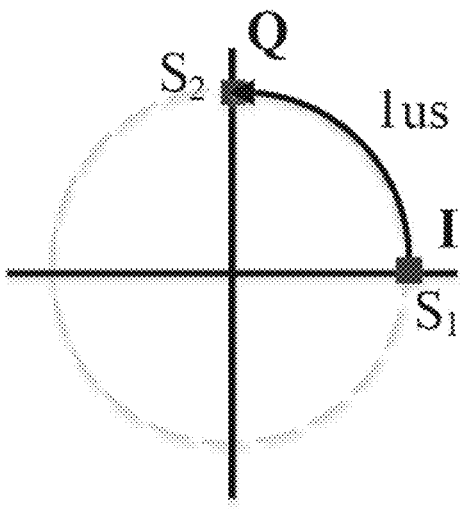
FIGS. 40A-40B are conceptual diagrams of Bluetooth® symbols, in accordance with one or more techniques of this disclosure.
Figure 40B:
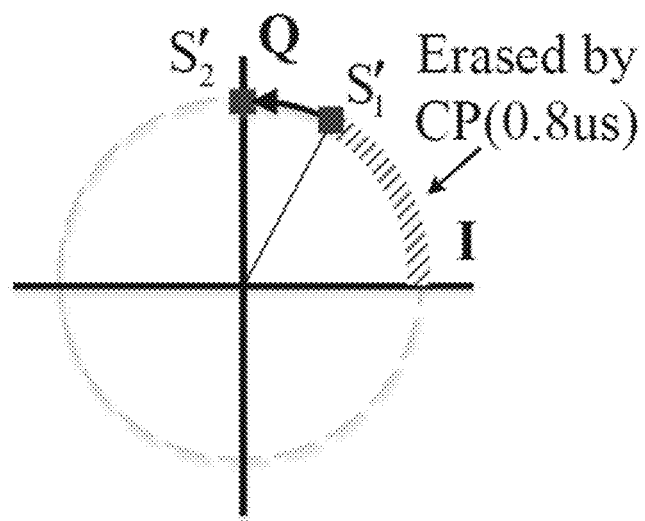

In addition to recover ZigBee®, this section introduces the recovery of BLE frame, demonstrating the techniques described herein's generic applicability. FIGS. 40A-40B are conceptual diagrams of Bluetooth® symbols, in accordance with one or more techniques of this disclosure. BLE uses Gaussian Frequency Shift Keying (GFSK) modulation, where each BLE symbol with a duration of 1 us is modulated as the phase shift over time. Specifically, symbol is are modulated by positive phase shifts $$\left(\frac{\pi}{2}\right)$$

while symbol 0s are represented by negative phase shifts $$\left(-\frac{\pi}{2}\right).$$

Different from ZigBee®'s DSSS protection mechanism, many BLE protocols do not offer channel coding, imposing serious challenges on recovering transmitted BLE symbols. To address these two issues, the techniques described herein introduce the following two techniques based on BLE's signal features for reliably recovering transmitted BLE messages.

As described below, in CP removal the WiFi® receiver drops the waveform with 0.8 us, while the waveform of one BLE bit only lasts 1 us, meaning that the majority waveform of this BLE symbol is lost.

To remedy this constraint, various techniques described herein introduce the CP-aware BLE decoding by elaborately benefiting from BLE's signal feature. FIG. 40A shows that a standard BLE symbol 1 with a symbol duration of 1 us. Suffering from the 0.8 us CP removal, the majority waveform of this BLE symbol is lost, as indicated by the dashed line. During one BLE symbol, the phase is monotonically increasing or decreasing depending on the BLE symbol, so that the techniques described herein could examine the remaining 0.2 us waveform for determining the phase shift of the BLE symbol, where positive phase shift indicates a BLE symbol 1 and negative phase shift indicates a BLE symbol 0.

As FIGS. 40A and 40B show, instead of sampling uniformly in 1 MHz, the techniques described herein carefully choose the two samples, e.g., $S'_1$ and $S'_2$ to avoid the CP region. Besides CP removal, WiFi® channel decoder erasure 3.2 us waveform in the parity bits, leading to the loss of 3 continuous BLE symbols every 18 symbols. To combat this challenge, the techniques described herein adopt forward error correction (FEC) in the BLE application layer. Specifically, the techniques described herein encode the payload with conventional code at the BLE transmitters so that the techniques described herein may reliably recover the transmitted BLE messages.

To enable the techniques described herein in a practical scenario, certain techniques described herein address the following two challenges: power control and MAC protocol among the heterogeneous systems. Since it is unrealistic to synchronize all the IoT devices and coordinate them to transmit at the same time, the IoT transmissions could happen at any time. As a result, the techniques described herein need to reliably detect the start of these IoT transmissions. the techniques described herein benefit from preambles, e.g., the predefined sequences at the beginning of IoT transmissions. For example, ZigBee® devices transmit 8 symbol 0s as the preamble. the techniques described herein match-filter the disentangled waveform in the narrowband with the predefined preamble and detects the correlation peak which indicates the start of ZigBee® transmission.

Figure 41:
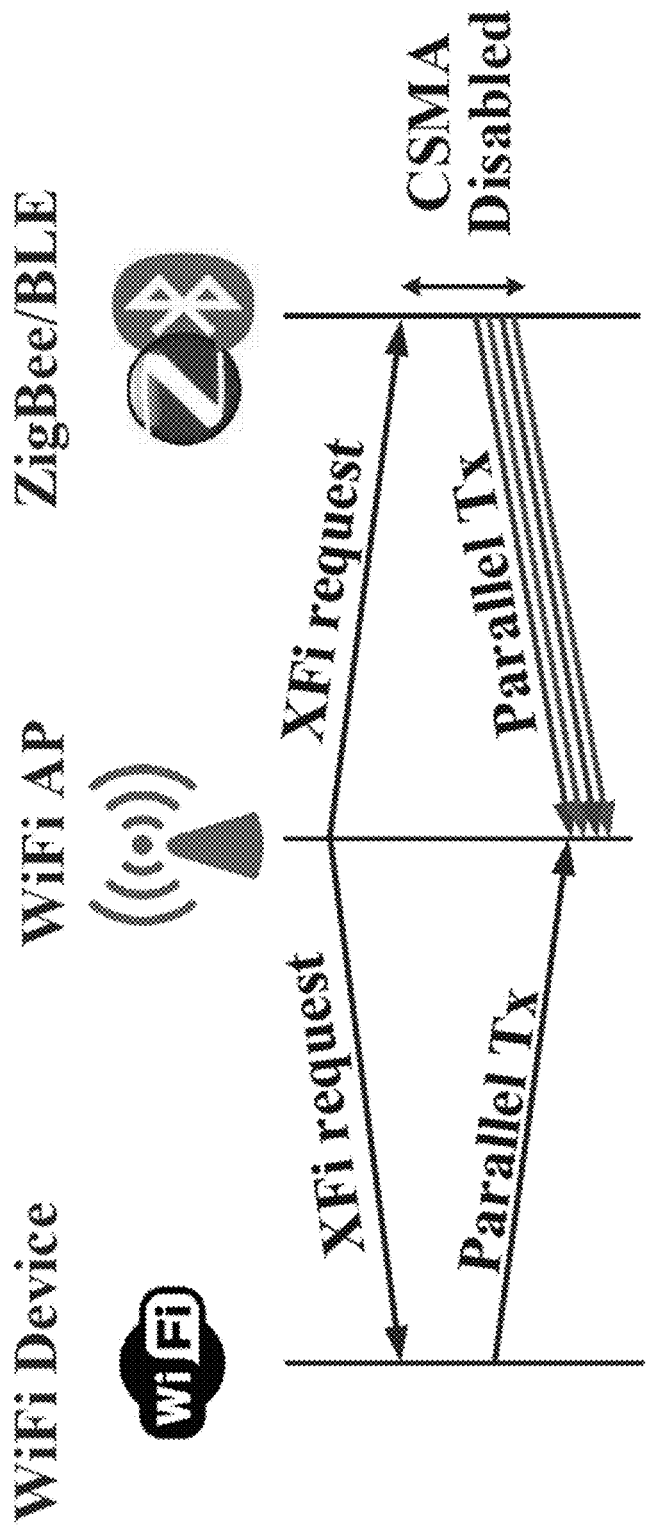
FIG. 41 is a conceptual diagram of a receive-initiated media access control (MAC), in accordance with one or more techniques of this disclosure.

FIG. 41 is a conceptual diagram of a receive-initiated media access control (MAC), in accordance with one or more techniques of this disclosure. Since the WiFi® receiver utilizes preamble detection to reject non-WiFi® transmissions, the techniques described herein require one WiFi® transmitter to help these IoT packets pass WiFi® preamble detection. A receiver-initiated MAC is shown in FIG. 41. WiFi® access point will poll both WiFi® devices and non-WiFi® devices by transmitting the request via a WiFi® packet. This WiFi® packet follows the recent CTC technique WEBee, and may be decoded by both WiFi® and non-WiFi® devices concurrently. Upon receiving the request, the WiFi® transmitter will transmit the frame with specific subcarriers nullified as introduced in 1.4.3 to both deliver WiFi® data and create channels for non-WiFi® devices, while the non-WiFi® device may temporarily disable collision-avoid mechanism, e.g., CSMA, and start to transmit. Upon receiving the mixed signal at the WiFi® AP, the techniques described herein are able to reconstruct the non-WiFi® signal and then decode them.

Figure 42:
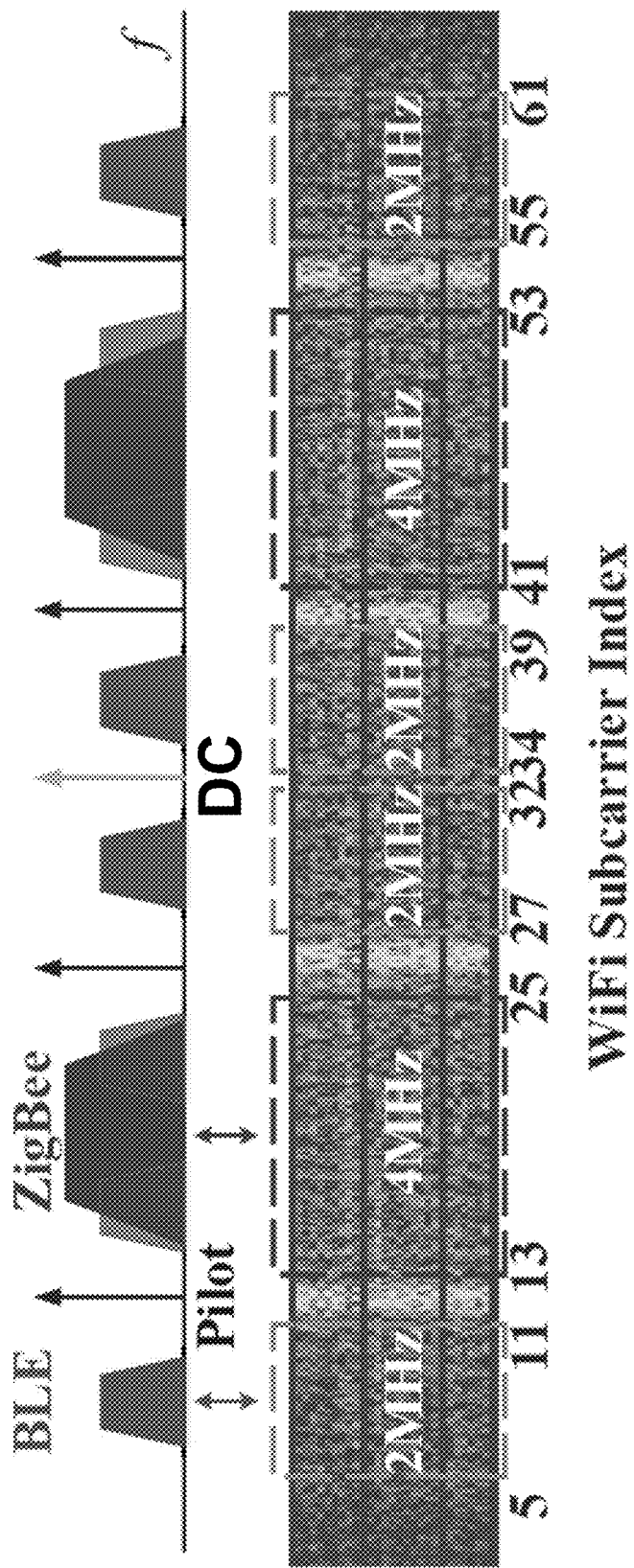
FIG. 42 is a conceptual diagram of a power spectrum and channel allocation, in accordance with one or more techniques of this disclosure.

FIG. 42 is a conceptual diagram of a power spectrum and channel allocation, in accordance with one or more techniques of this disclosure. As a high-power wireless transmission, WiFi® transmission power is significantly larger than the low-power ZigBee®/BLE transmissions, leading to the corruption of these wireless transmissions. To enable parallel receptions of WiFi®, ZigBee®, and BLE with frequency overlap, the techniques described herein introduce the power control by elaborately setting the payload on the WiFi® transmitter.

Specifically, at the WiFi® transmitter, the techniques described herein carefully choose WiFi® payload such that the data subcarriers correspond to the IoT transmissions have QAM points that are closest to zero, e.g., $f_w[n]=\pm 1 \pm 1i$. By doing this, the techniques described herein effectively decrease the energy at the frequencies which have IoT transmissions. FIG. 42 depicts the visual power spectrum density by doing this. It is obvious that the energy in data subcarriers (e.g., 5-11, 13-25, 27-33, 34-39, 41-53, 55-61) are visibly lowered than other subcarriers, e.g., pilots with value±7.

As the top of FIG. 42 shows, power control technique creates two continuous 4 MHz channels which may either pack one ZigBee® or two BLE transmission and four 2 MHz channels which may pack one BLE transmissions. the techniques described herein carefully allocate guarding bands between channels to mitigate the interferences between channels. By doing this, the techniques described herein enable concurrent reception of WiFi®, ZigBee® and BLE, which has disparate transmission power levels.

Techniques described herein not only enable parallel reception of multiple narrowband IoT transmissions, but also offers concurrent reception of WiFi® transmission. Specifically, the WiFi® transmitter may encode its data at the idle subcarriers which are not allocated to IoT devices. At the receiver side, the WiFi® payload bits are mixed from the non-WiFi® and WiFi® transmissions, while the techniques described herein could extract the data at corresponding subcarriers for decoding this WiFi® transmission. To further improve reliability, the techniques described herein introduce FEC to the transmitted WiFi® payload in the application layer.

In various techniques described herein, narrowband IoT devices may upload data to the WiFi® AP when a WiFi® device is sending to the WiFi® AP. Thus, in certain examples, the techniques described herein utilize two WiFi® devices in presence. This is because although WiFi® device is receiving all the time, the WiFi® decoder will start decode frame decode only when it receives WiFi® preamble, e.g., LTS, STS and SIGNAL field. It is common to have two WiFi® devices in one site since WiFi® has been densely deployed. For example, in home scenario, there are typically multiple WiFi® devices: WiFi® AP, laptop and a smart personal assistant. With the techniques described herein, WiFi® devices are able to upload data in parallel with ZigBee® and BLE, which significantly improves the spectrum efficiency.

Techniques described herein work completely in the application of both transmitter and receiver. Thus, neither hardware nor firmware needs to be modified in WiFi® devices while the techniques described herein only need the installation of an software that may transmit and receive data through WiFi® interface.

Techniques described herein are able to reconstruct the raw RF waveform, making it feasible dynamically detects the frequency range and protocol of IoT waveform by adopting signal classification methods.

Figure 43:
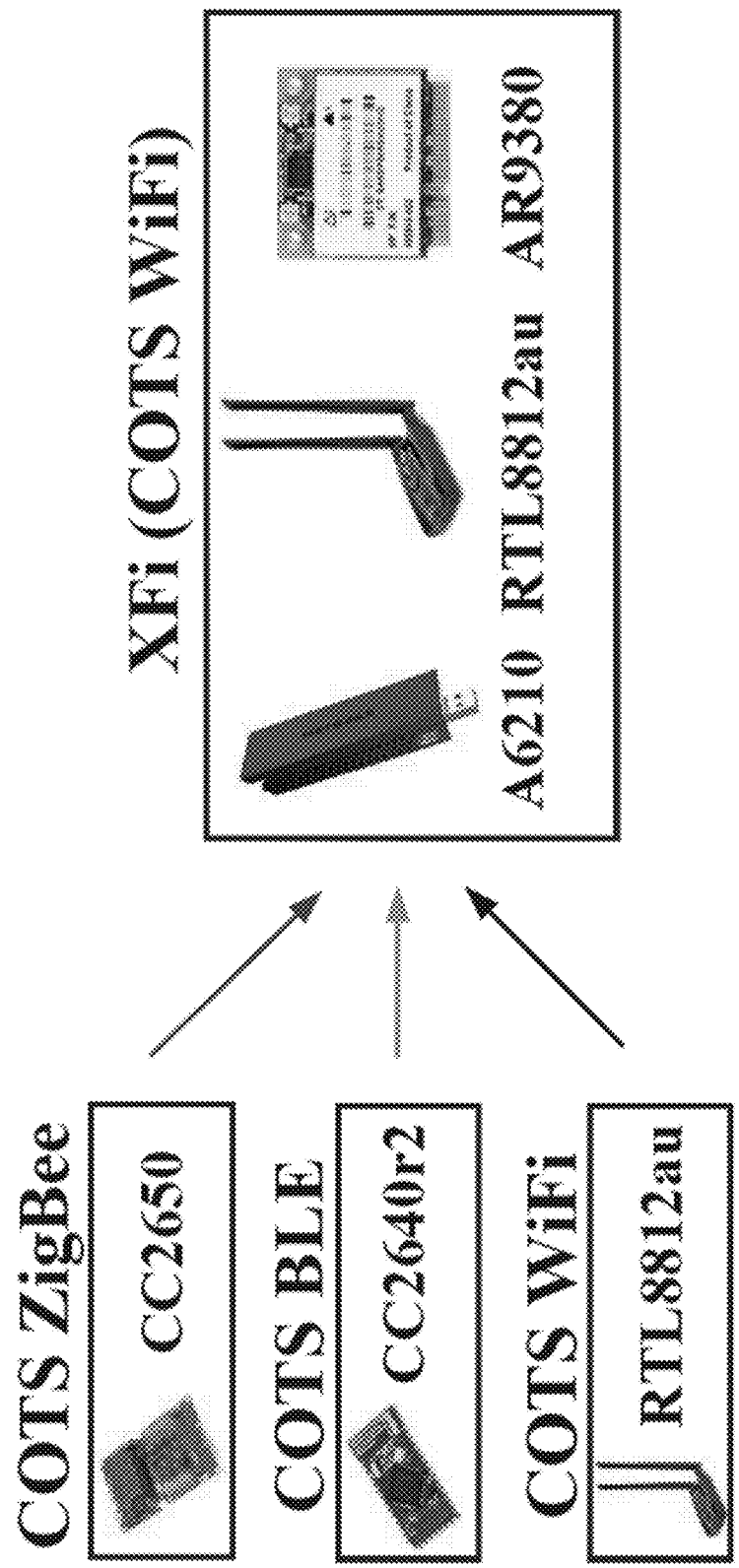
FIG. 43 is a conceptual diagram of an experimental setting for the techniques described herein, in accordance with one or more techniques of this disclosure.

FIG. 43 is a conceptual diagram of an experimental setting for the techniques described herein, in accordance with one or more techniques of this disclosure. The evaluation setting of the techniques described herein is demonstrated in FIG. 43. Both the transmitter and receivers are implemented on the commercial off-the-shelf devices. In specific, for the techniques described herein sender the techniques described herein use COTS ZigBee® (CC2650), BLE (CC2640R2) and WiFi® (RTL8812au). The core component of the techniques described herein is evaluated with three WiFi® chipsets of different brands. Since the implementation of the techniques described herein is completely in the application layer, it is fully compatible with the 802.11 standard, and works on any 802.11n WiFi® chipset.

The evaluation starts with detailed measurements of physical layers (e.g., ZigBee® chip error rate and symbol error rate), followed by the link-layer experiments (e.g., frame reception ratio and throughput) in 3 representative scenarios including office, corridor, and home. In addition to ZigBee®, the techniques described herein also were evaluated on BLE, WiFi® as well as hybrid CTC. Each experiment is repeated 10 times, while 10000 frames are received and the statistical results are obtained. Without further explanation, the distance between WiFi® transmitter and receiver is 5 meters and the transmitter adopts 64QAM modulation, 5/6 code ratio, and 15 dBm transmission power. As for the IoT devices, e.g., ZigBee® and BLE, the distances between them and the WiFi® are from 2 meters to 15 meters, while these IoT devices have the transmission power of 0 dBm.

Figure 44:
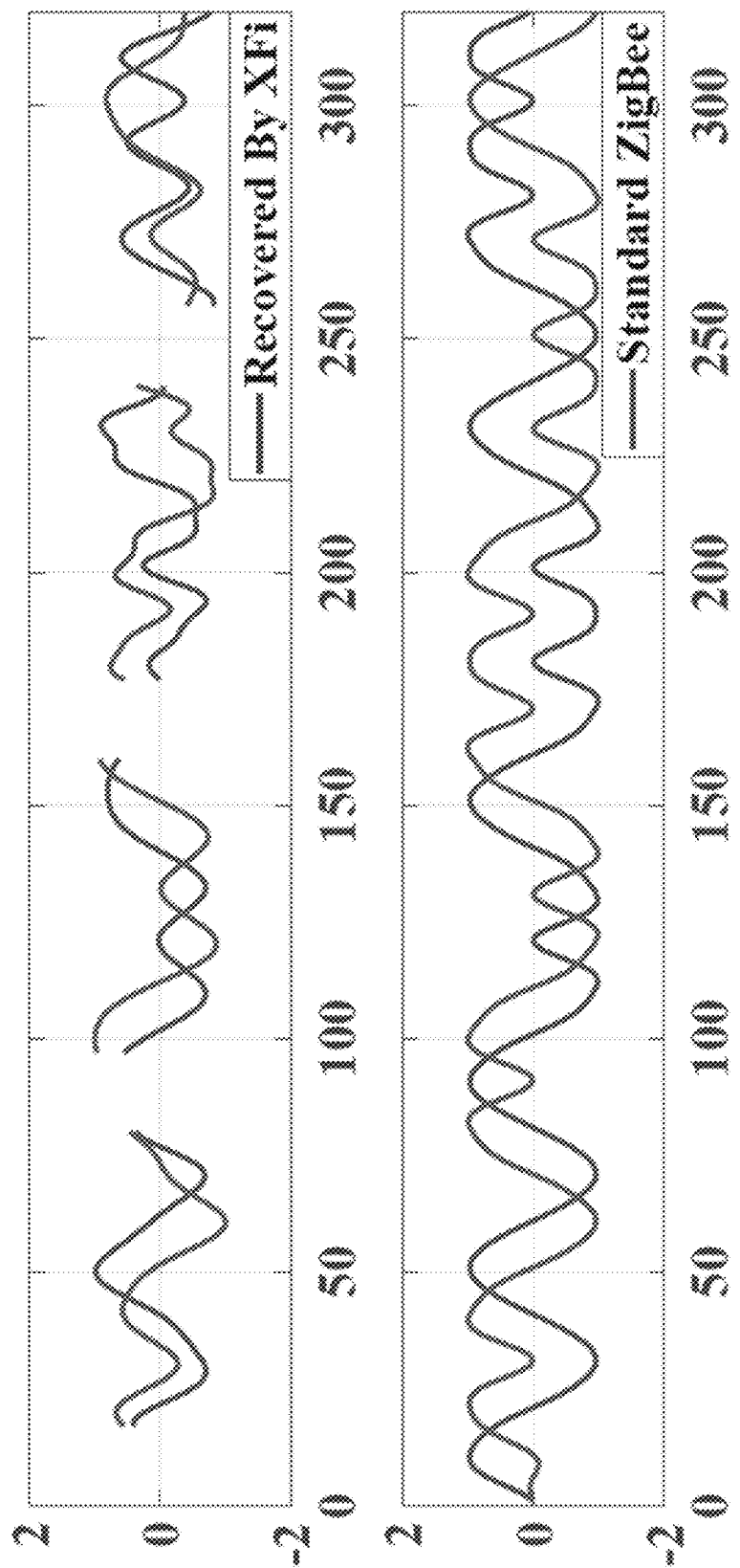
FIG. 44 is a conceptual diagram of a reconstructed and a standard ZigBee® signal, in accordance with one or more techniques of this disclosure.

FIG. 44 is a conceptual diagram of a reconstructed and a standard ZigBee® signal, in accordance with one or more techniques of this disclosure. The techniques described herein needs to disentangle the mixed IoT waveforms and then combat the signal erasure due to WiFi® hardware limitation for successful demodulation of the IoT transmissions. To evaluate this PHY-layer waveform, the techniques described herein compare the reconstructed ZigBee® signal with standard ZigBee® waveform. As FIG. 44 illustrates, the narrowband signal unraveled by the techniques described herein approximates the standard one well for most of the time, while the techniques described herein may not recover the signal dropped due to the WiFi® hardware limitation, e.g., CP removal and parity removal.

In addition, the techniques described herein quantify the accuracy by examining the chips decoded from the disentangled waveform depicted in FIG. 44. Standard ZigBee® receiver collects 32 ZigBee® chips and matches them to the DSSS sequence of the ZigBee® symbol with minimal hamming distance. In the techniques described herein, a portion of ZigBee® chips (4 to 11 depending on the position of this ZigBee® symbol) are dropped by CP removal and channel decoder, while the techniques described herein blacklist them in the hamming distance calculation.

Figure 45A:
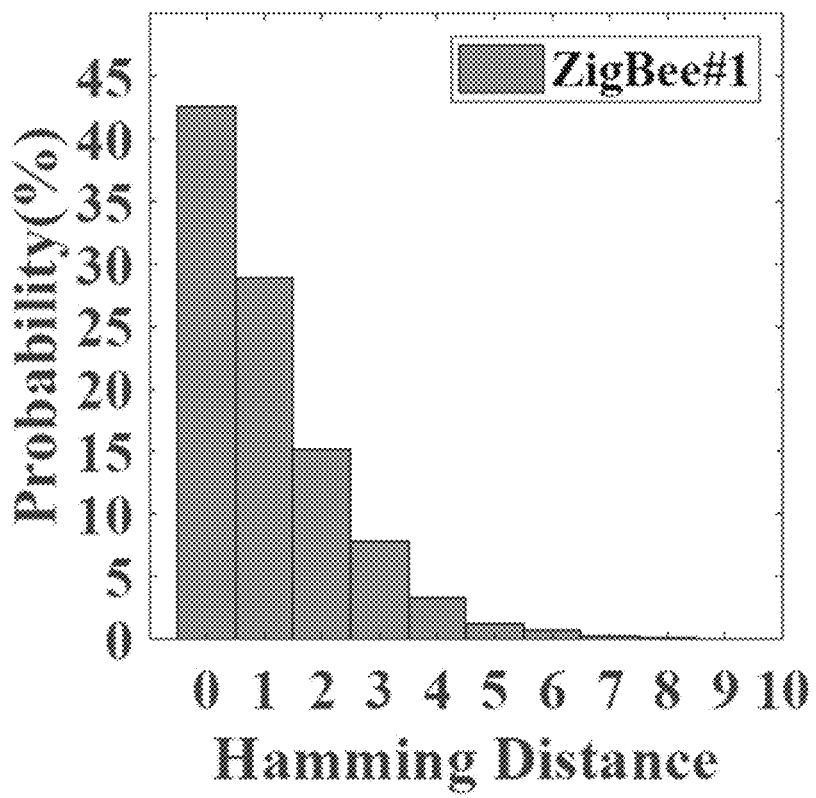
FIGS. 45A-45B are conceptual diagrams of chip error distribution in ZigBee® symbols, in accordance with one or more techniques of this disclosure.
Figure 45B:
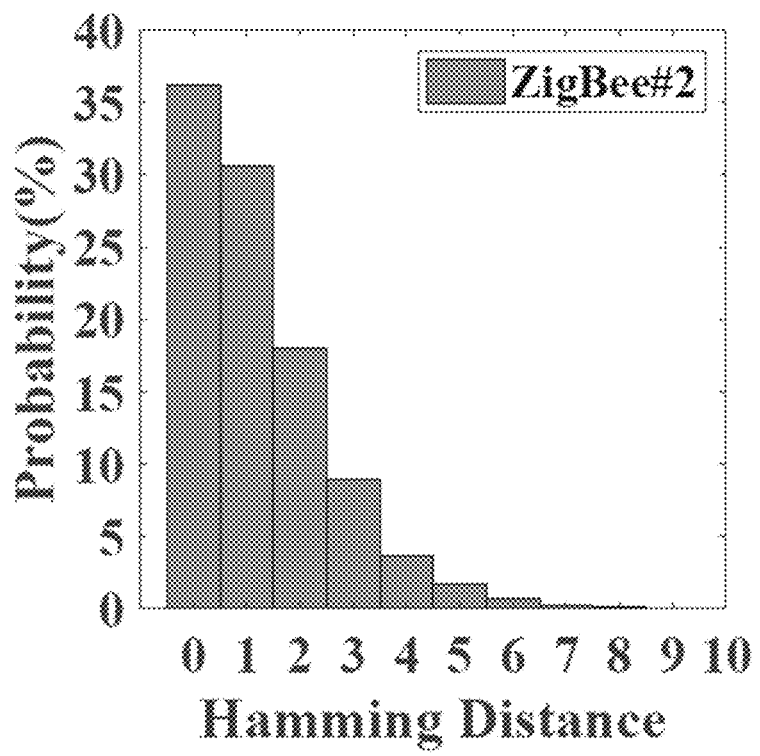

FIGS. 45A-45B are conceptual diagrams of chip error distribution in ZigBee® symbols, in accordance with one or more techniques of this disclosure. In this experiment, two ZigBee® devices transmit in parallel following in FIGS. 45A-45B, while the experiment described herein fixes the distance between ZigBee® transmitters and WiFi® receiver to be 2 meters. The distributions of chip errors are depicted in the FIGS. 45A-45B. Over 90% of symbols have less than 3 chips errors, which may be tolerated by DSSS. In addition, these two streams of ZigBee® signal demonstrate similar chip errors distribution, showing that the techniques described herein may disentangle multiple ZigBee® transmissions from WiFi® payload and independently decode them in parallel.

Figure 46:
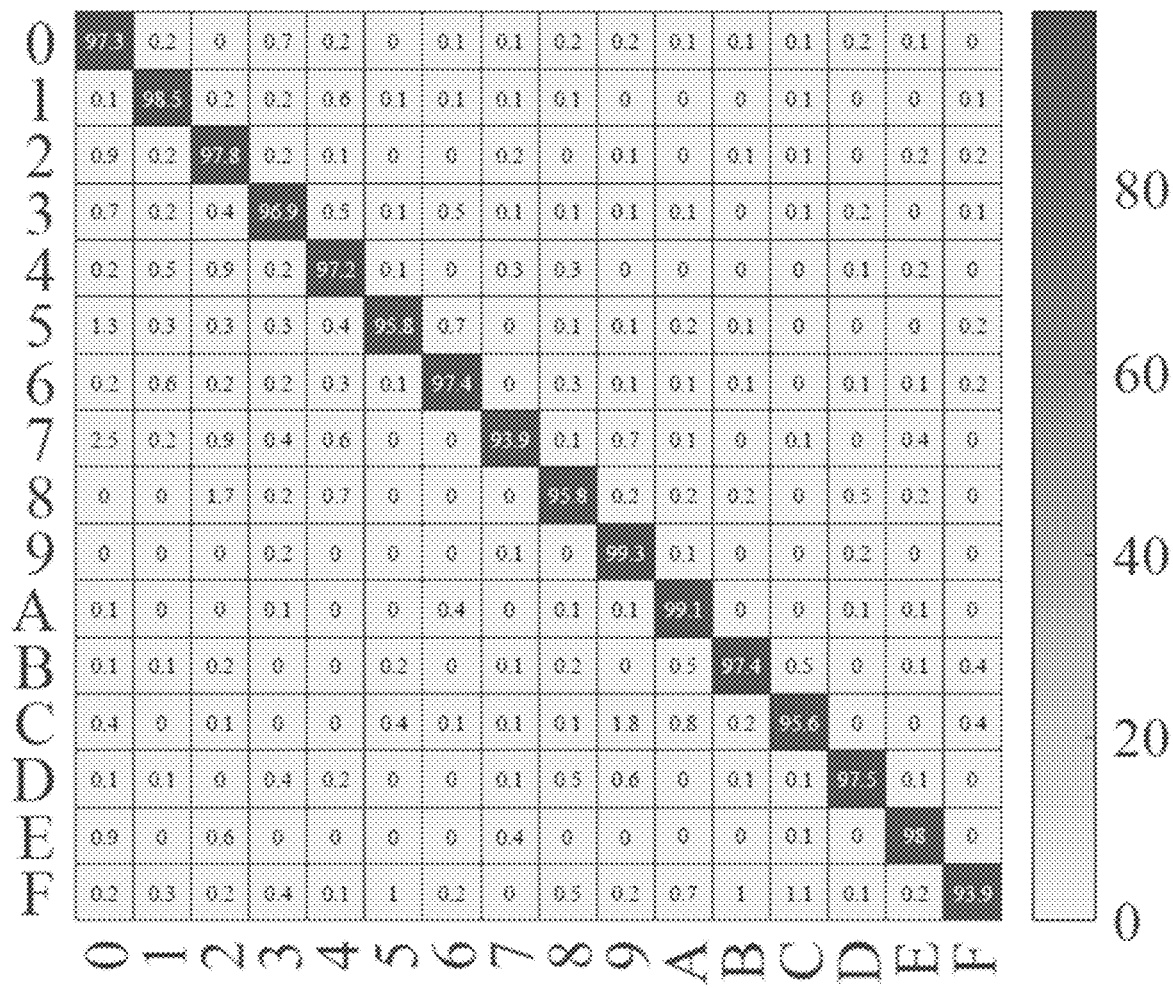
FIG. 46 is a conceptual diagram of a confusion matrix for ZigBee® symbols, in accordance with one or more techniques of this disclosure.

In the experiment, the techniques described herein decode the recovered waveform collected using DSSS with blacklisting, while the accuracy of each ZigBee® symbol is illustrated using the confusion matrix depicted in FIG. 46. Specifically, all the sixteen ZigBee® symbols may be demodulated with high accuracy (94%-99.1%). FIG. 46 is a conceptual diagram of a confusion matrix for ZigBee® symbols, in accordance with one or more techniques of this disclosure.

Figure 47A:
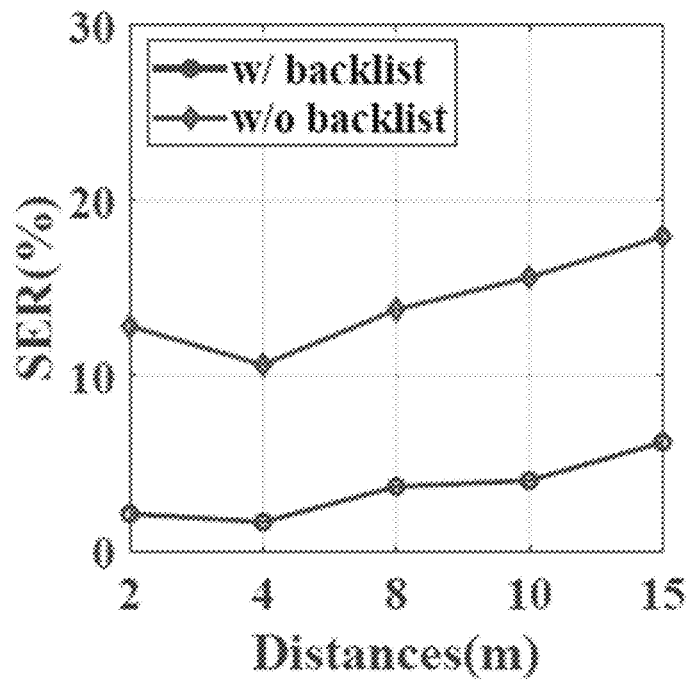
FIGS. 47A-47B are conceptual diagrams of symbol error rate (SER) and distances, in accordance with one or more techniques of this disclosure.
Figure 47B:
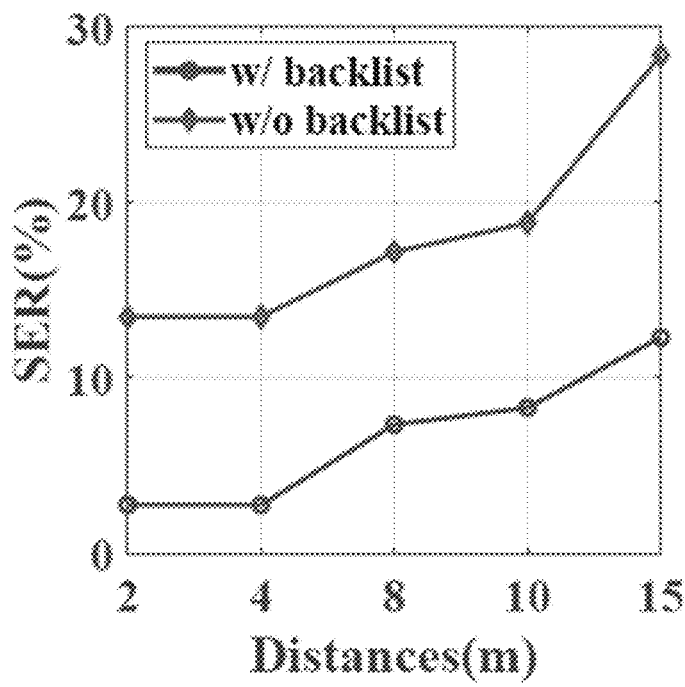

FIGS. 47A-47B are conceptual diagrams of symbol error rate (SER) and distances, in accordance with one or more techniques of this disclosure. To further illustrate the performance gain when the techniques described herein blacklist the unknown chips dropped by WiFi® decoder, the techniques described herein collect the symbol error rate (SER) of ZigBee® frames in a wide range of communication distances from 2 meters to 15 meters. In the FIGS. 47A-47B, the techniques described herein compare the SER in both ZigBee® channel under and without the blacklist design. In the case of no blacklist, techniques described herein take the values of the dropped chips as random and match recovered chip sequence with complete 32-bit standard DSSS sequence while the techniques described herein only match known chips with the shortened DSSS sequence if blacklist is adopted. FIGS. 47A-47B clearly demonstrate that blacklisting unknown chips may significantly improve the accuracy of the symbol decoding in the varied distances. For example, blacklist reduces the SER from 12% to 1% in the 2 meters while in longer distance, e.g., 10 meters, blacklist is able to keep the SER under 10%, which dramatically enhances the reliability of communication.

Figure 48A:
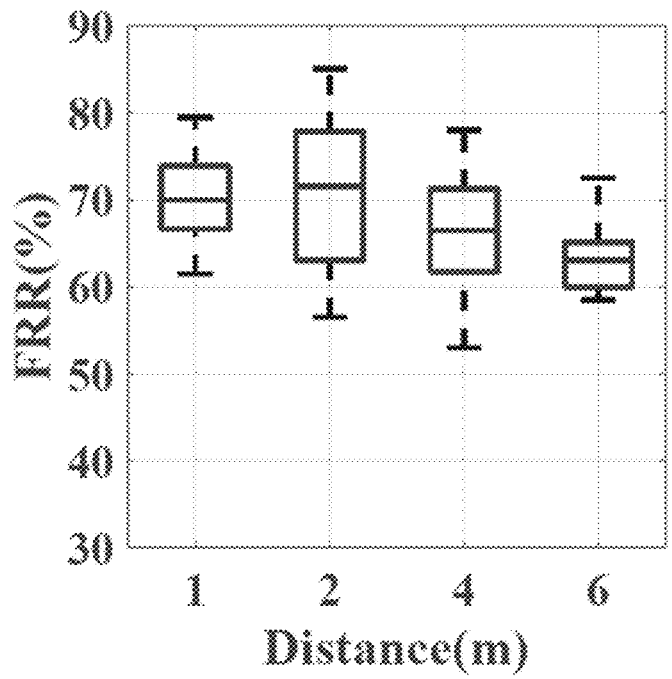
FIGS. 48A-48B are conceptual diagrams of frame reception ratios and distances, in accordance with one or more techniques of this disclosure.
Figure 48B:
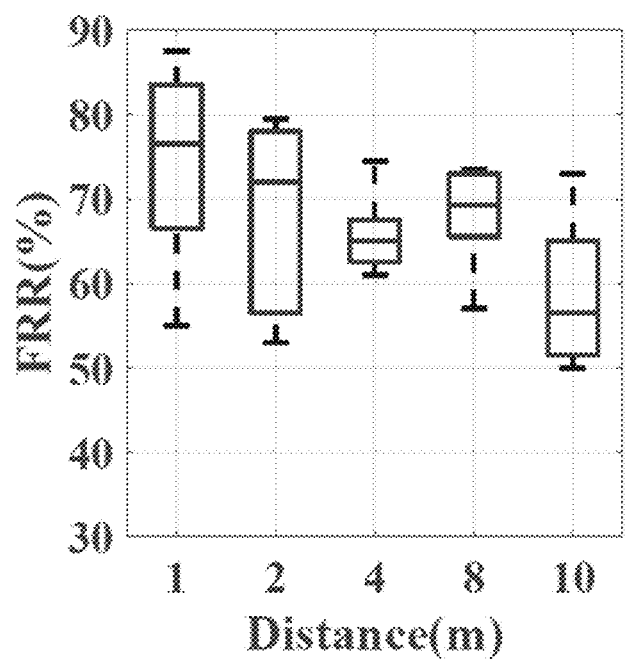

FIGS. 48A-48B are conceptual diagrams of frame reception ratios and distances, in accordance with one or more techniques of this disclosure. ZigBee® frame reception ratios (FRR) are evaluated in two sites: laboratory room and corridor. FIGS. 48A-48B plots the average FRR in both ZigBee® channels under varying distances. The size of ZigBee® frame is fixed to 14 symbols and one frame is considered failed if any single symbol is incorrectly decoded. In the noisy lab environment FRR drops slowly to 60% with increasing distances from 1 to 6 meters, while in the corridor the techniques described herein may achieve more than 70% FRR at the distance of 8 meters. Note that distance between the WiFi® transmitter and the WiFi® receiver is 5 m in this experiment. the techniques described herein show reliable FRR performance when IoT devices upload data at longer distances than WiFi® transmitter, demonstrating that the techniques described herein are able to effectively receive the low-power IoT transmissions with its power control.

Figure 49A:
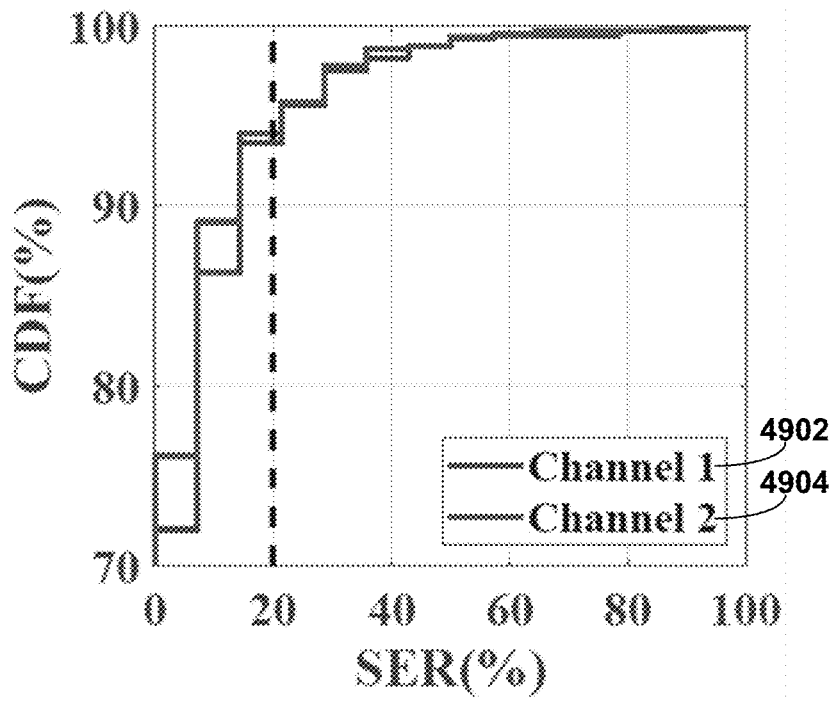
FIGS. 49A-49B are conceptual diagrams of cumulative distribution functions of SER, in accordance with one or more techniques of this disclosure.
Figure 49B:
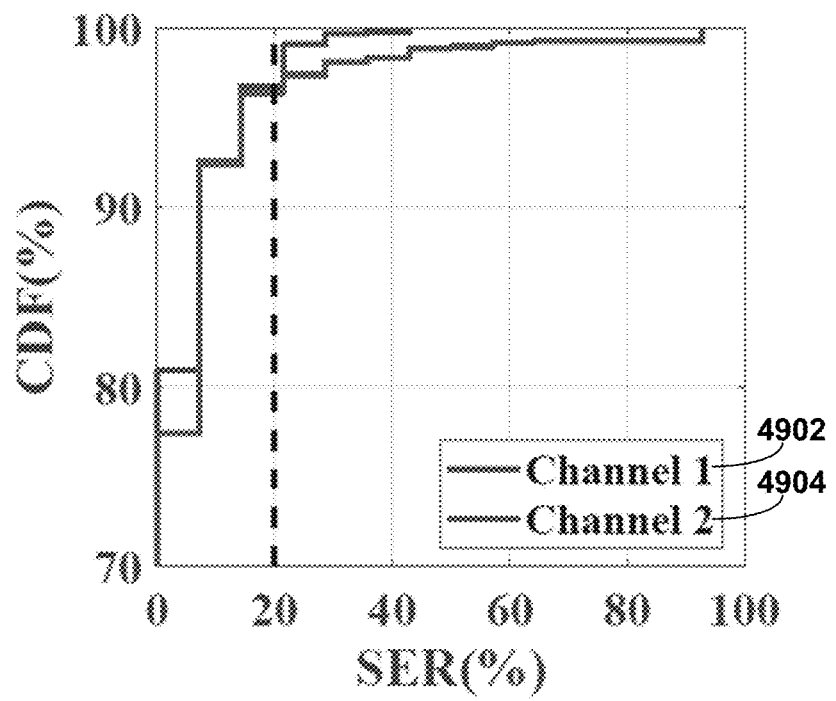

FIGS. 49A-49B are conceptual diagrams of cumulative distribution functions of SER, in accordance with one or more techniques of this disclosure. To have a deep look into the failed frames, the techniques described herein further examine the distribution of symbol error among received frames. The cumulative distribution functions of symbol error ratio are plotted in FIGS. 49A-49B. It is observed that in both sites and both channels (e.g., first channel 4902 and second channel 4904), more than 95% of frames suffer from less than 20% symbol error, indicating only 2 or fewer symbol errors in the majority of the failed frames. These errors are mainly due to the combination of CP removal and the parity removal, which are resulted by the WiFi® hardware limitation.

Figure 50A:
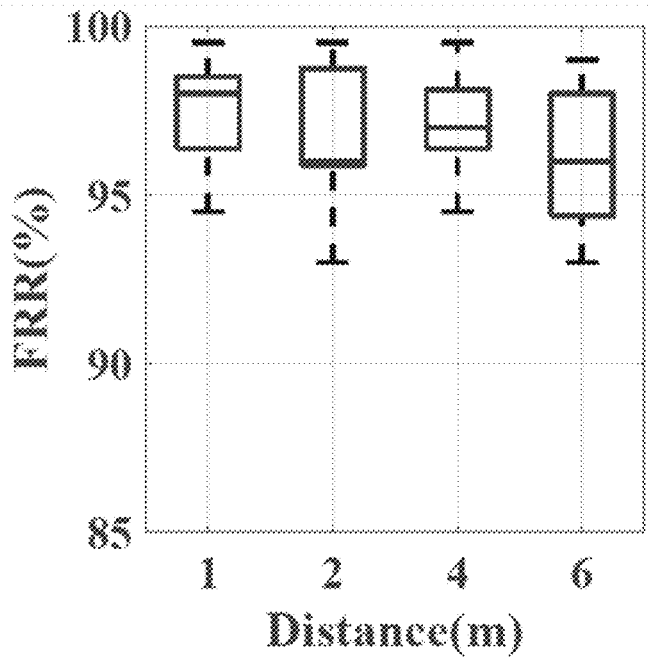
FIGS. 50A-50B are conceptual diagrams of frame reception ratios with Reed-Solomon (RS) code, in accordance with one or more techniques of this disclosure.
Figure 50B:
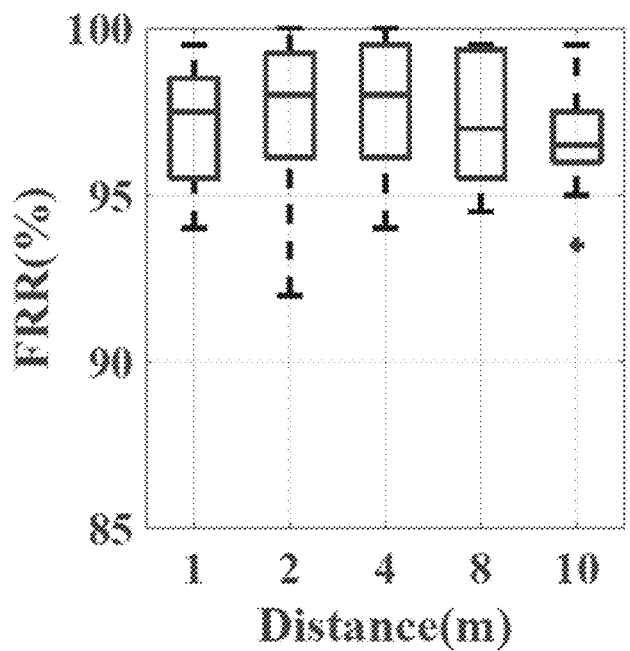

FIGS. 50A-50B are conceptual diagrams of frame reception ratios with Reed-Solomon (RS) code, in accordance with one or more techniques of this disclosure. In order to further improve the reliability of communication, the techniques described herein transmit ZigBee® frames with 4/7 Reed-Solomon (RS) Code. As demonstrated in FIGS. 50A-50B, the techniques described herein achieve ≥96% frame reception ratios in varying sites and distances after the RS code is adopted. The result shows that the techniques described herein may enable reliable reception of the IoT transmissions for achieving ubiquitous connectivity.

Figure 51:
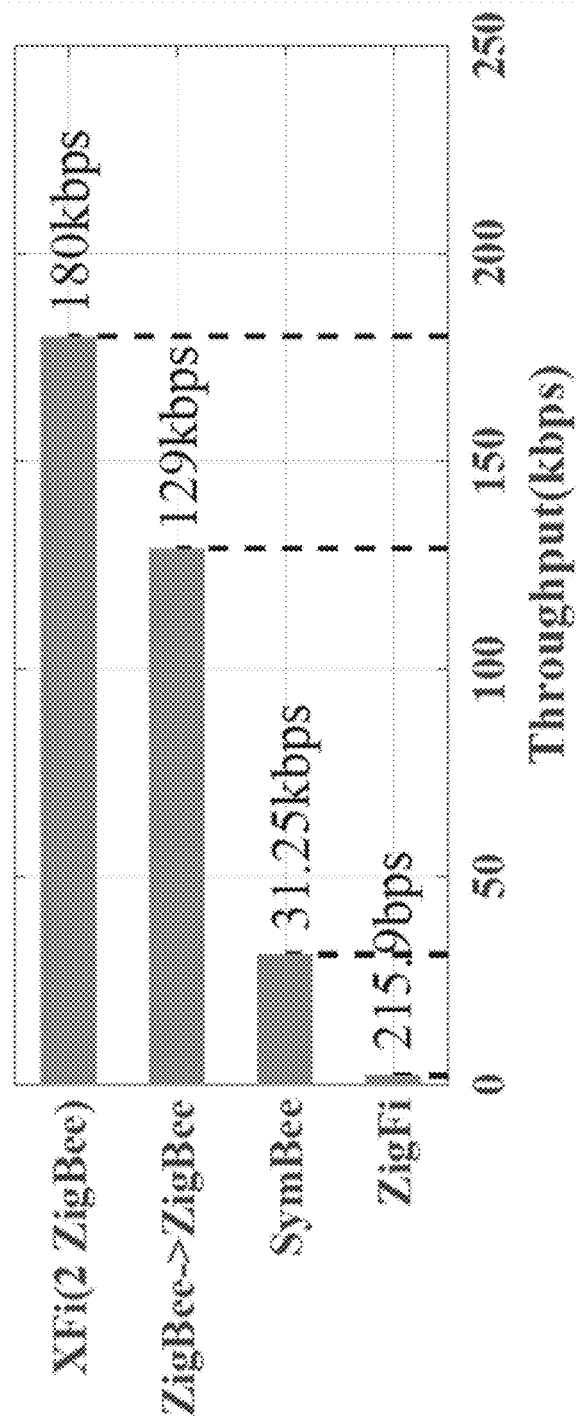
FIG. 51 is a conceptual diagram of ZigBee® and cross-technology communication (CTC) modes, in accordance with one or more techniques of this disclosure.

FIG. 51 is a conceptual diagram of ZigBee® and cross-technology communication (CTC) modes, in accordance with one or more techniques of this disclosure. In FIG. 51, the diagram demonstrates the gain of throughput via enabling parallel reception of the IoT transmissions. Specifically, two ZigBee® transmits in parallel to a WiFi® via the techniques described herein, while the techniques described herein achieve a 180 kbps throughput, which is 47% improvement compared to the sequential data uploading scheme using ZigBee® sink (129 kbps). The improvement largely comes from the capability to concurrently receive and disentangle multiple ZigBee® transmissions while it doesn't strictly double the throughput due to the overhead of RS code. Note that the latest WiFi® standard, e.g., IEEE 802.1 lax provides 160 MHz bandwidth, which allows the techniques described herein to support 16 parallel ZigBee® devices and potentially improves the overall throughput by 11 times.

Figure 52A:
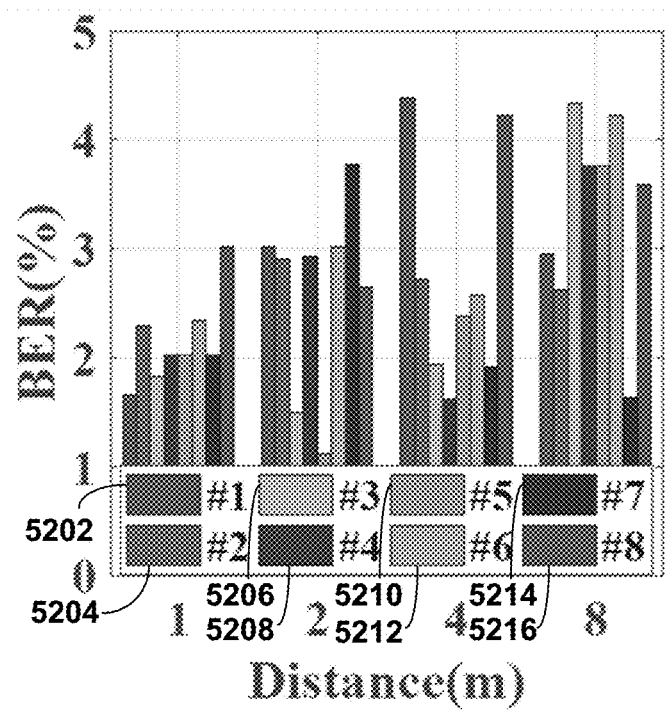
FIGS. 52A-52B are conceptual diagrams of bit-error rate (BER) and throughput in Bluetooth®, in accordance with one or more techniques of this disclosure.
Figure 52B:
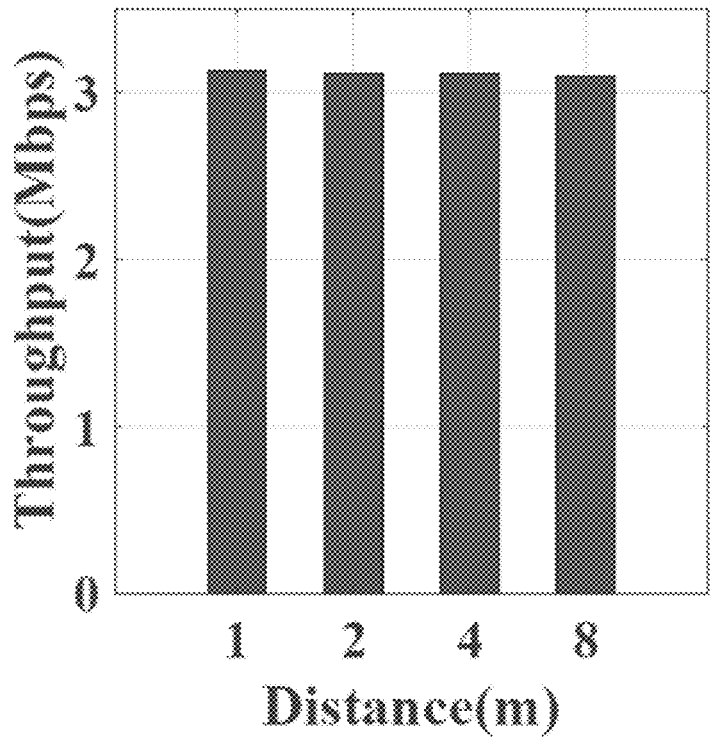

FIGS. 52A-52B are conceptual diagrams of bit-error rate (BER) and throughput in Bluetooth®, in accordance with one or more techniques of this disclosure. the techniques described herein may decode 8 parallel BLE transmissions (e.g., first transmission 5202, second transmission 5204, third transmission 5206, fourth transmission 5208, fifth transmission 5210, sixth transmission 5212, seventh transmission 5214, and eighth transmission 5216), demonstrating its generality. As described above, to further increase the reliability, the techniques described herein protect the BLE payload with 1/2 FEC code. In FIGS. 52A-52B, the diagrams plot the bit error ratios of decoded BLE bits in 8 channels over varying distances. In all the BLE channels, the techniques described herein achieve ≥97% accuracy in 1 m distance while keeping BER under 4.5% in 8 m. The overall throughput is depicted in FIG. 10(*b*). In four different distances, the average aggregated throughput of 8 channels is 3.2 Mbps.

FIG. 53 is a conceptual diagram of a comparison of Bluetooth® and other CTCs, in accordance with one or more techniques of this disclosure. When compared to sequential upload scheme (0.803 Mbps), the techniques described herein improve the throughput by 3 times as demonstrated in FIG. 53, since it offers 8 parallel BLE transmissions. In addition, due to the FEC overhead, the gain is not strictly seven times. In comparison with state-of-the-art BLE to WiFi® CTC (e.g., B2W2), the techniques described herein increase the throughput by 1000× because the techniques described herein work in physical layer while B2W2 relies on coarse-gained CSI.

Figure 54A:
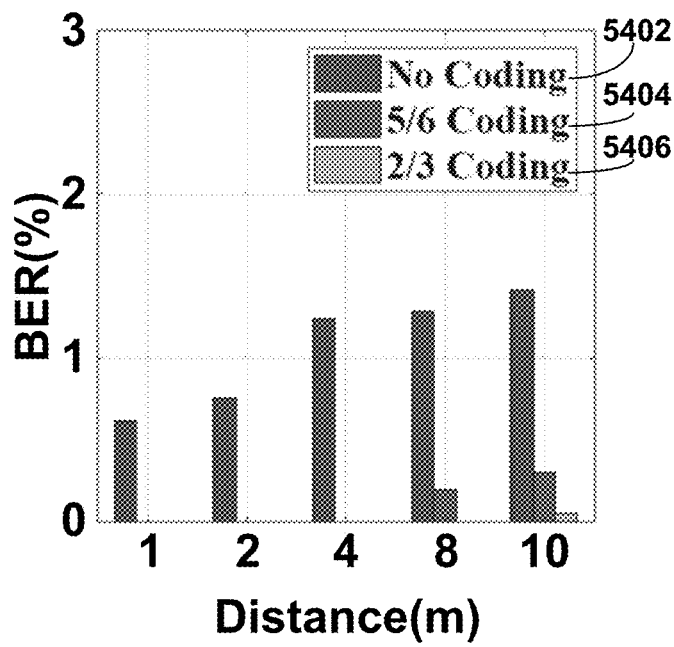
FIGS. 54A-54B are conceptual diagrams of BER and distance, in accordance with one or more techniques of this disclosure.
Figure 54B:
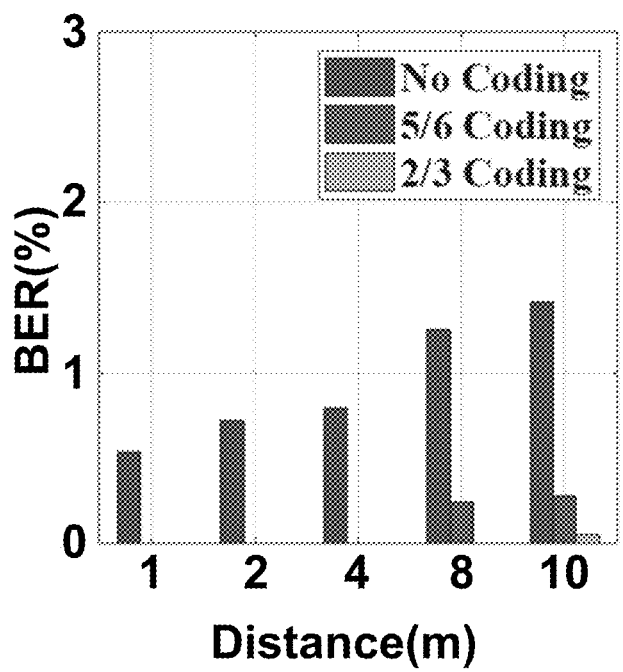

FIGS. 54A-54B are conceptual diagrams of BER and distance, in accordance with one or more techniques of this disclosure. The techniques described herein not only enable parallel uploading of multiple narrowband IoT devices, but also offers the parallel uplink of narrowband IoT and WiFi®. This experiment uses power control technology to create one or two channels for ZigBee® transmission while WiFi® client is transmitting data in the rest of subcarriers. As shown in FIGS. 54A-54B, the bit error ratios of WiFi® with different coding ratios under one or two parallel ZigBee® uploading. It may be observed from the result that in short distances, e.g., 1 m, WiFi® BER is still slightly above 0, which is because the non-WiFi® signal nullifies the LDPC decoder making it unable to correct the errors introduced by environment noises. BER of WiFi® increases moderately as the WiFi® client moves away from the AP due to the decrease of signal to noise ratio (SNR). Also, since ZigBee® and WiFi® are allocated to different subcarriers, the number of parallel ZigBee® does not impact WiFi® transmissions at other subcarriers. Finally, as the BER is below 1.5% even in ten meters, it may easily be recovered through FEC coding in the application level. In the conceptual diagrams of FIGS. 54A-54B, 5402 represents 'NoCoding,' 5404 represents '5/6 Coding,' and 5406 represents '2/3 Coding.'

Figure 55A:
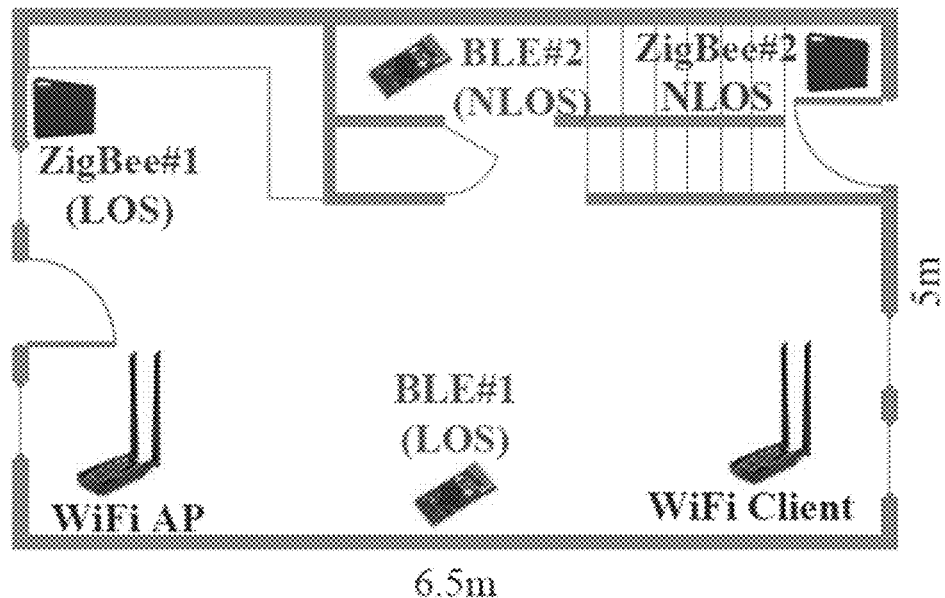
FIGS. 55A-55B are conceptual diagrams of a hybrid CTC deployment and a spectrum allocation, in accordance with one or more techniques of this disclosure.
Figure 55B:
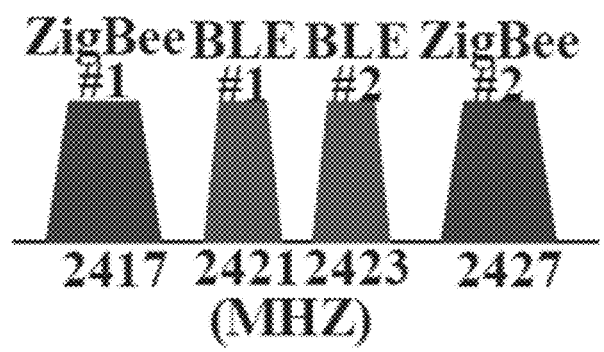

FIGS. 55A-55B are conceptual diagrams of a hybrid CTC deployment and a spectrum allocation, in accordance with one or more techniques of this disclosure. One unique feature of the techniques described herein is the generic design which may support hybrid IoT devices in parallel. The hybrid CTC is evaluated in the real-world scenario depicted in FIG. 55A which includes one WiFi® AP, one WiFi® client, two ZigBee® devices and two BLE devices. This is a typical setting in real life, where there may be multiple heterogenous wireless device, e.g., laptop, ZigBee® thermometer, ZigBee® anti-theft monitor, BLE health monitor and BLE wristband. The spectrum allocation schemes are shown in FIG. 55B.

Figure 56:
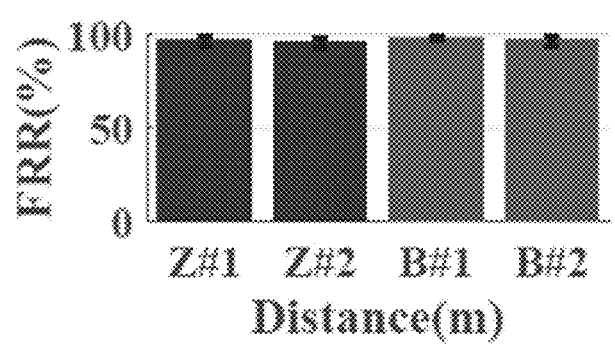
FIG. 56 is a conceptual diagram of a frame reception ratio for a hybrid CTC deployment, in accordance with one or more techniques of this disclosure.

FIG. 56 is a conceptual diagram of a frame reception ratio for a hybrid CTC deployment, in accordance with one or more techniques of this disclosure. FIG. 56 shows that the techniques described herein achieve high reliability in both line-of-sight (LOS) and none-line-of-sight (NLOS) for both technologies.

In various techniques described herein, narrowband IoT devices may upload data to the WiFi® AP when a WiFi® device is sending to the WiFi® AP. So the techniques described herein requires two WiFi® devices in presence. This is because although WiFi® device is receiving all the time, the WiFi® decoder will start decode frame decode only when it receive WiFi® preamble, e.g., LTS, STS and SIGNAL field. It is common to have two WiFi® devices in one site since WiFi® has been widely used. For example, in home scenario, there are typically multiple WiFi® devices: WiFi® AP, smartphone, laptop and a smart personal assistant. With the techniques described herein, WiFi® devices are able to upload data with in parallel ZigBee® and BLE which significantly improve the spectrum efficiency of WiFi® devices. In addition, the techniques described herein works completely in the application of both transmitter and receiver. Thus, neither hardware nor firmware need to be modified in WiFi® devices while the techniques described herein only needs the installation of an APP that may receive the techniques described herein request and upload data with specific contents.

Figure 57:
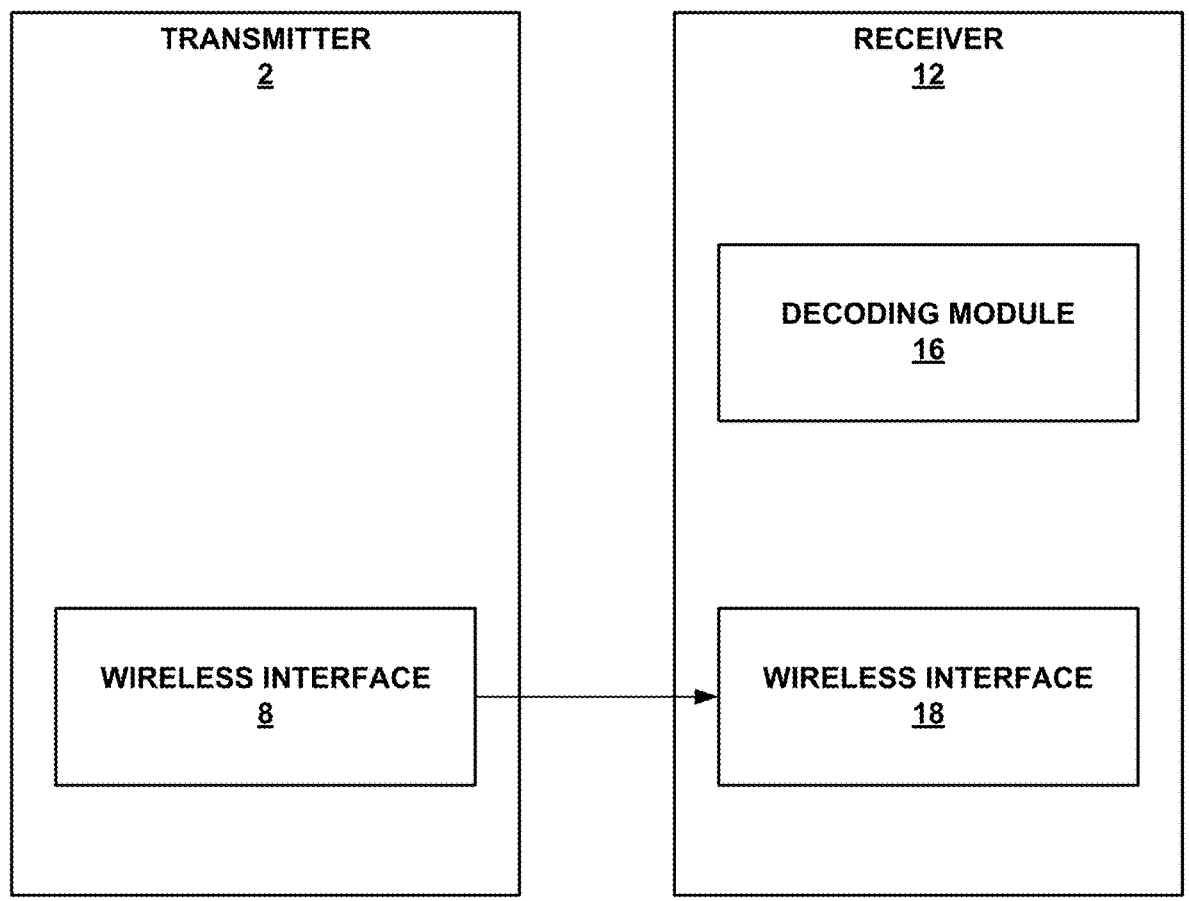
FIG. 57 is a block diagram of a transmitter device and a receiver device that may be configured to perform one or more techniques in accordance with the current disclosure.

FIG. 57 is a block diagram of a transmitter device 2 and a receiver device 12 that may be configured to perform one or more techniques in accordance with the current disclosure. In the example of FIG. 57, transmitter device 2 and receiver device 12 may be a router, a wireless access point, a mobile device, or any computing device that may be configured to communicate with other wireless devices according wireless protocols. Transmitter device 2 and/or receiver device 12 may include any number of different portable electronic computing devices, such as a wearable computing device (e.g., a computerized watch, computerized headphones, a computerized headset, computerized glasses, etc.), a smart phone, a personal digital assistant (PDA), a laptop computer, a portable gaming device, a portable media player, an e-book reader, etc. Transmitter device 2 and/or receiver device 12 may include various input and output components, including, e.g. one or more processors, memory, telemetry modules, cellular network antennas, a display, one or more UI elements, sensors, and a power source like a rechargeable battery. Module 16 of receiver device 12 may perform operations described herein using software, hardware, firmware, or a mixture of hardware, software, and firmware residing in and executing on receiver device 12.

In the example of FIG. 57, wireless interface 8 may be operable to communicate with external devices via one or more wired and/or wireless networks by transmitting and/or receiving network signals on the one or more networks. Examples of wireless interface 8 may include a network interface card (e.g. such as an Ethernet card), an optical transceiver, a radio frequency transceiver, a GPS receiver, or any other type of device that may send and/or receive information. Other examples of wireless interface 8 may include Near-Field Communications (NFC) units, Bluetooth® radios, short wave radios, cellular data radios, wireless network radios, as well as universal serial bus (USB) controllers. Wireless interface 8 may be configured to operate in accordance with a first wireless protocol, which may include one or more of the WiFi® protocol, the Bluetooth® protocol, or the LTE protocol. Wireless interface 18 of receiver 12 may be similar to wireless interface 8 of transmitter 2, except for wireless interface 18 may be configured to operate in accordance with a second wireless protocol, which may include one or more of the WiFi® protocol, the Bluetooth® protocol, or the ZigBee® protocol, and wireless interface 18 may be configured to operate according to a different protocol than wireless interface 8.

In accordance with the techniques described herein, wireless interface 18 may receive one or more data packets via one or more signals output by wireless interface 8 according to a wireless protocol that wireless interface 18 is not configured to operate in accordance with. Decoding module 16 may determine a bit sequence for at least one data packet of the one or more data packets. For example, decoding module 16 may determine a frequency of the one or more signals and, using the frequency of the one or more signals, determine a bit sequence for at least one data packet of the one or more data packets.

Figure 58:
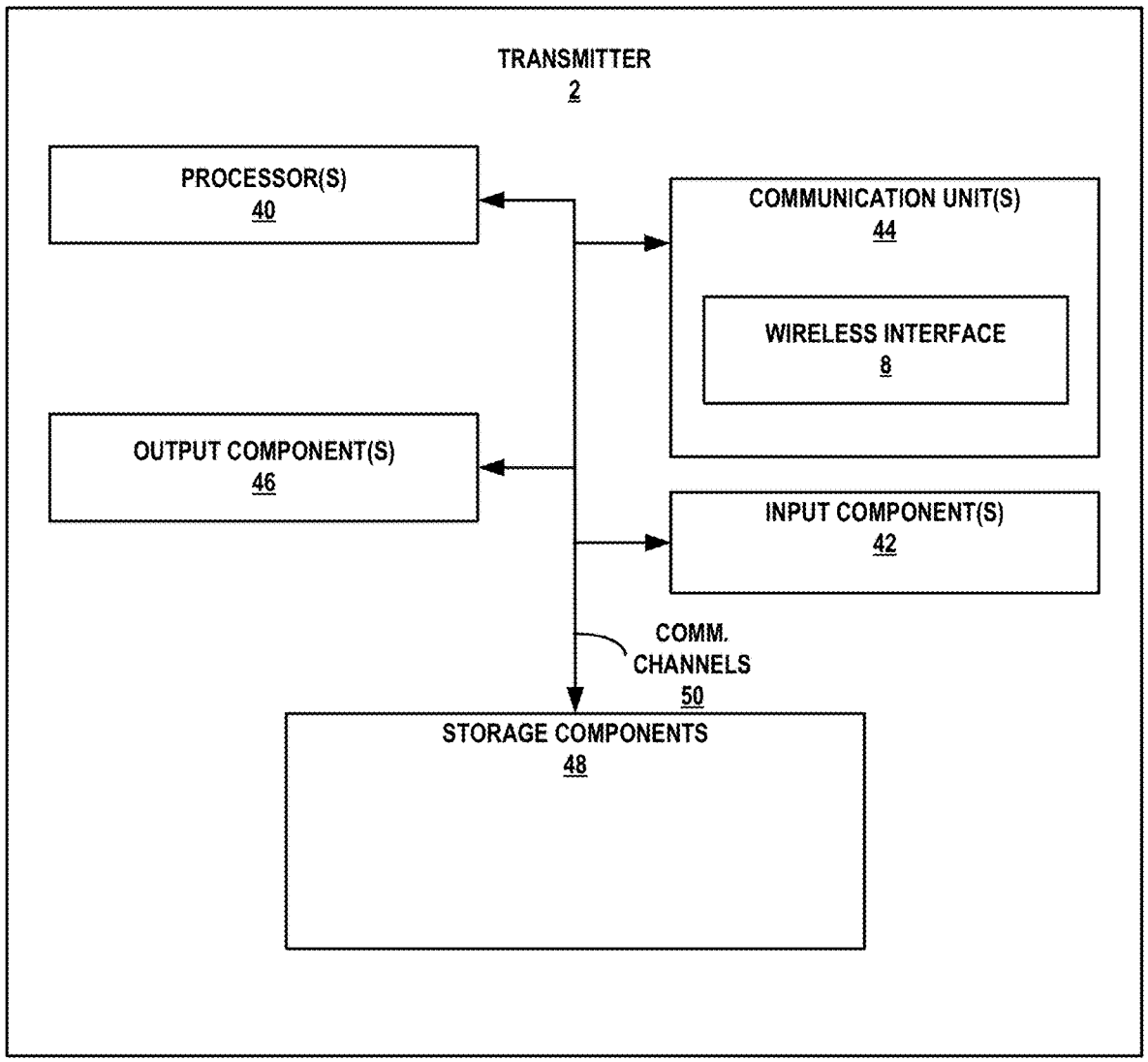
FIG. 58 is a block diagram of a more detailed view of a transmitter device that may be configured to perform one or more techniques in accordance with the current disclosure.

FIG. 58 is a block diagram of a more detailed view of a transmitter device 2 that may be configured to perform one or more techniques in accordance with the current disclosure. Transmitter 2 of FIG. 58 is described below as an example of transmitter 2 of FIG. 57. FIG. 58 illustrates only one particular example of transmitter 2, and many other examples of transmitter 2 may be used in other instances and may include a subset of the components included in example transmitter 2 or may include additional components not shown in FIG. 58.

As shown in the example of FIG. 58, transmitter 2 includes one or more processors 40, one or more input components 42, one or more communication units 44 that include wireless interface 8, one or more output components 46, and one or more storage components 48. Storage components 48 of transmitter 2 include modules. Communication channels 50 may interconnect each of the components 40, 44, 42, 46, and 48 for inter-component communications (physically, communicatively, and/or operatively). In some examples, communication channels 50 may include a system bus, a network connection, an inter-process communication data structure, or any other method for communicating data.

One or more communication units 44 of transmitter 2 may communicate with external devices via one or more wired and/or wireless networks by transmitting and/or receiving network signals on the one or more networks. Examples of communication units 44 include a network interface card (e.g. such as an Ethernet card), an optical transceiver, a radio frequency transceiver, a GPS receiver, or any other type of device that may send and/or receive information. Other examples of communication units 44 may include short wave radios, cellular data radios, wireless network radios, as well as universal serial bus (USB) controllers. Communication units 44, which may include wireless interface 8, may be configured to operate in accordance with a first wireless protocol, such as Bluetooth® or ZigBee®.

One or more input components 42 of transmitter 2 may receive input. Examples of input are tactile, audio, and video input. Input components 42 of transmitter 2, in one example, includes a presence-sensitive input device (e.g., a touch sensitive screen, a PSD), mouse, keyboard, voice responsive system, video camera, microphone or any other type of device for detecting input from a human or machine. In some examples, input components 42 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 46 of transmitter 2 may generate output. Examples of output are tactile, audio, and video output. Output components 46 of transmitter 2, in one example, includes a PSD, sound card, video graphics adapter card, speaker, cathode ray tube (CRT) monitor, liquid crystal display (LCD), or any other type of device for generating output to a human or machine.

One or more processors 40 may implement functionality and/or execute instructions associated with transmitter 2. Examples of processors 40 include application processors, display controllers, auxiliary processors, one or more sensor hubs, and any other hardware configure to function as a processor, a processing unit, or a processing device. Modules may be operable by processors 40 to perform various actions, operations, or functions of transmitter 2. For example, processors 40 of transmitter 2 may retrieve and execute instructions stored by storage components 48 that cause processors 40 to perform the operations of modules. The instructions, when executed by processors 40, may cause transmitter 2 to store information within storage components 48.

One or more storage components 48 within transmitter 2 may store information for processing during operation of transmitter 2 (e.g., transmitter 2 may store data accessed by modules 4 and 6 during execution at transmitter 2). In some examples, storage component 48 is a temporary memory, meaning that a primary purpose of storage component 48 is not long-term storage. Storage components 48 on transmitter 2 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 48, in some examples, also include one or more computer-readable storage media. Storage components 48 in some examples include one or more non-transitory computer-readable storage mediums. Storage components 48 may be configured to store larger amounts of information than typically stored by volatile memory. Storage components 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 48 may store program instructions and/or information (e.g., data) associated with modules 4 and 6. Storage components 48 may include a memory configured to store data or other information associated with modules.

In accordance with the techniques described herein, wireless interface 8 may be configured to output one or more signals according to a wireless protocol, such as ZigBee®, WiFi®, or BLE. In some examples, wireless interface 8 may receive, in accordance with a first wireless protocol, a polling signal broadcast by a wireless access point in accordance with a second wireless protocol different than the first wireless protocol. Wireless interface 8 may then output a polling response in accordance with the first wireless protocol via one or more frequencies corresponding to a group of subcarrier values. In these instances, the first wireless protocol is one of a ZigBee® protocol or a Bluetooth® protocol, and the second wireless protocol is a WiFi® protocol. Wireless interface 8 may also output at least one signal in accordance with the first wireless protocol via the one or more frequencies corresponding to the group of subcarrier values.

In other instances, when wireless interface operates in accordance with WiFi®, wireless interface 8 may receive, in accordance with a first wireless protocol, a polling signal broadcast by a wireless access point in accordance with the first wireless protocol. Wireless interface 8 may output a polling response in accordance with the first wireless protocol via one or more frequencies corresponding to a group of subcarrier values.

Figure 59:
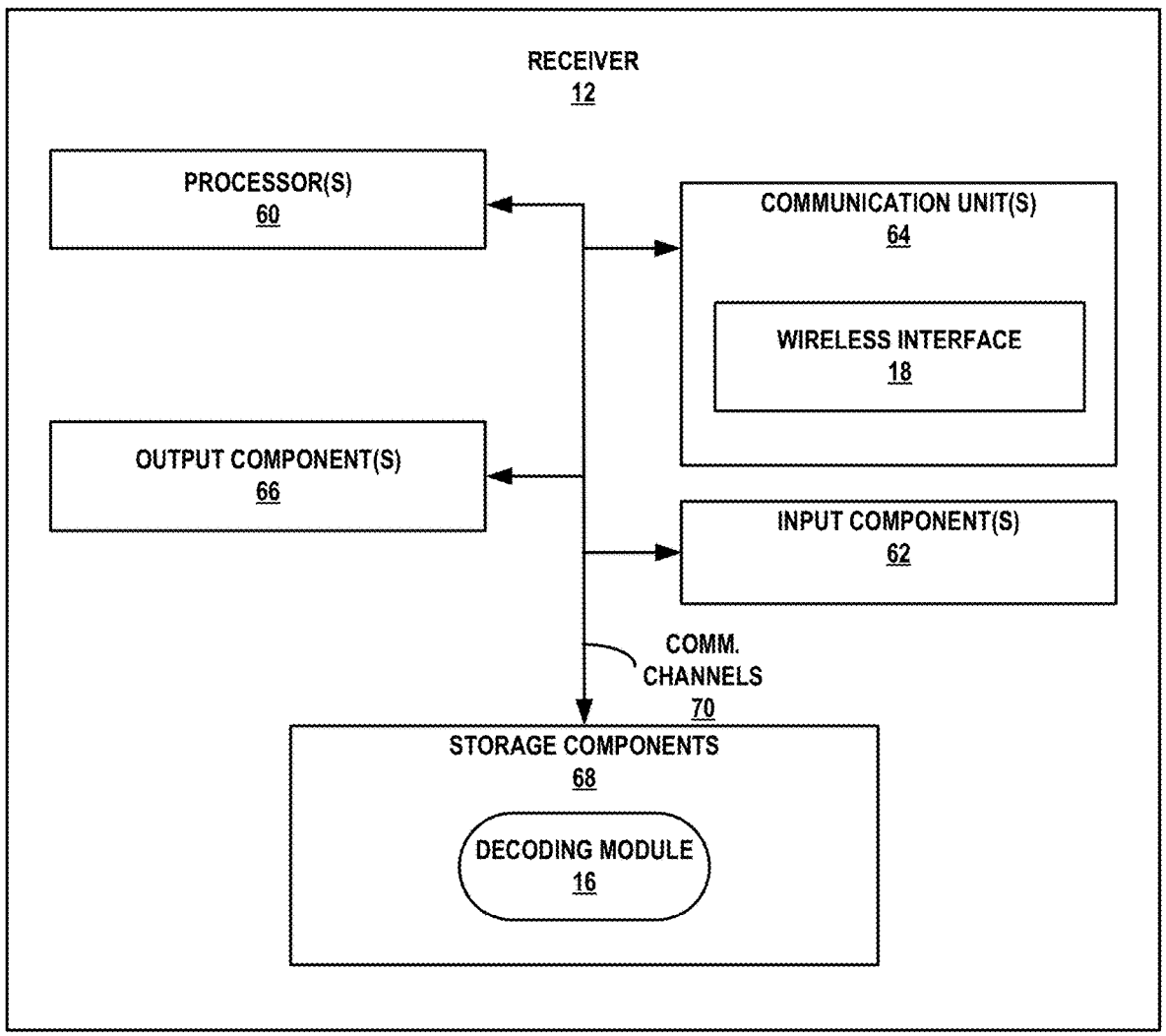
FIG. 59 is a block diagram of a more detailed view of a receiver device that may be configured to perform one or more techniques in accordance with the current disclosure.

FIG. 59 is a block diagram of a more detailed view of a receiver device that may be configured to perform one or more techniques in accordance with the current disclosure.

Receiver 12 of FIG. 59 is described below as an example of receiver 12 of FIG. 57. FIG. 59 illustrates only one particular example of receiver 12, and many other examples of receiver 12 may be used in other instances and may include a subset of the components included in example receiver 12 or may include additional components not shown in FIG. 59.

As shown in the example of FIG. 59, receiver 12 includes one or more processors 60, one or more input components 62, one or more communication units 64 that include wireless interface 8, one or more output components 66, and one or more storage components 68. Storage components 68 of receiver 12 include decoding module 16. Communication channels 50 may interconnect each of the components 60, 64, 62, 66, and 68 for inter-component communications (physically, communicatively, and/or operatively). In some examples, communication channels 70 may include a system bus, a network connection, an inter-process communication data structure, or any other method for communicating data.

One or more communication units 64 of receiver 12 may communicate with external devices via one or more wired and/or wireless networks by transmitting and/or receiving network signals on the one or more networks. Examples of communication units 64 include a network interface card (e.g. such as an Ethernet card), an optical transceiver, a radio frequency transceiver, a GPS receiver, or any other type of device that may send and/or receive information. Other examples of communication units 64 may include short wave radios, cellular data radios, wireless network radios, as well as universal serial bus (USB) controllers. Communication units 64, which may include wireless interface 18, may be configured to operate in accordance with a wireless protocol, such as WiFi®, Bluetooth®, LTE, or ZigBee®.

One or more input components 62 of receiver 12 may receive input. Examples of input are tactile, audio, and video input. Input components 62 of receiver 12, in one example, includes a presence-sensitive input device (e.g., a touch sensitive screen, a PSD), mouse, keyboard, voice responsive system, video camera, microphone or any other type of device for detecting input from a human or machine. In some examples, input components 62 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 66 of receiver 12 may generate output. Examples of output are tactile, audio, and video output. Output components 66 of receiver 12, in one example, includes a PSD, sound card, video graphics adapter card, speaker, cathode ray tube (CRT) monitor, liquid crystal display (LCD), or any other type of device for generating output to a human or machine.

One or more processors 60 may implement functionality and/or execute instructions associated with receiver 12. Examples of processors 60 include application processors, display controllers, auxiliary processors, one or more sensor hubs, and any other hardware configure to function as a processor, a processing unit, or a processing device. Module 16 may be operable by processors 60 to perform various actions, operations, or functions of receiver 12. For example, processors 60 of receiver 12 may retrieve and execute instructions stored by storage components 68 that cause processors 60 to perform the operations of module 16. The instructions, when executed by processors 60, may cause receiver 12 to store information within storage components 68.

One or more storage components 68 within receiver 12 may store information for processing during operation of receiver 12 (e.g., receiver 12 may store data accessed by module 16 during execution at receiver 12). In some examples, storage component 68 is a temporary memory, meaning that a primary purpose of storage component 68 is not long-term storage. Storage components 68 on receiver 12 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 68, in some examples, also include one or more computer-readable storage media. Storage components 68 in some examples include one or more non-transitory computer-readable storage mediums. Storage components 68 may be configured to store larger amounts of information than typically stored by volatile memory. Storage components 68 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 68 may store program instructions and/or information (e.g., data) associated with modules 4 and 6. Storage components 68 may include a memory configured to store data or other information associated with module 16.

In accordance with one or more techniques described herein, wireless interface 18 may receive one or more data packets via one or more signals output by wireless interface 8 according to a wireless protocol that wireless interface 18 is not configured to operate in accordance with. For instance, wireless interface 18 may be configured to operate in accordance with a first wireless protocol, such as one of a WiFi® protocol, a Bluetooth® protocol, or an LTE protocol. Wireless interface 8 may be configured to operate in accordance with a different wireless protocol, such as a ZigBee® protocol or the Bluetooth® protocol.

Decoding module 16 may determine a frequency of the one or more signals. In some instances, decoding module 16 may determine a phase of the signal. In some instance, the phase may include an in-phase component and a quadrature phase component. Decoding module 16 may then perform a phase shift on the signal in order to and determine a differential of the phase. In some instances, the phase shift is one of a positive phase shift or a negative phase shift. The phase shift may also be a multiple of $\pi/4$. Decoding module 16 may then determine that the frequency corresponds to the phase shift.

Decoding module 16 may use the frequency of the one or more signals, determine a bit sequence for at least one data packet of the one or more data packets. In some instances, in determining the bit sequence, decoding module 16 may determine a first potential bit sequence for the at least one data packet and a second potential bit sequence for the at least one data packet. The first potential bit sequence may be a bit sequence with a left offset, and the second potential bit sequence may be a bit sequence with a right offset. Decoding module 16 may then select a symbol from a plurality of symbols that most closely matches one of the first potential bit sequence or the second potential bit sequence.

In some instances, in selecting the symbol, decoding module 16 may compare the first potential bit sequence to each symbol of the plurality of symbols. Decoding module 16 may also compare the second potential bit sequence to each symbol of the plurality of symbols. Decoding module 16 may then determine which symbol of the plurality of symbols has a highest number of common bits with either the first potential bit sequence or the second potential bit sequence. Decoding module 16 may finally select the symbol of the plurality of symbols with the highest number of common bits with either the first potential bit sequence or the second potential bit sequence as the bit sequence for the at least one data packet.

In some instances, decoding module 16 may only analyze a subset of the symbols. For instance, decoding module 16 may determine one or more common bits for the first potential bit sequence and the second potential bit sequence, where the one or more common bits include bits of the first potential bit sequence that have values equal to bits in the same position of the second potential bit sequence. Decoding module 16 may limit the plurality of symbols to a subset of one or more symbols with bit values equal to the one or more common bits in the same position of the first and second potential bit sequences. Decoding module 16 may then only compare the first potential bit sequence and the second potential bit sequence to the subset of one or more symbols.

In some instances, decoding module 16 may then perform an action based on the determined bit sequence of the at least one data packet.

In some instances, decoding module 16 may read a receiver identification bit sequence in a header of the one or more data packets and set wireless interface 18 to listen only for signals containing data packets with the receiver identification bit sequence in the respective header of the data packets.

In some instances, decoding module 16 may output one or more scramble seeds initialized as a channel number of the first wireless protocol. Decoding module 16 may then perform an exclusive-or operation on the one or more scramble seeds and the bit sequence of the at least one data packet to recover a raw bit sequence.

In accordance with one or more techniques described herein, wireless interface 18 may receive, in accordance with a first wireless protocol, at least one signal including a data packet. A payload of the data packet includes an indication of a symbol defined in accordance with a second wireless protocol. The first wireless protocol is different than the second wireless protocol, and wireless interface 18 is not configured to operate in accordance with the second wireless protocol. Decoding module 16 may demodulate the payload of the data packet.

In some instances, the payload of the data packet further includes a sequence of bits readable using the first wireless protocol.

In some instances, the first wireless protocol may be a WiFi® protocol, and the second wireless protocol may be one of a ZigBee® protocol or a Bluetooth® protocol.

In some instances, the payload of the data packet includes a cyclic prefix, a set of one or more data bits, and a set of one or more parity bits. Decoding module 16 may blacklist the set of one or more parity bits and the cyclic prefix. Decoding module 16 may then perform an exclusive-or operation on one or more scramble seeds and the set one or more data bits to generate a hamming distance. Decoding module 16 may recover, based on the hamming distance, the symbol defined in accordance with the second wireless protocol.

In some instances, wireless interface 18 may broadcast, using the first wireless protocol, a polling signal to a plurality of computing devices that includes the second computing device and a third computing device. Wireless interface 18 may receive, from the third computing device, a first frame transmitted in accordance with the first wireless protocol. Wireless interface 18 may also receive, from the second computing device, a second frame via one or more frequencies corresponding to a group of subcarrier values, where the second frame is transmitted in accordance with the second wireless protocol. In such instances, wireless interface 18 may reserve the one or more frequencies corresponding to the group of subcarrier values for a subset of computing devices included in the plurality of computing device. The subset of computing devices are each configured to operate in accordance with the second wireless protocol, and the subset of computing devices includes the second computing device.

In some instances, wireless interface 18 may send, to the third computing device, an indication of the one or more frequencies corresponding to the group of subcarrier values.

In some instances, the at least one signal includes a first signal, and the data packet is included in the first signal. In some such instances, decoding module 16 demodulates the payload of the data packet by receiving, via wireless interface 18, the first signal over the one or more frequencies corresponding to the group of subcarrier values. Wireless interface 18 also receives, in parallel with the first signal, a second signal over a second group of one or more frequencies different than the one or more frequencies corresponding to the group of subcarrier values. The second signal is output by a third computing device configured to operate in accordance with the first wireless protocol. Decoding module 16 may separate bits for the data packet of the first signal from bits for one or more data packets of the second signal based on the corresponding frequency over which the first signal and the second signal were received. Decoding module 16 may reconstruct, using the bits for the data packet of the first signal, the payload of the data packet.

Decoding module 16 may perform these techniques on either ZigBee® data packets, Bluetooth® data packets, or both simultaneously, with each of ZigBee® and Bluetooth® having designated channels determined during the polling process.

Figure 60:
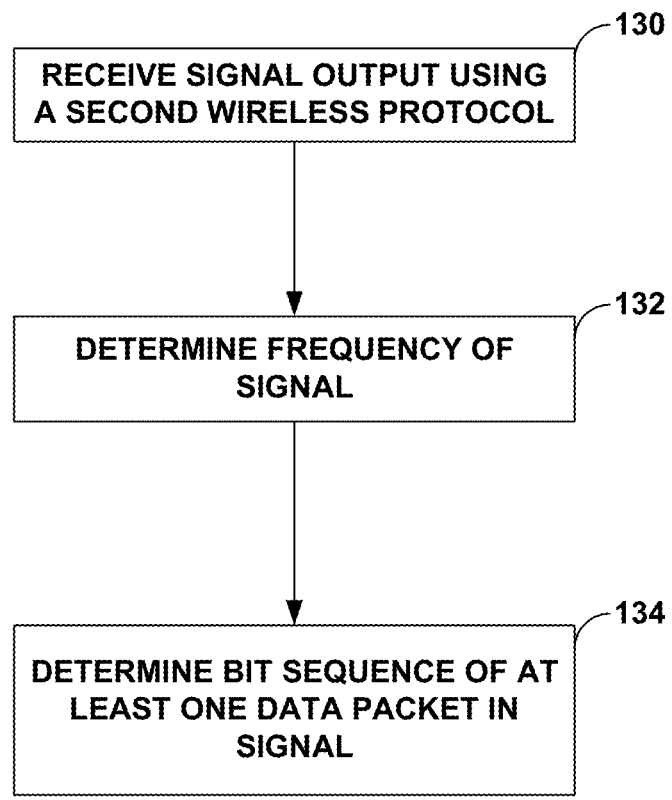
FIG. 60 is a flow diagram of one or more techniques of the current disclosure.

FIG. 60 is a flow diagram of one or more techniques of the current disclosure. The operations of FIG. 60 may be performed by one or more processors of a computing device, such as receiver 12 of FIG. 57 or FIG. 59. For purposes of illustration only, FIG. 60 is described below within the context of receiver 12 of FIG. 57.

In accordance with the techniques described herein, wireless interface 18 may receive (130) one or more data packets via one or more signals output by wireless interface 8 according to a wireless protocol that wireless interface 18 is not configured to operate in accordance with. Decoding module 16 may determine (132) a frequency of the one or more signals and, using the frequency of the one or more signals, determine (134) a bit sequence for at least one data packet of the one or more data packets.

Figure 61:
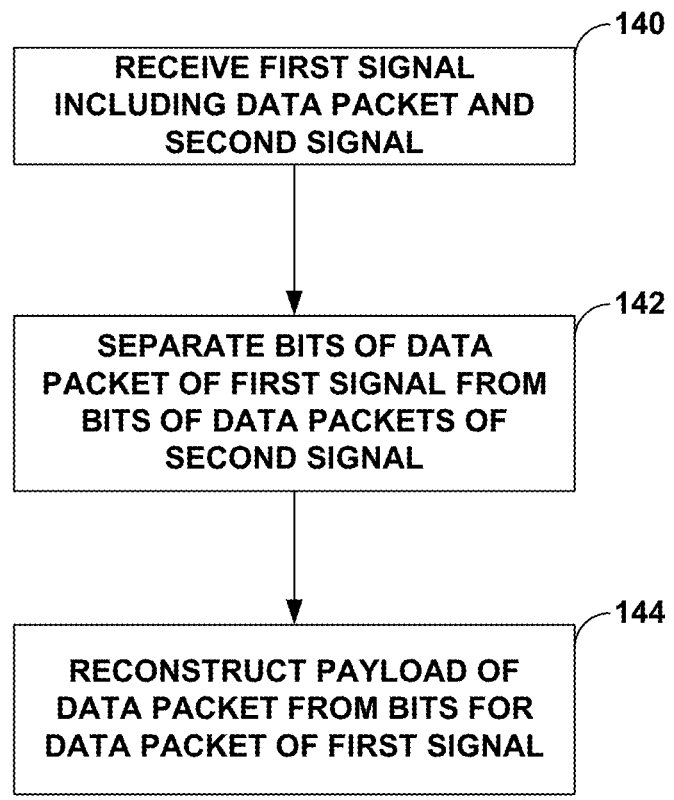
FIG. 61 is a flow diagram of one or more techniques of the current disclosure.

FIG. 61 is a flow diagram of one or more techniques of the current disclosure. The operations of FIG. 61 may be performed by one or more processors of a computing device, such as receiver 12 of FIG. 57 or FIG. 59. For purposes of illustration only, FIG. 61 is described below within the context of receiver 12 of FIG. 57.

In accordance with the techniques described herein, wireless interface 18 may receive (140) one or more data packets via a first signal output by wireless interface 8 according to a wireless protocol that wireless interface 18 is not configured to operate in accordance with, as well as a second signal. Decoding module 16 may separate (142) bits of the data packets from the first signal from bits of one or more data packets of a second signal and, using the bits of the one or more data packets of the first signal, reconstruct (144) a payload of the one or more data packets.

Example 1. A method comprising: receiving, by a first computing device configured to operate in accordance with a first wireless protocol, one or more data packets via one or more signals output by a second computing device according to a second wireless protocol, wherein the first computing device is not configured to operate in accordance with the second wireless protocol; determining, by the first computing device, a frequency of the one or more signals; and determining, by the first computing device and using the frequency of the one or more signals, a bit sequence for at least one data packet of the one or more data packets.

Example 2. The method of example 1, wherein determining the frequency of the signal comprises: determining, by the first computing device, a phase of the signal; performing, by the first computing device, a phase shift on the signal; and determining, by the first computing device, that the frequency corresponds to the phase shift.

Example 3. The method of example 2, wherein the phase shift comprises one of a positive phase shift or a negative phase shift.

Example 4. The method of any one of examples 2 or 3, wherein the phase shift comprises a multiple of $\pi/4$.

Example 5. The method of any one of examples 2-4, wherein the phase of the one or more signals comprises an in-phase component and a quadrature phase component.

Example 6. The method of any one of examples 1-5, wherein determining the bit sequence comprises: determining, by the first computing device, a first potential bit sequence for the at least one data packet; determining, by the first computing device, a second potential bit sequence for the at least one data packet; and selecting, by the first computing device, a symbol from a plurality of symbols that most closely matches one of the first potential bit sequence or the second potential bit sequence.

Example 7. The method of example 6, wherein the first potential bit sequence comprises a bit sequence with a left offset, and wherein the second potential bit sequence comprises a bit sequence with a right offset.

Example 8. The method of any one of examples 6 or 7, wherein selecting the symbol comprises: comparing, by the first computing device, the first potential bit sequence to each symbol of the plurality of symbols; comparing, by the first computing device, the second potential bit sequence to each symbol of the plurality of symbols; determining, by the first computing device, which symbol of the plurality of symbols has a highest number of common bits with either the first potential bit sequence or the second potential bit sequence; and selecting, by the first computing device, the symbol of the plurality of symbols with the highest number of common bits with either the first potential bit sequence or the second potential bit sequence as the bit sequence for the at least one data packet.

Example 9. The method of example 8, further comprising: determining, by the first computing device, one or more common bits for the first potential bit sequence and the second potential bit sequence, wherein the one or more common bits comprise bits of the first potential bit sequence that have values equal to bits in the same position of the second potential bit sequence; limiting, by the first computing device, the plurality of symbols to a subset of one or more symbols with bit values equal to the one or more common bits in the same position of the first and second potential bit sequences; comparing, by the first computing device, the first potential bit sequence and the second potential bit sequence only to the subset of one or more symbols.

Example 10. The method of any one of examples 1-9, further comprising: performing, by the first computing device, an action based on the determined bit sequence of the at least one data packet.

Example 11. The method of any one of examples 1-10, wherein the first wireless protocol comprises one of a WiFi® protocol, a Bluetooth® protocol, or an LTE protocol, and wherein the second wireless protocol comprises a ZigBee® protocol or the Bluetooth® protocol.

Example 12. The method of any one of examples 1-11, further comprising: reading, by the first computing device, a receiver identification bit sequence in a header of the one or more data packets; and setting, by the first computing device, a receiver device of the first computing device to listen only for signals containing data packets with the receiver identification bit sequence in the respective header of the data packets.

Example 13. The method of any one of examples 1-12, further comprising: outputting, by the first computing device, one or more scramble seeds initialized as a channel number of the first wireless protocol; and performing, by the first computing device, an exclusive-or operation on the one or more scramble seeds and the bit sequence of the at least one data packet to recover a raw bit sequence.

Example 14. A method for performing any of the techniques of any combination of examples 1-13.

Example 15. A device configured to perform any of the methods of any combination of examples 1-13.

Example 16. An apparatus comprising means for performing any of the method of any combination of examples 1-13.

Example 17. A non-transitory computer-readable storage medium having stored thereon instructions that, when executed, cause one or more processors of a computing device to perform the method of any combination of examples 1-13.

Example 18. A system comprising: a first computing device configured to perform a method of any combination of examples 1-13; and a second computing device configured to output the one or more signals of example 1.

Example 19. A method comprising: receiving, by a first computing device configured to operate in accordance with a first wireless protocol, at least one signal including a data packet, wherein a payload of the data packet comprises an indication of a symbol defined in accordance with a second wireless protocol, wherein the first wireless protocol is different than the second wireless protocol, and wherein the first computing device is not configured to operate in accordance with the second wireless protocol; and demodulating, by the first computing device, the payload of the data packet.

Example 20. The method of example 19, wherein the payload of the data packet further comprises a sequence of bits readable using the first wireless protocol.

Example 21. The method of any of examples 19-20, wherein the first wireless protocol comprises a WiFi® protocol, and wherein the second wireless protocol comprises one of a ZigBee® protocol or a Bluetooth® protocol.

Example 22. The method of any of examples 19-21, wherein the payload of the data packet comprises a cyclic prefix, a set of one or more data bits, and a set of one or more parity bits, and wherein the method further comprises: blacklisting, by the first computing device, the set of one or more parity bits and the cyclic prefix; performing, by the first computing device, an exclusive-or operation on one or more scramble seeds and the set one or more data bits to generate a hamming distance; and recovering, by the first computing device and based on the hamming distance, the symbol defined in accordance with the second wireless protocol.

Example 23. The method of any of examples 19-22, further comprising: broadcasting, by the first computing device and using the first wireless protocol, a polling signal to a plurality of computing devices that includes the second computing device and a third computing device; receiving, by the first computing device and from the third computing device, a first frame transmitted in accordance with the first wireless protocol; and receiving, by the first computing device and from the second computing device, a second frame via one or more frequencies corresponding to a group of subcarrier values, wherein the second frame is transmitted in accordance with the second wireless protocol.

Example 24. The method of example 23, further comprising: reserving, by the first computing device, the one or more frequencies corresponding to the group of subcarrier values for a subset of computing devices included in the plurality of computing device, wherein the subset of computing devices are each configured to operate in accordance with the second wireless protocol, and wherein the subset of computing devices includes the second computing device.

Example 25. The method of any one of examples 23-24, further comprising: sending, by the first computing device and to the third computing device, an indication of the one or more frequencies corresponding to the group of subcarrier values.

Example 26. The method of any one of examples 23-25, wherein the at least one signal includes a first signal, wherein the data packet is included in the first signal, and wherein demodulating the payload of the data packet comprises: receiving, by the first computing device, the first signal over the one or more frequencies corresponding to the group of subcarrier values; receiving, by the first computing device, and in parallel with the first signal, a second signal over a second group of one or more frequencies different than the one or more frequencies corresponding to the group of subcarrier values, wherein the second signal is output by a third computing device configured to operate in accordance with the first wireless protocol; separating, by the first computing device, bits for the data packet of the first signal from bits for one or more data packets of the second signal based on the corresponding frequency over which the first signal and the second signal were received; and reconstructing, by the first computing device and using the bits for the data packet of the first signal, the payload of the data packet.

Example 27. A method comprising: receiving, by a first computing device configured to operate in accordance with a first wireless protocol, a polling signal broadcast by a wireless access point in accordance with a second wireless protocol different than the first wireless protocol; and outputting, by the first computing device, a polling response in accordance with the first wireless protocol via one or more frequencies corresponding to a group of subcarrier values.

Example 28. The method of example 27, wherein the first wireless protocol comprises one of a ZigBee® protocol or a Bluetooth® protocol, and wherein the second wireless protocol comprises a WiFi® protocol.

Example 29. The method of any one of examples 27-28, further comprising: outputting, by the first computing device, at least one signal in accordance with the first wireless protocol via the one or more frequencies corresponding to the group of subcarrier values.

Example 30. A method comprising: receiving, by a first computing device configured to operate in accordance with a first wireless protocol, a polling signal broadcast by a wireless access point in accordance with the first wireless protocol; and outputting, by the first computing device, a polling response in accordance with the first wireless protocol via one or more frequencies corresponding to a group of subcarrier values.

Example 31. A method for performing any of the techniques of any combination of examples 19-30.

Example 32. A device configured to perform any of the methods of any combination of examples 19-30.

Example 33. An apparatus comprising means for performing any of the method of any combination of examples 19-30.

Example 34. A non-transitory computer-readable storage medium having stored thereon instructions that, when executed, cause one or more processors of a computing device to perform the method of any combination of examples 19-30.

Example 35. Any of the techniques described herein.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage components, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
   receiving, by a first computing device configured to operate in accordance with a first wireless protocol, one or more data packets via one or more signals output by a second computing device according to a second wireless protocol, wherein the first computing device is not configured to operate in accordance with the second wireless protocol;
   determining, by the first computing device, a frequency of the one or more signals; and
   determining, by the first computing device and using the frequency of the one or more signals, a bit sequence for at least one data packet of the one or more data packets.

2. The method of claim 1, wherein determining the frequency of the signal comprises:
   determining, by the first computing device, a phase of the signal;
   performing, by the first computing device, a phase shift on the signal; and
   determining, by the first computing device, that the frequency corresponds to the phase shift.

3. The method of claim 2, wherein the phase shift comprises one of a positive phase shift or a negative phase shift.

4. The method of claim 2, wherein the phase shift comprises a multiple of $\pi/4$.

5. The method of claim 2, wherein the phase of the one or more signals comprises an in-phase component and a quadrature phase component.

6. The method of claim 1, wherein determining the bit sequence comprises:
   determining, by the first computing device, a first potential bit sequence for the at least one data packet;
   determining, by the first computing device, a second potential bit sequence for the at least one data packet; and
   selecting, by the first computing device, a symbol from a plurality of symbols that most closely matches one of the first potential bit sequence or the second potential bit sequence.

7. The method of claim 6, wherein the first potential bit sequence comprises a bit sequence with a left offset, and wherein the second potential bit sequence comprises a bit sequence with a right offset.

8. The method of claim 6, wherein selecting the symbol comprises:
   comparing, by the first computing device, the first potential bit sequence to each symbol of the plurality of symbols;
   comparing, by the first computing device, the second potential bit sequence to each symbol of the plurality of symbols;
   determining, by the first computing device, which symbol of the plurality of symbols has a highest number of common bits with either the first potential bit sequence or the second potential bit sequence; and
   selecting, by the first computing device, the symbol of the plurality of symbols with the highest number of common bits with either the first potential bit sequence or the second potential bit sequence as the bit sequence for the at least one data packet.

9. The method of claim 8, further comprising:
   determining, by the first computing device, one or more common bits for the first potential bit sequence and the second potential bit sequence, wherein the one or more common bits comprise bits of the first potential bit sequence that have values equal to bits in the same position of the second potential bit sequence;
   limiting, by the first computing device, the plurality of symbols to a subset of one or more symbols with bit values equal to the one or more common bits in the same position of the first and second potential bit sequences; and
   comparing, by the first computing device, the first potential bit sequence and the second potential bit sequence only to the subset of one or more symbols.

10. The method of claim 1, further comprising:
    performing, by the first computing device, an action based on the determined bit sequence of the at least one data packet.

11. The method of claim 1,
    wherein the first wireless protocol comprises one of a WiFi® protocol, a Bluetooth® protocol, or an LTE protocol, and
    wherein the second wireless protocol comprises a ZigBee® protocol or the Bluetooth® protocol.

12. The method of claim 1, further comprising:
reading, by the first computing device, a receiver identification bit sequence in a header of the one or more data packets; and
setting, by the first computing device, a receiver device of the first computing device to listen only for signals containing data packets with the receiver identification bit sequence in the respective header of the data packets.

13. The method of claim 1, further comprising:
outputting, by the first computing device, one or more scramble seeds initialized as a channel number of the first wireless protocol; and
performing, by the first computing device, an exclusive-or operation on the one or more scramble seeds and the bit sequence of the at least one data packet to recover a raw bit sequence.

14. A system comprising a first computing device configured to operate in accordance with a first wireless protocol, wherein the first computing device is configured to:
receive one or more data packets via one or more signals output by a second computing device according to a second wireless protocol, wherein the first computing device is not configured to operate in accordance with the second wireless protocol;
determine a frequency of the one or more signals; and
determine, using the frequency of the one or more signals, a bit sequence for at least one data packet of the one or more data packets.

\* \* \* \* \*